United States Patent
Kiyama et al.

(10) Patent No.: US 12,475,643 B2
(45) Date of Patent: Nov. 18, 2025

(54) INFORMATION PROCESSING DEVICE AND METHOD

(71) Applicant: Sony Group Corporation, Tokyo (JP)

(72) Inventors: Yuka Kiyama, Tokyo (JP); Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 253 days.

(21) Appl. No.: 18/268,620

(22) PCT Filed: Dec. 24, 2021

(86) PCT No.: PCT/JP2021/048117
§ 371 (c)(1),
(2) Date: Jun. 21, 2023

(87) PCT Pub. No.: WO2022/145357
PCT Pub. Date: Jul. 7, 2022

(65) Prior Publication Data
US 2024/0046562 A1 Feb. 8, 2024

Related U.S. Application Data

(60) Provisional application No. 63/131,003, filed on Dec. 28, 2020.

(51) Int. Cl.
*G06T 17/00* (2006.01)
*G06T 7/62* (2017.01)
(Continued)

(52) U.S. Cl.
CPC ............ *G06T 17/00* (2013.01); *H04N 19/597* (2014.11)
(Continued)

(58) Field of Classification Search
CPC .......... G06T 17/00; G06T 7/62; G06T 7/187; G06T 2207/10028; G06T 15/08;
(Continued)

(56) References Cited

U.S. PATENT DOCUMENTS

2019/0028744 A1\* 1/2019 Katsumata ......... H04N 21/8456
2020/0288217 A1 9/2020 Takahashi
(Continued)

FOREIGN PATENT DOCUMENTS

WO 2017/145757 A1 8/2017
WO 2021/251173 A1 12/2021

OTHER PUBLICATIONS

"ISO/IEC FDIS 23090-5 Visual Volumetric Video-based Coding and Video-based Point Cloud Compression", ISO/IEC ITC 1/SC 29/WG11, N19579, Sep. 21, 2020, pp. 1-335.
(Continued)

*Primary Examiner* — Wesner Sajous
(74) *Attorney, Agent, or Firm* — XSENSUS, LLP

(57) ABSTRACT

The present disclosure relates to an information processing device and method that enable an increase in data amount of scene description to be curbed. A scene description file including track information that designates, as a reference target, some tracks with information for accessing other tracks, from among a plurality of tracks of a file container that manages information regarding data of the 3D object content is generated. Also, data of the 3D object content managed in all the tracks is obtained on the basis of the scene description file including the track information that designates, as a reference target, some tracks with information for accessing other tracks from among the plurality of tracks of the file container and a reference relationship among the tracks. The present disclosure can be applied to, for
(Continued)

example, an information processing device, an information processing method, or the like.

18 Claims, 49 Drawing Sheets

(51) Int. Cl.
  *H04N 19/597* (2014.01)
  *H04N 21/23* (2011.01)
  *H04N 21/43* (2011.01)
  *H04N 21/44* (2011.01)
  *H04N 21/81* (2011.01)
  *H04N 21/84* (2011.01)
  *H04N 21/85* (2011.01)

(58) Field of Classification Search
  CPC ... G06T 15/10; G06T 2215/00; H04N 19/597; H04N 21/2343; H04N 21/23605; H04N 21/4402; H04N 21/816; H04N 21/8456; H04N 21/85406; H04N 21/26258; H04N 21/23439
  See application file for complete search history.

(56) References Cited

U.S. PATENT DOCUMENTS

2020/0302632 A1* 9/2020 Oh .......................... G06T 7/62
2020/0396471 A1   12/2020 Wang

OTHER PUBLICATIONS

"Text of ISO/IEC CD 23090-14 Scene Description for MPEG Media", ISO/IEC JTC 1/SC 29/WG 3 N00026, Nov. 30, 2020, pp. 1-37.

"Information technology—Coded representation of immersive media—Part 10: Carriage of Visual Volumetric Video-based Coding Data", ISO 23090-10:2020(E), ISO/IEC JTC 1/SC 29/WG 11 N19285, Jun. 1, 2020, pp. 1-54.

Bhatia et al., "Khronos gITF2.0", Available Online at: https://github.com/KhronosGroup/gITF/tree/master/specification/2.0, Jun. 9, 2017, 111 pages.

International Search Report and Written Opinion mailed on Mar. 1, 2022, received for PCT Application PCT/JP2021/048117, filed on Dec. 24, 2021, 9 pages including English Translation.

* cited by examiner

Fig. 3

```
{
  "scenes":[{"name":"Scene 1","nodes":[0,1]},
            {"name":"Scene2","nodes":[2]},
  "nodes":[{"name":"Node1", "mesh":0, "camera":0, skin:0},
           {"name":"Node2", "mesh":1, "camera":1, skin:1},
           {"name":"Node3"}],
  "meshs":[{"primitives": [{
      "attributes": {"NORMAL": 23,"POSITION": 22,"TANGENT": 24,"TEXCOORD_0": 25},
      "indices": 21,"material": 3,"mode": 4}]
    :
  ],
  "cameras":[...],
  "skins" :[...],
  "materials" :[...],
  "textures" :[...],
    :
  "scene": 0
}
```

Fig. 5

```
{ "meshes": [
    {
      "primitives": [
        {
          "attributes": {
            "NORMAL": 23,
            "POSITION": 22,
            "TANGENT": 24,
            "TEXCOORD_0": 25
          },
          "indices": 21,
          "material": 3,
          "mode": 4
        }
      ]
    }
  ]
}
``` accessor TO EACH VERTEX ATTRIBUTE IS DESIGNATED

Fig. 7

```
"buffers":[
  {
    "byteLength":102040,
    "uri":"duck.bin"
  }
]
```

A

```
"bufferViews":[
  {
    "buffer":0,
    "byteLength":25272,
    "byteOffset":0,
    "target":34963 //ELEMENT_ARRAY_BUFFER
                   (OpenGL MACRO CONSTANT)
  },
  {
    "buffer":0,
    "byteLength":76768,
    "byteOffset":25272,
    "byteStride":32, //VERTEX ATTRIBUTE DATA
                     ARRAY_BUFFER
    "target":34962 // (OpenGL MACRO CONSTANT)
  }
]
```

B

```
"accessors":[
  {
    "bufferView":0,
    "byteOffset":0,
    "componentType":5126, //FLOAT TYPE (OpenGL MACRO CONSTANT)
    "count":2106,         //2106 PIECES OF data
    "type":"VEC3"         //THREE-DIMENSIONAL VECTOR (data type)
  }
]
```

```
"mesh":[{
  "primitives":[{
      "attributes":{
          "POSITION":0,
          "COLOR_0":1
      },
        "mode":0,
    }
  ]
}

"accessors":[
  {
      "bufferView":0,
      "byteOffset":0,
      "componentType":5126,
      "count":10000,
      "type":"VEC3"
  },
  {
      "bufferView":1,
      "byteOffset":0,
      "componentType":5126,
      "count":10000,
      "type":"VEC3"
  }
]
```

Fig. 10

```
{
  "extensionsUsed":["ExtensionExample"]
  "extensionsRequired":["ExtensionExample"],
  "nodes":[
    {
       "name":"singleNode"
    }
  ],
  "scenes":[
    {
       "name":"singleScene",
       "nodes":[0],
       "extensions":[
            "ExtensionExample":{.....}
       }
    }
  ],
  "scene":0
}
```

Fig. 13

```
"mesh": [
    "primitives":[
        {
            "attributes":[
                "POSITION":11,
                "NORMAL":12,
            },
            "indices":10,
            "mode":4,
            "extensions":[
                "KHR_draco_mesh_compression":[
                    "bufferView":5,
                    "attributes":[
                        "POSITION":0,   //VALUE IS attribute ID
                        "NORMAL":1,     //VALUE IS attribute ID
                    }
                }
            }
        }
    ]
}

"bufferViews":[
    //...
    // bufferView of Id 5
    {
        "buffer":10,
        "byteOffset":1024,
        "byteLength":10000
    }
    //...
]
```

Fig. 16

```
{
"texture":[{"sampler": 0, "source": 1, "extensions":{ "MPEG_texture_video ": "accessor": 2}}],
"nodes": [{ "name":"singleNode"}],
"scenes": [{ "name": "singleScene",
            "nodes": [0]}],
"extensions": {
    "MPEG_media":{
    "media":[
        {"name": "source_1", "renderingRate":30.0, "startTime": 9.0, "timeOffset": 0.0,
        "loop":"true", "controls":"false",
        "alternatives":[{"mimeType":"video/mp4;codecs=\"avc1.42E01E\"", "uri":"video1.mp4",
            "tracks":[{"track":"#track_ID=1"}]
        }]
        }
    ]
    }
},
"scene": 0
}
```

Fig. 17

```
{
"accessors": [{"bufferView": 0,"componentType": 5126, "byteOffset": 0,
                                "count": 12323,"type": "VEC4",
"extensions": {
"MPEG_accessor_timed": {bufferView": 1, "updateRate":25.0, "immutable":1,}
}
}],
"bufferViews":[{"buffer": 0, "byteLength":5555000, "name":" circular_buffer"},
              {"buffer": 1, "byteLength": 128,
               "name":"timed_accessor_information_header_buffer"}],
"buffers":[{"byteLength": 5555000,
"extensions": {
"MPEG_buffer_circular": { "count":5, "headerLength":12, "updateRate":25.0}
}},
{"byteLength": 128}
]
}
```

Fig. 24

```
"MPEG_media":{
    "media":[{
        "name":"V-pcc single track bitstream",
        :
        "alternatives":[{
            "mimeType":"application/dash+xml",
            "uri":"manifest.mpd",
            "tracks":[{
                "track": "#track=1"
                "codecs" : "v3e1"
            }]
        }]
    }]
}
```

Fig. 25

```
"MPEG_media":[
    "media":[{
      "name":"V-pcc multi track bitstream",
        :
        "alternatives":[{
            "mimeType": "application/dash+xml",
            "uri": "manifest.mpd",
            "tracks":[
              {"track":"#track=1"
                "codecs":"v3c1"},
              {"track":"#track=2"
                "codecs":"resv.vvvc.hvc1"},
              {"track":"#track=3"
                "codecs":"resv.vvvc.hvc1"},
              {"track":"#track=4"
                "codecs":"resv.vvvc.hvc1"}
            ]
        }]
    }]
}
```

Fig. 26

| 1 | SOME TRACKS WITH INFORMATION REGARDING OTHER TRACKS OF FILE CONTAINER WITH MULTI-TRACK STRUCTURE ARE DESIGNATED AS REFERENCE TARGET IN SCENE DESCRIPTION |
|---|---|
| 1-1 | TRACK STORING TRACK REFERENCE OF FILE CONTAINER IS DESIGNATED AS REFERENCE TARGET |
| 1-2 | ADAPTATION SET THAT MANAGES TRACK STORING TRACK REFERENCE OF FILE CONTAINER IN MPD IS DESIGNATED AS REFERENCE TARGET |

Fig. 27

```
"buffers":[{
    "byteLength":5555000,
    "extensions":{
    "MPEG_circular_buffer":{
        "source":0
        :
    }}
}],
"MPEG_media":{
    "media":[{
        "name":"V3C track",
        :
        "alternatives":[{
            "mimeType":"application/dash+xml",
            "uri":"manifest.mpd",
            "tracks":[{
                "tracks":"#track=1"
                "codecs":"v3c1"
            }]
        }]
    }]
}
```

Fig. 39

| 2 | ATTRIBUTE INFORMATION OTHER THAN COLOR INFORMATION OF POINT CLOUD IS STORED IN mesh.primitives OF SCENE DESCRIPTION |
|---|---|
| 2-1 | OBJECT STORING ATTRIBUTE INFORMATION IS DEFINED BY USING extension |
| 2-2 | ATTRIBUTE INFORMATION IS ADDED TO primitives.attributes |
| 2-3 | OBJECT STORING ATLAS INFORMATION, GEOMETRY INFORMATION, ATTRIBUTE INFORMATION INCLUDING ATTRIBUTES OTHER THAN COLOR OF POINT CLOUD, AND OCCUPANCY INFORMATION IS DEFINED BY USING extension |
| 2-4 | OBJECT STORING GENERAL-PURPOSE ATTRIBUTE INFORMATION IS DEFINED BY USING extension |

Fig. 41

```
"meshes":[
    {
        "primitives":[{
            "attributes" : {
                "POSITION": 0,
                "COLOR_0": 1
            },
            "mode":0,
            "extensions":{
                "MPEG_vpcc":{
                    "attribute":{
                        "POSITION":-1,
                        "COLOR":0,
                        "_REFLECTANCE":{
                            "accessorId":2,
                            "attributeId":1
                        }
                    }
                }
            }
        }]
    }
]
```

Fig. 43

```
"meshes":[
    {
        "primitives":[[
            "attributes":{
                "POSITION":100,
                "COLOR_0":101
            },
            "mode":0,
            "extensions":{
                "MPEG_vpcc":[
                    "attributes":{
                        "POSITION":0,
                        "COLOR_0":1,
                        "_ATLAS":2,
                        "_GEOMETRY":3,
                        "_ATTRIBUTE_0":4,
                        "_OCCUPANCY":5
                    }
                ]
            }
        ]]
    }
]
```

Fig. 45

```
"meshes":[
    {
        "primitives":[{
            "attributes":{
                "POSITION":0,
                "COLOR_0":1
            },
            "mode":0,
            "extensions":{
                "MPEG_vpcc":{
                    "attribute":{
                        "POSITION":-1,
                        "COLOR":0,
                        "vpccattributes":{
                            "accessorId":2,
                            "attributeId":1,
                            "attributeType:ATTR_REFLECTANCE
                        }
                    }
                }
            }
        }]
    }
]
```

INFORMATION PROCESSING DEVICE AND METHOD

CROSS-REFERENCE TO RELATED APPLICATIONS

The present application is based on PCT filing PCT/JP2021/048117, filed Dec. 24, 2021, which claims priority to U.S. Provisional Patent Application No. 63/131,003, filed Dec. 28, 2020, the entire contents of each are incorporated herein by reference.

TECHNICAL FIELD

The present disclosure relates to an information processing device and method, and particularly relates to an information processing device and method capable of curbing an increase in data amount for scene description.

BACKGROUND ART

There has thus far been the GL Transmission Format (glTF) (registered trademark) 2.0, which is a format of scene description for placing three-dimensional (3D) objects in a three-dimensional space (see NPL 1, for example).

In recent years, a method of handling timed media encoded as texture data and stored in ISOBMFF or the like by extending glTF2.0 in Moving Picture Experts Group (MPEG)-I Scene Description has been proposed (see NPL 2, for example).

Incidentally, Video based Point Cloud Compression (V-PCC) of segmenting a point cloud to form a region and performing coding by video codec through plane projection for each region has been proposed as a scheme for coding a point cloud which is a group of points that have position information and attribute information (such as colors and reflection) at the same time in a three-dimensional space has been proposed (see NPL 3, for example).

Also, a method of storing, in ISOBMFF, a V3C bitstream configured of encoded data of a point cloud encoded by V-PCC has been studied (see NPL 4, for example). In a case where ISOBMFF has a multi-track structure configured of a plurality of tracks, for example, all the tracks are designated before V-PCC data is designated in MPEG media of scene description.

CITATION LIST

Non Patent Literature

[NPL 1]
Saurabh Bhatia, Patrick Cozzi, Alexey Knyazev, Tony Parisi, "Khronos glTF2.0", https://github.com/Khronos-Group/glTF/tree/master/specification/2.0, June 9,
[NPL 2]
"Text of ISO/IEC CD 23090-14 Scene Description for MPEG Media", ISO/IEC JTC 1/SC 29/WG 3 N00026, Dec. 7, 2020
[NPL 3]
"ISO/IEC FDIS 23090-5 Visual Volumetric Video-based Coding and Video-based Point Cloud Compression", ISO/IEC JTC 1/SC 29/WG 11 N19579, Sep. 21, 2020
[NPL 4]
"Text of ISO/IEC DIS 23090-10 Carriage of Visual Volumetric Video-based Coding Data", ISO/IEC JTC 1/SC 29/WG 11 N19285, Jun. 1, 2020

SUMMARY

Technical Problem

However, a decoder can obtain a reference relationship among tracks from ISOBMFF or the like. Therefore, in a case of a conventional method as described above, designation of all tracks by scene description is redundant, and there is a concern that the data amount of the scene description may unnecessarily increase.

The present disclosure was made in view of such circumstances and is intended to enable an increase in data amount of scene description to be curbed.

Solution to Problem

An information processing device according to an aspect of the present technology is an information processing device including: a file generation unit that generates a scene description file describing a scene of 3D object content, the scene description file including track information that designates, as a reference target, some tracks with information for accessing other tracks from among a plurality of tracks of a file container that manages information regarding data of the 3D object content.

An information processing method according to an aspect of the present technology is an information processing method including: generating a scene description file that describes a scene of 3D object content, the scene description file including track information that designates, as a reference target, some tracks with information for accessing other tracks from among a plurality of tracks of a file container that manages information regarding data of the 3D object content.

An information processing device according to another aspect of the present technology is an information processing device including: an obtainment unit that obtains data of 3D object content managed in all tracks on the basis of a scene description file that describes a scene of the 3D object content and a reference relationship among the tracks, the scene description file including track information that designates, as a reference target, some tracks with information for accessing other tracks from among the plurality of tracks of a file container that manages information regarding the data of the 3D object content.

An information processing method according to another aspect of the present technology is an information processing method including: obtaining data of 3D object content managed in all tracks on the basis of a scene description file that describes a scene of the 3D object content and a reference relationship among the tracks, the scene description file including track information that designates, as a reference target, some tracks with information for accessing other tracks from among the plurality of tracks of a file container that manages information regarding the data of the 3D object content.

In an information processing device and method according to an aspect of the present technology, a scene description file that describes a scene of 3D object content including track information that designates, as a reference target, some tracks with information for accessing other tracks from among a plurality of tracks of a file container that manages information regarding data of the 3D object content is generated.

In an information processing device and method according to another aspect of the present technology, data of 3D object content managed in all tracks is obtained on the basis of a scene description file that describes a scene of the 3D object content and a reference relationship among the tracks, the scene description file including track information that designates, as a reference target, some tracks with information for accessing other tracks from among the plurality of tracks of a file container that manages information regarding the data of the 3D object content.

BRIEF DESCRIPTION OF DRAWINGS

FIG. 3 is a diagram illustrating a description example of scene description.

FIG. 5 is a diagram illustrating a description example of scene description.

FIG. 7 is a diagram illustrating a description example of a buffer object, a buffer view object, and an accessor object.

FIG. 9 is a diagram illustrating a description example of scene description.

FIG. 10 is a diagram for explaining a method for extending an object.

FIG. 13 is a diagram illustrating a description example of scene description.

FIG. 16 is a diagram illustrating a description example of scene description.

FIG. 17 is a diagram illustrating a description example of scene description.

FIG. 24 is a diagram illustrating a description example related to track designation in a case of a single-track structure.

FIG. 25 is a diagram illustrating a description example related to track designation in a case of a multi-track structure.

FIG. 26 is a diagram for explaining a method for designating a track.

FIG. 27 is a diagram illustrating a description example related to track designation in a case of a multi-track structure.

FIG. 39 is a diagram for explaining a method for designating an attribute.

FIG. 41 is a diagram illustrating a description example of scene description.

FIG. 43 is a diagram illustrating a description example of scene description.

FIG. 45 is a diagram illustrating a description example of scene description.

DESCRIPTION OF EMBODIMENTS

Hereinafter, modes for carrying out the present disclosure (hereinafter referred as embodiments) will be described. The descriptions will be given in the following order.

1. MPEG-I Scene Description
2. Curbing of redundancy of track information
3. Designation of attribute
4. Supplement <1. MPEG-I Scene Description>
<Documents Supporting Technical Content and Terms>

The scope disclosed in the present technology is not limited to the content described in the embodiments and also includes the content described in the following NPL and the like that were known at the time of filing, the content of other literature referred to in the following NPL, and the like.

[NPL 1] (Aforementioned)
[NPL 2] (Aforementioned)
[NPL 3] (Aforementioned)
[NPL 4] (Aforementioned)

In other words, the content described in the NPL described above, content of other literature referred to in the NPL described above, and the like are also grounds for determining a support requirement. For example, even in a case where syntax and terms such as glTF2.0 and its extension described in NPL 1 to NPL 3 are not directly defined in the present disclosure, they are regarded as falling within the scope of the present disclosure and are regarded as satisfying the support requirement of the claims. Also, the same applies to technical terms such as parsing, syntax, and semantics, and even in a case where they are not directly defined in the present disclosure, they are regarded as falling within the scope of the present disclosure and are regarded as satisfying the support requirement of the claims.

<Gltf 2.0>

Figure 1:
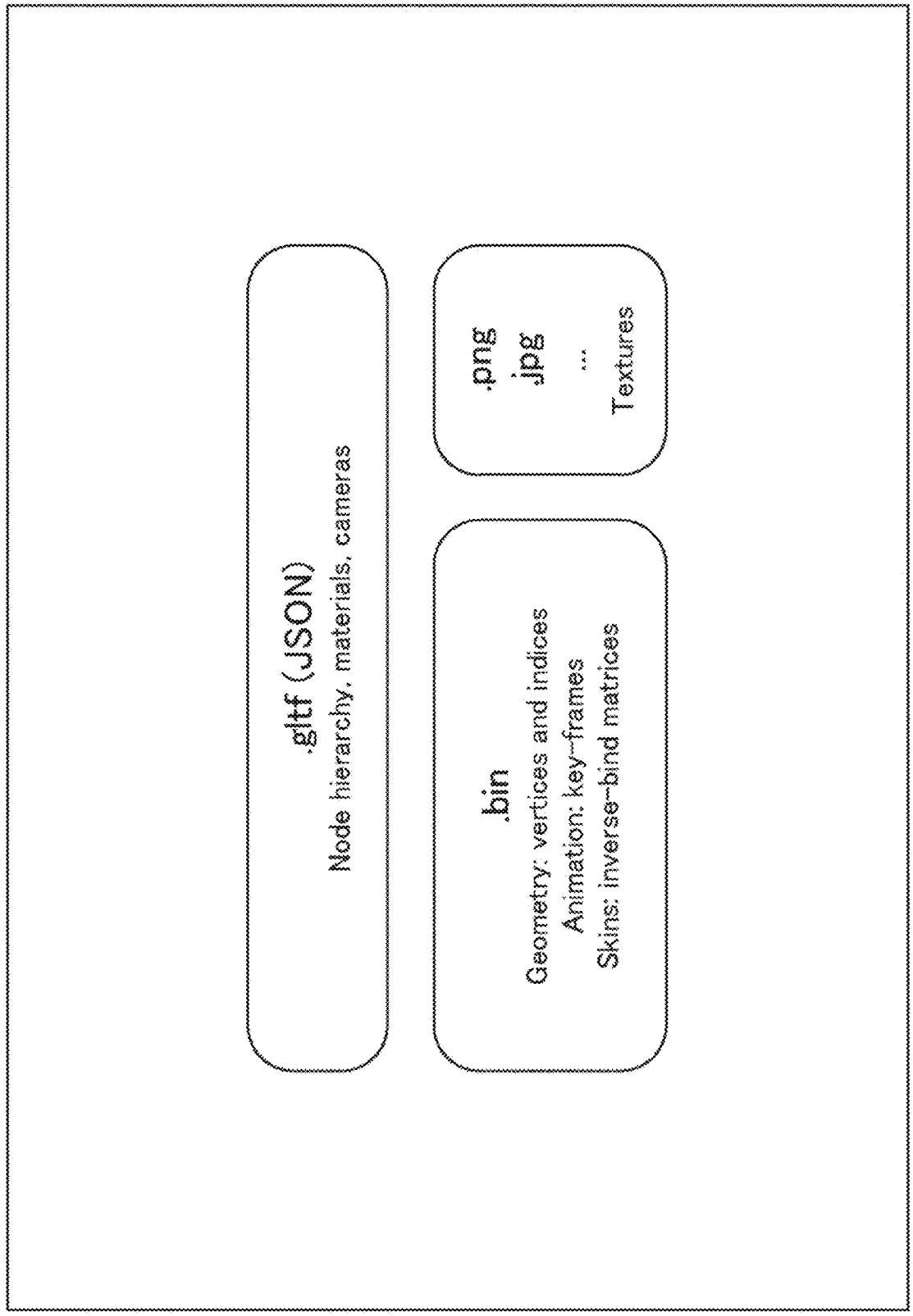
FIG. 1 is a diagram illustrating a principal configuration example of glTF 2.0.

There has thus far been the GL Transmission Format (glTF) (registered trademark) 2.0, which is a format for placing three-dimensional (3D) objects in a three-dimensional space, as described in NPL 1, for example. As illustrated in FIG. 1, for example, glTF2.0 is configured of a JSON format file (.glTF), a binary file (.bin), and an image file (.png, .jpg, or the like). The binary file stores binary data such as geometry and animations. The image file stores data such as textures and the like.

The JSON format file is a scene description file described in JavaScript (registered trademark) Object Notation (JSON). The scene description is metadata describing (description of) a scene of 3D content. The scene description defines what kind of scene the scene is. The scene description file is a file storing such scene description. In the present disclosure, the scene description file may also be called a "scene description file".

The description of a JSON format file is constituted by a sequence of pair of keys and values. The following is an example of the format.

"KEY":"VALUE"

The key is constituted by a character sequence. The value is constituted by a number sequence, a character sequence, a Boolean value, an array, an object, null, or the like.

Also, it is possible to integrate a pair of a plurality of keys and values ("KEY": "VALUE") by using { }. (curly brackets). The content within such curly brackets is also called a JSON object. The following is an example of the format.

"user":[{"id": 1, "name":"tanaka"}

In the case of this example, as a value corresponding to the key (user), a JSON object obtained by integrating a pair of "id":1 and a pair of "name":"tanaka" is defined.

Zero or more values can also be arrayed using [and] (square brackets). This array is also called a "JSON array". For example, a JSON object can be applied as an element of this JSON array. The following is an example of this format.

test": ["hoge", "fuga", "bar"]
"users": [{"id": 1, "name":" tanaka"},{"id": 2, "name":" yamada"},{"id": 3, "name":" sato"}]

Figure 2:
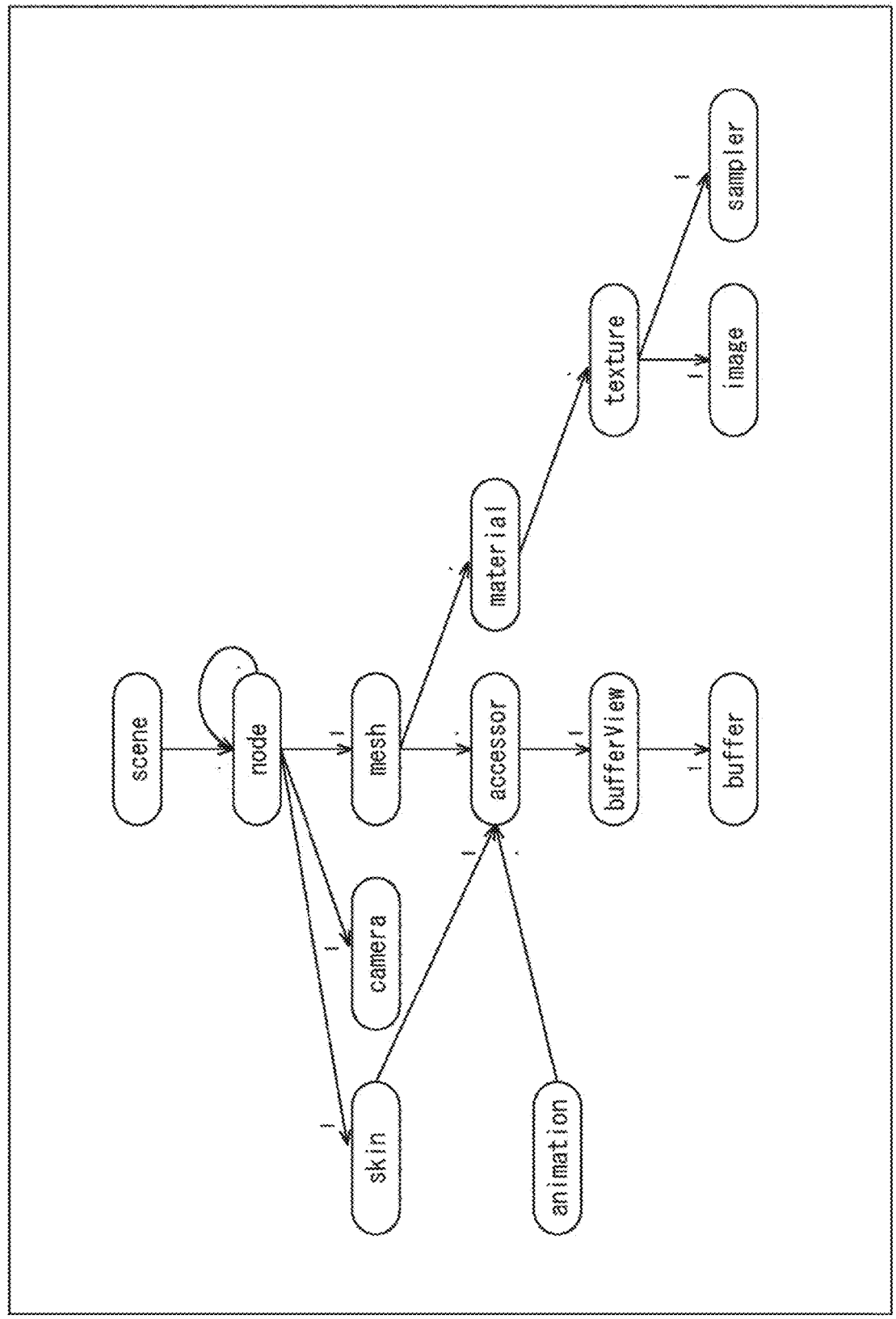
FIG. 2 is a diagram illustrating an example of a glTF object and a reference relationship.

The glTF objects that can be written at the top level of a JSON format file and the reference relationships thereof are illustrated in FIG. 2. The ovals in the tree structure illustrated in FIG. 2 indicate the objects, and the arrows between the objects indicate the reference relationships. As illustrated in FIG. 2, objects such as "scene", "node", "mesh", "camera", "skin", "material", and "texture" are written at the top level of the JSON format file.

An example of description of such a JSON format file (scene description) is illustrated in FIG. 3. A JSON format file 20 in FIG. 3 illustrates an example of description of a part of the top level. In the JSON format file 20, all the used top-level objects 21 are written at the top level. The top level objects 21 are glTF objects illustrated in FIG. 2. Also, reference relationships among the objects are illustrated as illustrated by the arrows 22 in the JSON format file 20. More specifically, the reference relationships are illustrated by properties of higher objects designating indexes of elements of arrays of the objects to be referred to.

Figure 4:
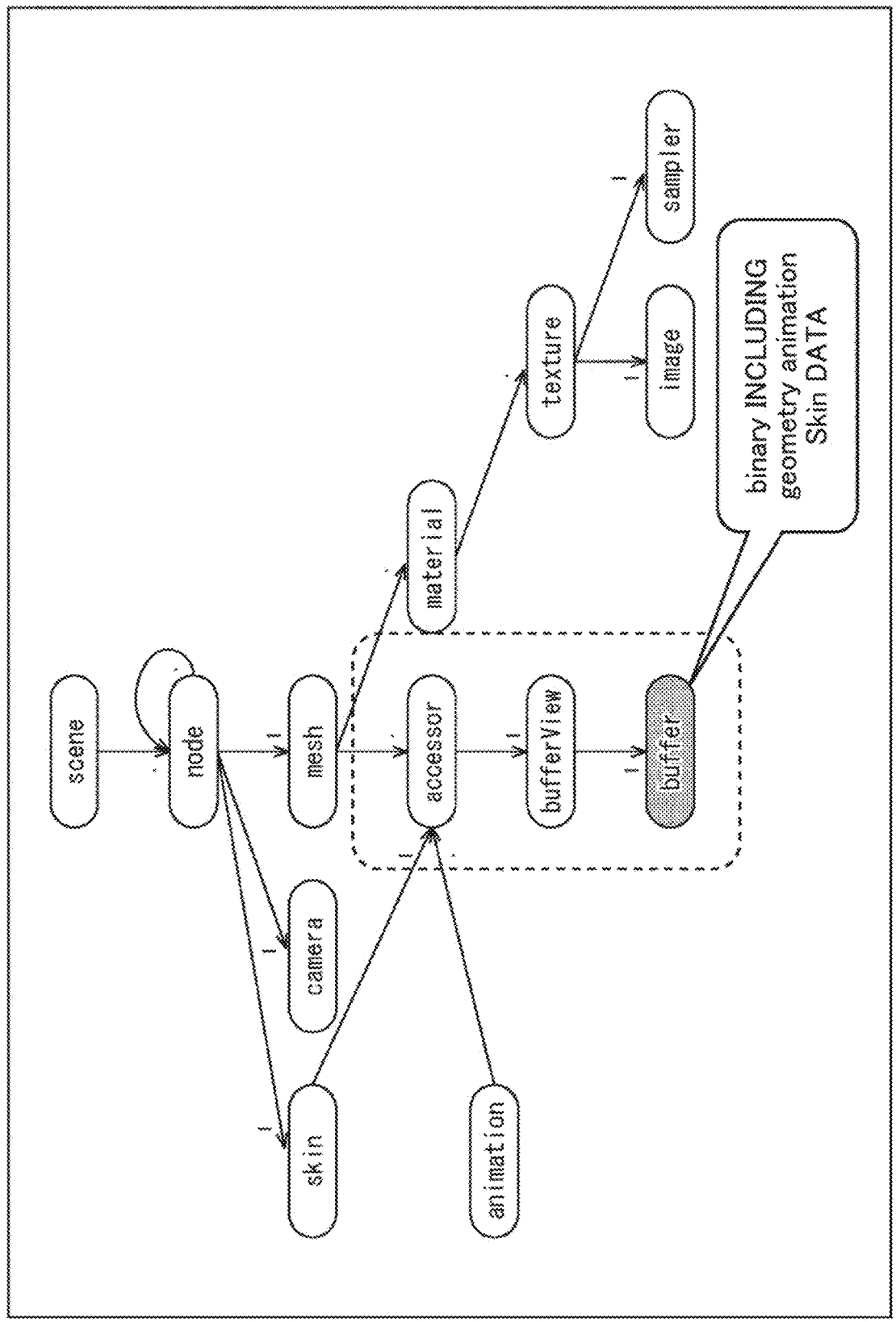
FIG. 4 is a diagram illustrating a method for accessing binary data.

FIG. 4 is a diagram for explaining a method for accessing binary data. As illustrated in FIG. 4, the binary data is stored in a buffer object (buffer object). In other words, information (for example, a uniform resource identifier (URI) or the like) for accessing binary data is indicated in the buffer object. In the JSON format file, it is possible to establish an access from an object such as a mesh, a camera, or a skin, for example, to the buffer object via an accessor object and a buffer view object (bufferView object) as illustrated in FIG. 4.

In other words, an accessor object to be referred to is designated in an object such as a mesh, a camera, or a skin. A description example of a mesh object (mesh) in the JSON format file is illustrated in FIG. 5. For example, attributes at vertexes such as NORMAL, POSITION, TANGENT, and TEXCORD_0 are defined as keys, and an accessor object to be referred to is designated as a value for each attribute in the mesh object as illustrated in FIG. 5.

Figure 6:
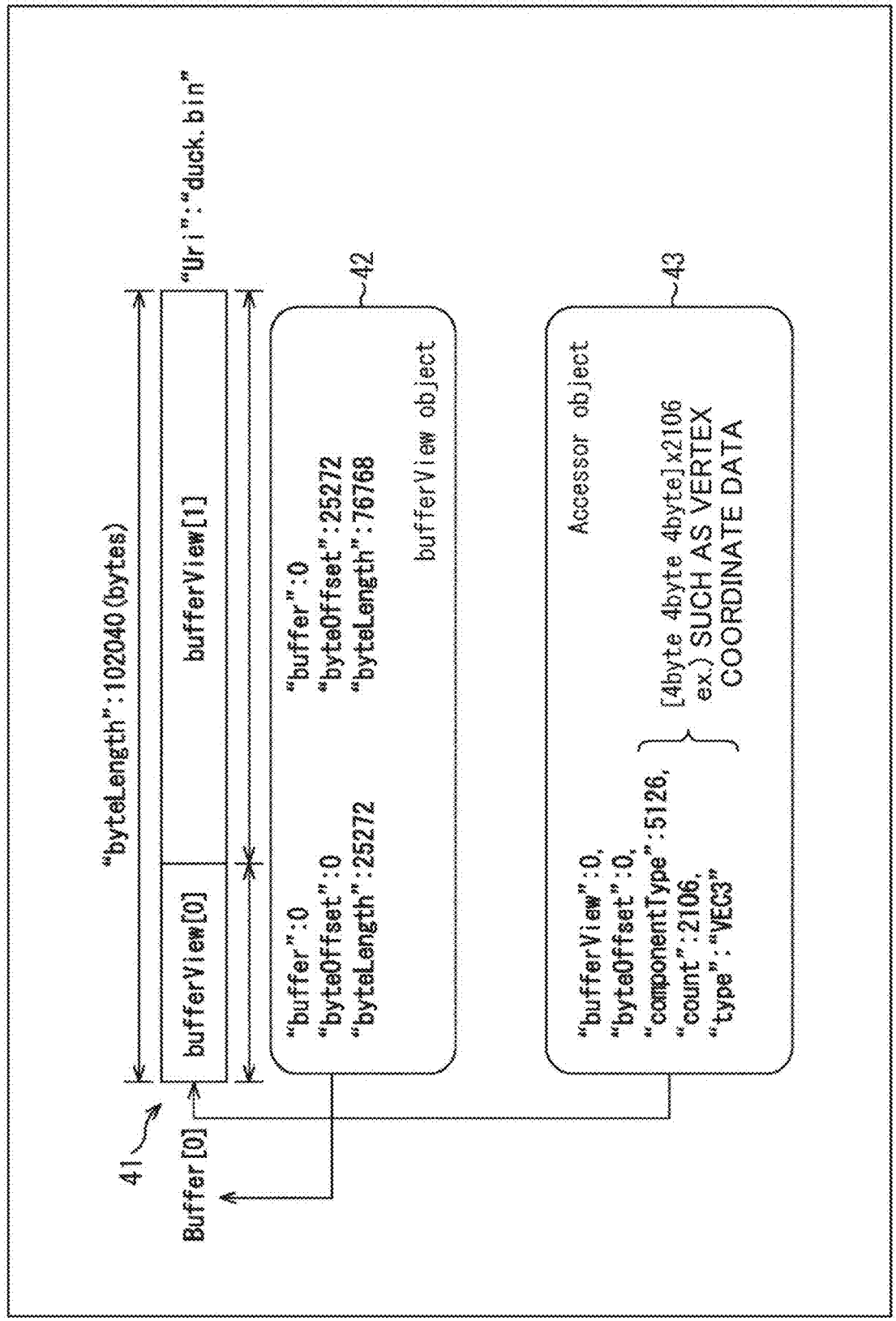
FIG. 6 is a diagram illustrating a relationship among a buffer object, a buffer view object, and an accessor object.

A relationship among buffer objects, buffer view objects, and accessor objects is illustrated in FIG. 6. Additionally, a description example of these objects in the JSON format file is illustrated in FIG. 7.

In FIG. 6, a buffer object 41 is an object storing information (such as a URI) for accessing binary data that is actual data and information indicating a data length (for example, a byte length) of the binary data. A of FIG. 7 illustrates a description example of the buffer object 41. ""bytelength": 102040" illustrated in A of FIG. 7 indicates that the byte length of the buffer object 41 is 102040 bytes as illustrated in FIG. 6. Additionally, the ""uri":"duck.bin"" in A of FIG. 7 indicates that the URI of the buffer object 41, as illustrated in FIG. 6, is "duck.bin".

In FIG. 6, a buffer view object 42 is an object storing information (that is, information regarding a partial region of the buffer object 41) regarding a subset region of binary data designated in the buffer object 41. B of FIG. 7 illustrates a description example of the buffer view object 42. As illustrated in FIG. 6 and B of FIG. 7, the buffer view object 42 stores information such as identification information of the buffer object 41 to which the buffer view object 42 belongs, an offset (for example, a byte offset) indicating the position of the buffer view object 42 inside the buffer object 41, and a length (for example, a byte length) indicating the data length (for example, a byte length) of the buffer view object 42.

In a case where a plurality of buffer view objects are present as illustrated in B of FIG. 7, information is written for each buffer view object (that is, for each subset region). For example, information illustrated on the upper side in B of FIG. 7, such as ""buffer": 0", ""bytelength": 25272", and ""byteOffset": 0", is information regarding the first buffer view object 42 (bufferView[0]) illustrated in the buffer object 41 in FIG. 6. Also, information illustrated on the lower side in B of FIG. 7, such as ""buffer": 0", ""byte-length": 76768", and ""byteOffset": 25272", is information regarding the second buffer view object 42 (bufferView[1]) illustrated in the buffer object 41 in FIG. 6.

""buffer": 0" of the first buffer view object 42 (bufferView [0]) illustrated in B of FIG. 7 indicates that identification information of the buffer object 41 to which the buffer view object 42 (bufferView[0]) belongs is "0" (Buffer[0]) as illustrated in FIG. 6. Also, ""bytelength": 25272" indicates that the byte length of the buffer view object 42 (bufferView [0]) is 25272 bytes. Moreover, ""byteOffset": 0" indicates that the byte offset of the buffer view object 42 (bufferView [0]) is 0 bytes.

""buffer": 0" of the second buffer view object 42 (buffer-View[1]) illustrated in B of FIG. 7 indicates that identification information of the buffer object 41 to which the buffer view object 42 (bufferView[0]) belongs is "0" (Buffer[0]) as illustrated in FIG. 6. Also, ""bytelength": 76768" indicates that the byte length of the buffer view object 42 (bufferView [0]) is 76768 bytes. Moreover, ""byteOffset": 25272" indicates that the byte offset of the buffer view object 42 (bufferView[0]) is 25272 bytes.

In FIG. 6, the accessor object 43 is an object storing information regarding a method of interpreting data of the buffer view object 42. C of FIG. 7 illustrates a description example of the accessor object 43. As illustrated in FIG. 6 and C of FIG. 7, the accessor object 43 stores information such as identification information of the buffer view object 42 to which the accessor object 43 belongs to, an offset (for example, a byte offset) indicating the position of the buffer view object 42 in the buffer object 41, a component type of the buffer view object 42, the number of pieces of data stored in the buffer view object 42, and the type of data stored in the buffer view object 42, for example. This information is written for each buffer view object.

In the example in C of FIG. 7, information such as ""bufferView":0", ""byteOffset":0", ""componentType": 5126", ""count":2106", ""type":"VEC3"", and the like is indicated. As illustrated in FIG. 6, ""bufferView":0" indicates that the identification information of the buffer view object 42 to which the accessor object 43 belongs is "0" (bufferView[0]). Also, ""byteOffset":0" indicates that the byte offset of the buffer view object 42 (bufferView[0]) is 0 bytes. Moreover, ""componentType":5126" indicates that the component type is a FLOAT type (OpenGL macro constant). Also, ""count":2106" indicates that the number of pieces of data stored in the buffer view object 42 (buffer-View[0]) is 2106. Furthermore, ""type":"VEC3"" indicates that (the type of) data stored in the buffer view object 42 (bufferView[0]) is a three-dimensional vector.

All access to data aside from the image is defined by referring to this accessor object 43 (by designating an accessor index).

Next, a method for designating a 3D object of a point cloud in such scene description according to glTF2.0 (JSON format file) will be described. The point cloud is 3D content expressing a stereoscopic structure (an object with a three-dimensional shape) as a group of multiple points. The data of the point cloud is configured of position information (also referred to as geometry) and attribute information (also referred to as attribute) of each point. The attributes can include any information. For example, color information, reflectance information, or normal line information of each point may be included in the attributes. Thus, the point cloud has a relatively simple data structure and can represent any three-dimensional structure with sufficient accuracy by using a sufficiently large number of points.

Figure 8:
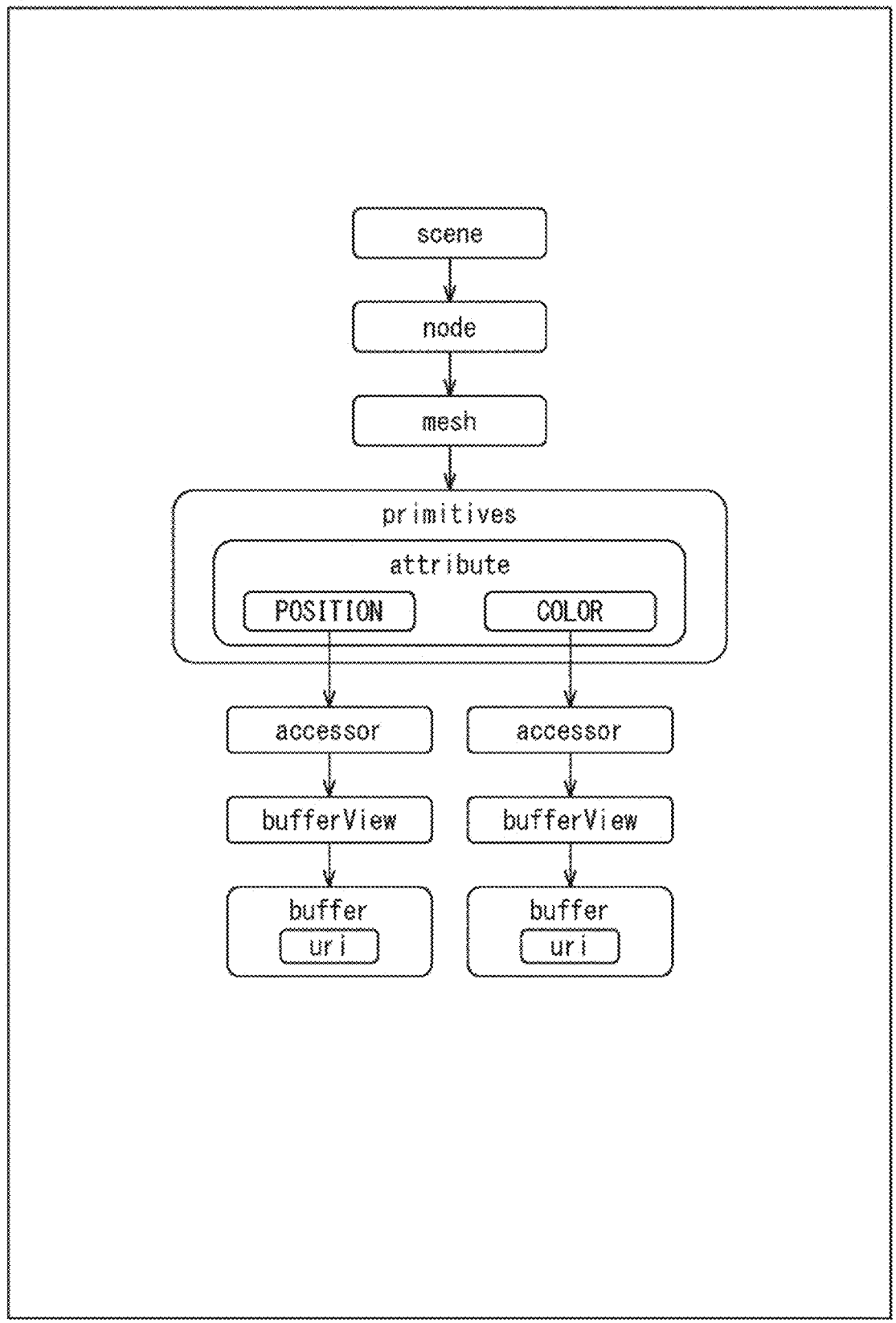
FIG. 8 is a diagram for explaining a configuration example of an object for scene description.

In a case where the point cloud does not change in a time direction (also referred to "static"), the 3D object is designated by using a mesh.primitives object in glTF2.0. FIG. 8 is a diagram illustrating a configuration example of an object of scene description in a case where the point cloud is static. FIG. 9 is a view illustrating a description example of the scene description.

As illustrated in FIG. 9, a mode of the primitives object is designated as 0 indicating that the data is handled as a point of the point cloud. As illustrated in FIGS. 8 and 9, an accessor to a buffer storing position information of the point is designated in a position property (POSITION property) of the attributes object in mesh.primitives. Similarly, an accessor to a buffer storing color information of the point is designated in a color property (COLOR property) of the attributes object. The numbers of buffers and the buffer views (bufferView) may be one (the data may be stored in one file).

Next, extension of the object of such scene description will be described. Each object of glTF2.0 can store an object newly defined in an extension object. FIG. 10 illustrates a description example in a case where the newly defined object (ExtensionExample) is defined. In a case where newly defined extension is used as illustrated in FIG. 10, an extension object name (ExtensionExample in the case of the example in FIG. 10) is written in "extensionUsed" and "extensionRequired". This indicates that the extension is extension to be used or an extension necessary for loading.

Figure 11:
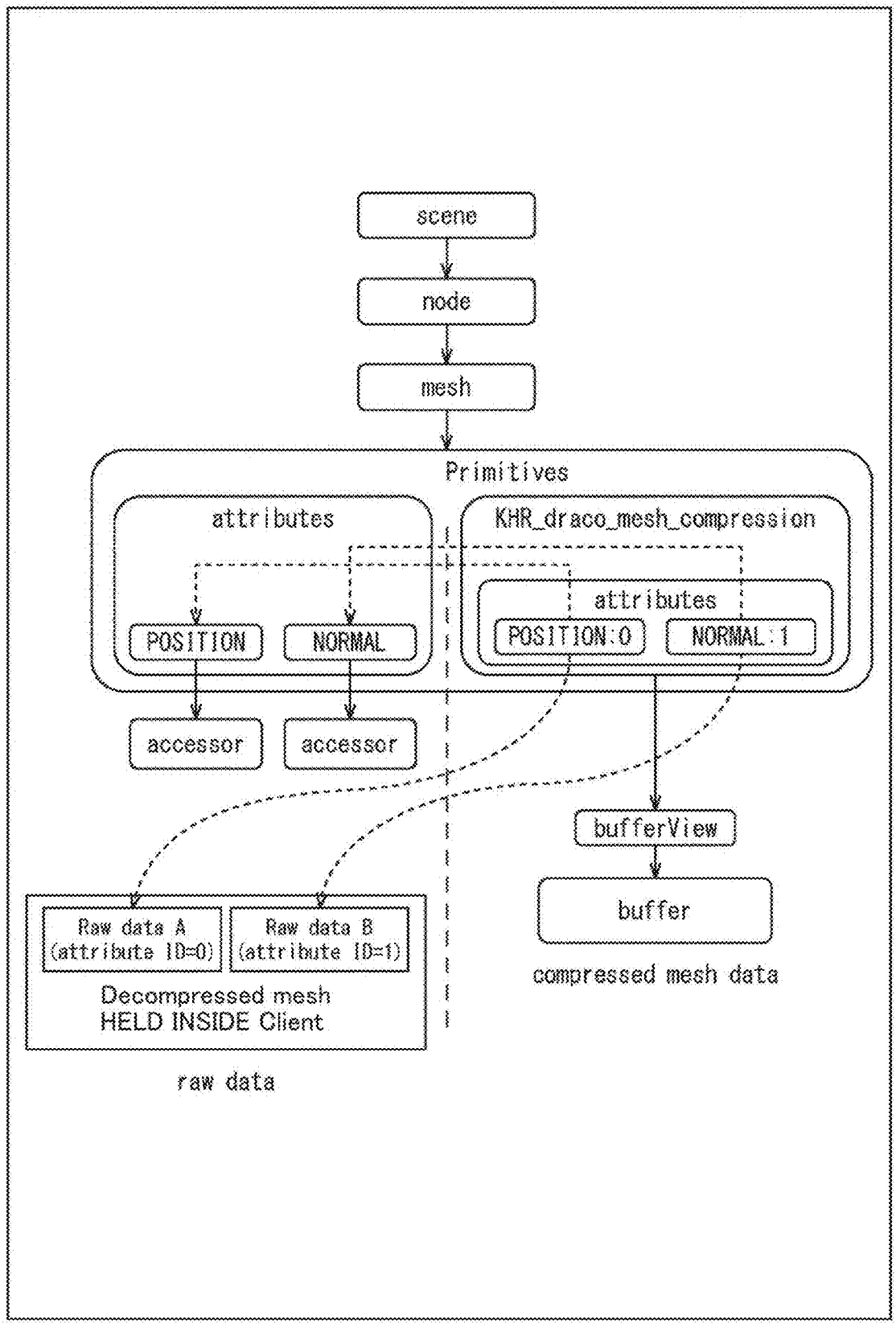
FIG. 11 is a diagram for explaining a configuration example of an object for scene description.

An extension example of the object will be described. FIG. 11 is a diagram illustrating a configuration example of an object in scene description in a case where extension is defined in mesh.primitives. As illustrated in FIG. 11, an HKR_draco_mesh_compression extension object is defined in mesh.primitives in this example. HKR_draco_mesh_compression extension is an extension object to use draco mesh-compressed mesh data as data of the mesh object in glTF. Draco is one mesh encoding scheme.

Figure 12:
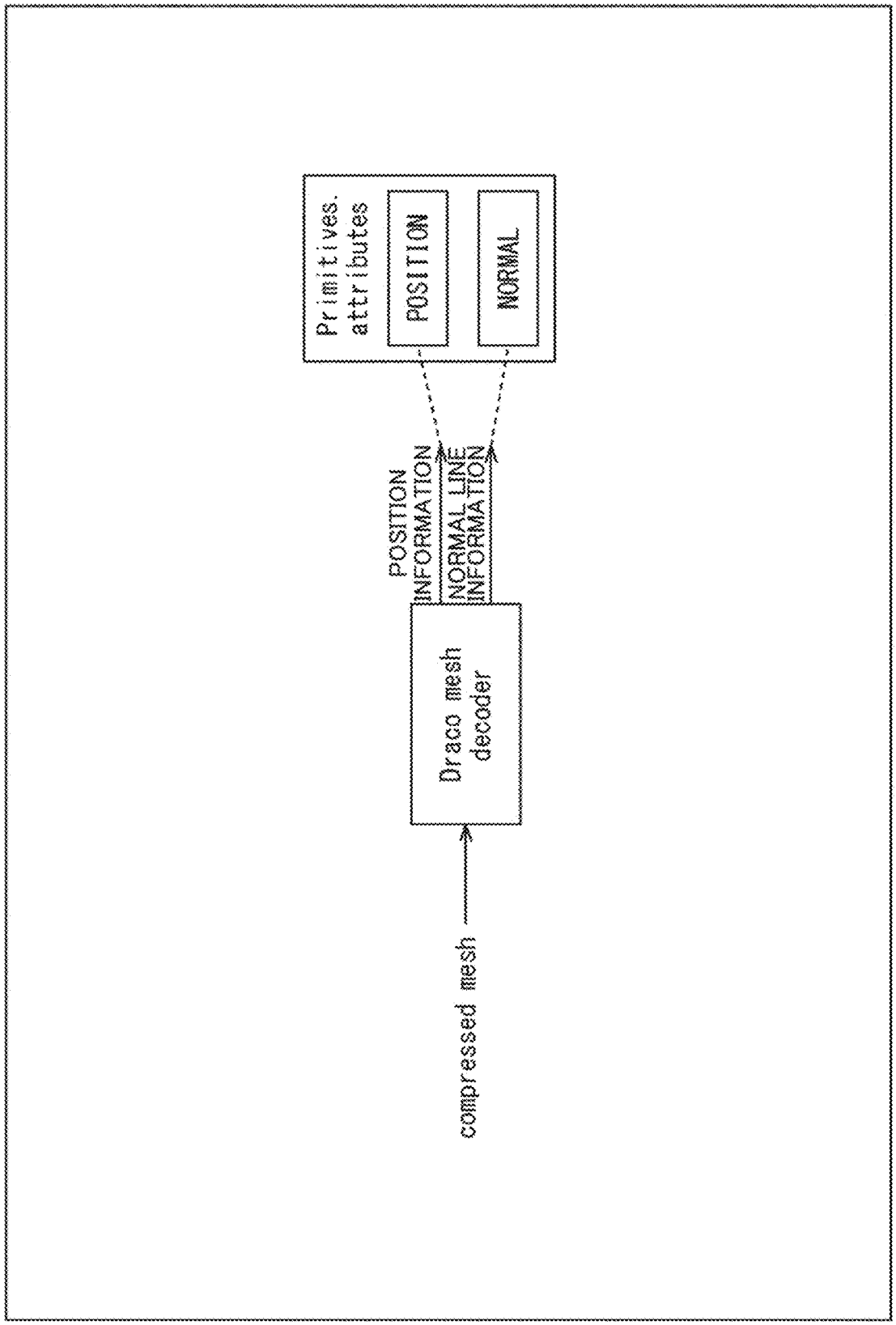
FIG. 12 is a diagram for explaining signal content of KHR_draco_mesh_compression.

HKR_draco_mesh_compression extension stores a property (bufferView) that designates compression data (compressed data). As illustrated in FIG. 12, the decoding unit (draco mesh decoder) can obtain compressed data on the basis of the information. Also, HKR_draco_mesh_compression extension stores an object (attributes) with associated information to use a plurality of pieces of attribute data (raw data A, B) obtained by decoding (decompressing) the compressed data as attribute data indicated by primitives.attributes in glTF. As a name of the property of the attribute, the same name as that of the property in primitives.attributes is used. Also, as a value of the property, an attribute ID value of mesh data handled inside the decoding unit (draco mesh decoder) is set. FIG. 13 is a diagram illustrating a description example of the mesh object.

Client Processing

Processing by the client device in the MPEG-I Scene Description will be described next. The client device obtains the scene description, obtains the data of a 3D object based on that scene description, and then generates a display image using that scene description, the data of the 3D object, and the like.

Figure 14:
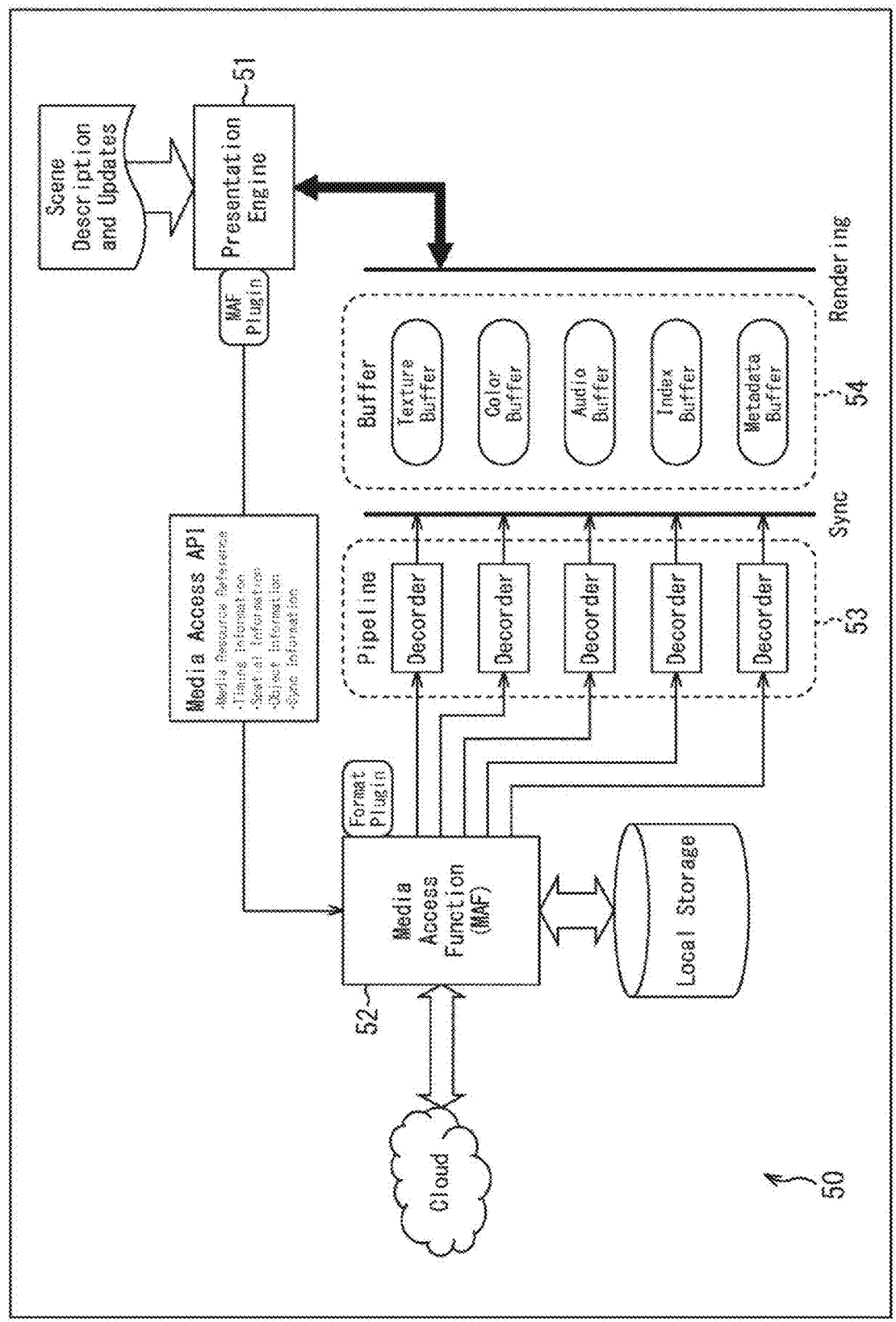
FIG. 14 is a diagram for explaining a configuration of client processing.

As described in NPL 2, the presentation engine, the media access function, and the like perform processing in the client device. As illustrated in FIG. 14, for example, the presentation engine 51 of the client device 50 obtains information (hereinafter, also referred to as updating information) for updating an initial value of scene description and the scene description and generates scene description at a processing target clock time. Then, the presentation engine 51 analyzes the scene description and specifies media (a video, sound, and the like) to be reproduced. Then, the presentation engine 51 requests to obtain the media from the media access function 52 via a media access application program interface (API). The presentation engine 51 also makes settings for pipeline processing, designates buffers, and the like.

The media access function 52 obtains various kinds of data of the media requested by the presentation engine 51 from a cloud, a local storage, and the like. The media access function 52 supplies various kinds of data (encoded data) of the obtained media to the pipeline 53.

The pipeline 53 decodes the various types of data (encoded data) in the supplied media through pipeline processing, and supplies the decoding result to a buffer 54. The buffer 54 holds the various types of data in the supplied media.

The presentation engine 51 performs rendering and the like using the various types of data in the medium held in the buffer 54.

Application of Timed Media

In recent years, extending glTF2.0 in MPEG-I Scene Description and applying timed media as 3D object content as described in NPL 2, for example, have been examined. The timed media is media data that changes in a time axis direction like a video of a two-dimensional image.

Only stationary image data can be applied as media data (3D object content) to glTF. In other words, glTF has not been compatible with media data of videos. In a case where a 3D object is moved, animation (a method of switching stationary images along a time axis) has been applied.

In MPEG-I Scene Description, applying glTF2.0, applying a JSON format file as scene description, and extending glTF such that timed media (for example, video data) can be handled as media data have been examined. In order to handle timed media, extension is performed as follows, for example.

Figure 15:
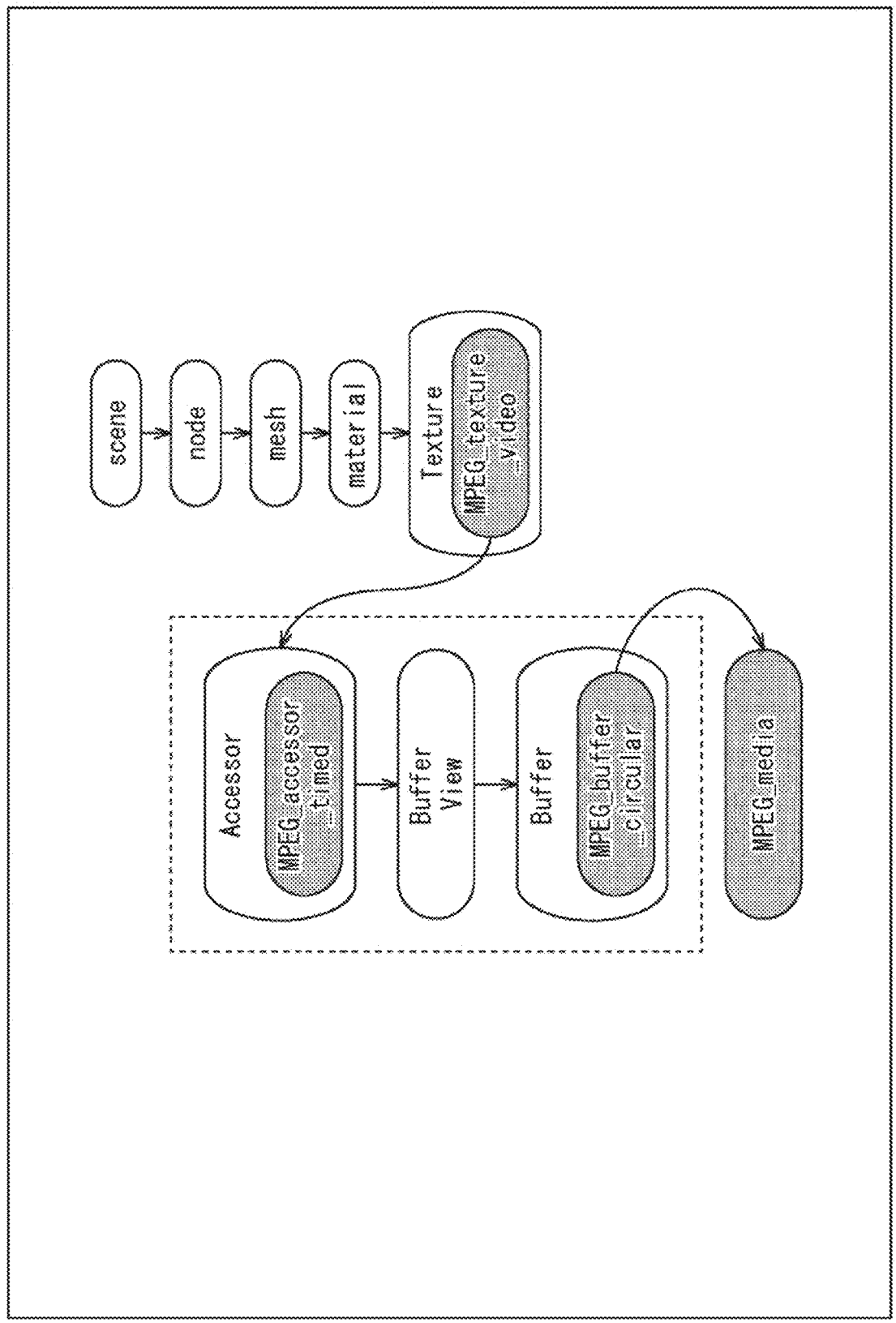
FIG. 15 is a diagram illustrating a configuration example of extension to handle timed metadata.

FIG. 15 is a diagram for explaining extension to handle timed media. In the example in FIG. 15, an MPEG media object (MPEG-media) is extension of glTF and an object that designates attributes of the MPEG media such as video data, including a uri, a track, renderingRate, and startTime, for example.

Also, an MPEG texture video object (MPEG_texture_video) is provided as an extension object (extensions) of a texture object (texture) as illustrated in FIG. 15. The MPEG texture video object stores information regarding an accessor corresponding to a buffer object to be accessed. In other words, the MPEG texture video object is an object that designates an index of an accessor corresponding to a buffer in which texture media designated by the MPEG media object (MPEG media) is stored in a decoded manner.

FIG. 16 is a diagram illustrating a description example of an MPEG media object (MPEG_media) and an MPEG texture video object (MPEG_texture_video) in scene description for explaining extension to handle timed media. In the case of the example in FIG. 16, an MPEG texture video object (MPEG_texture_video) is set as an extension object (extensions) of the texture object (texture) as follows in the second row from the top. Also, an index ("2" in this case) of the accessor has been designated as a value of the MPEG video texture object.

```
"texture": [{"sampler": 0, "source": 1, "extensions":
     {"MPEG_texture_video ":" accessor": 2}}]
```

Also, in the case of the example in FIG. 16, an MPEG media object (MPEG media) is set as an extension object (extensions) of glTF as follows in the seventh to sixteenth rows from the top. Additionally, various kinds of information regarding the MPEG media object such as an encoding, a URI, and the like of the MPEG media object, for example, is stored as values of the MPEG media object.

```
"MPEG_media": {
   "media": [
      {"name":" source_1", "renderingRate": 30.0, "startTime": 9.0,
   "timeOffset": 0.0
        "loop":" true", "controls":" false",
        "alternatives": [{"mimeType":" video/mp4; codecs=¥"avc1.42E01E¥"",
   "uri":" video1.mp4",
           "tracks": [{"track":"# track_ID=1"}]
      }]
   }
   ]
}
```

Also, although each frame data is decoded and sequentially stored in the buffers, the position thereof varies, and a mechanism for storing the varying information and enabling a renderer to read the data is thus provided in the scene description. As illustrated in FIG. 15, for example, an MPEG buffer circular object (MPEG_buffer_circular) is provided as an extension object (extensions) of a buffer object (buffer). The MPEG buffer circular object stores information for dynamically storing data in the buffer object. For example, information such as information indicating the data length of the buffer header (bufferHeader) and information indicating the number of frames is stored in the MPEG buffer circular object. Note that the buffer header stores information such as an index and a time stamp and a data length of stored frame data, for example.

Also, as illustrated in FIG. 15, an MPEG accessor timed object (MPEG_timed_accessor) is provided as an extension object (extensions) of an accessor object (accessor). In this case, since media data is a video, a buffer view object (bufferView) to be referred to in the time direction may vary (the position may vary). Thus, information indicating the buffer view object to be referred to is stored in the MPEG accessor timed object. For example, information indicating reference to a buffer view object (bufferView) with a timed accessor information header (timedAccessor information header) described therein is stored in the MPEG accessor timed object. Note that the timed accessor information header is, for example, header information storing an accessor object that dynamically changes and information in the buffer view object.

FIG. 17 is a diagram illustrating a description example of an MPEG buffer circular object (MPEG_buffer_circular) and an MPEG accessor timed object (MPEG_accessor_timed) in scene description for explaining extension to handle timed media. In the case of the example in FIG. 17, an MPEG accessor timed object (MPEG_accessor_timed) is set as an extension object (extensions) of the accessor object (accessors) as follows in the fifth row from the top. Also, parameters such as an index of the buffer view object ("1" in this example), an update rate (updataRate), and immutable information and values thereof are designated as values of the MPEG accessor timed object.

"MPEG_accessor_timed": {"bufferView": 1, "updateRate": 25.0, "immutable": 1,"}

Additionally, in the case of the example in FIG. 17, an MPEG buffer circular object (MPEG_buffer_circular) is set as an extension object (extensions) of the buffer object (buffer) as follows in the thirteenth row from the top. Also, parameters such as a buffer frame count (count), a header length (headerLength), and an update rate (updataRate) and values thereof are set as values of the MPEG buffer circular object.

"MPEG_buffer_circular": {"count": 5, "headerLength": 12, "updateRate": 25.0}

Figure 18:
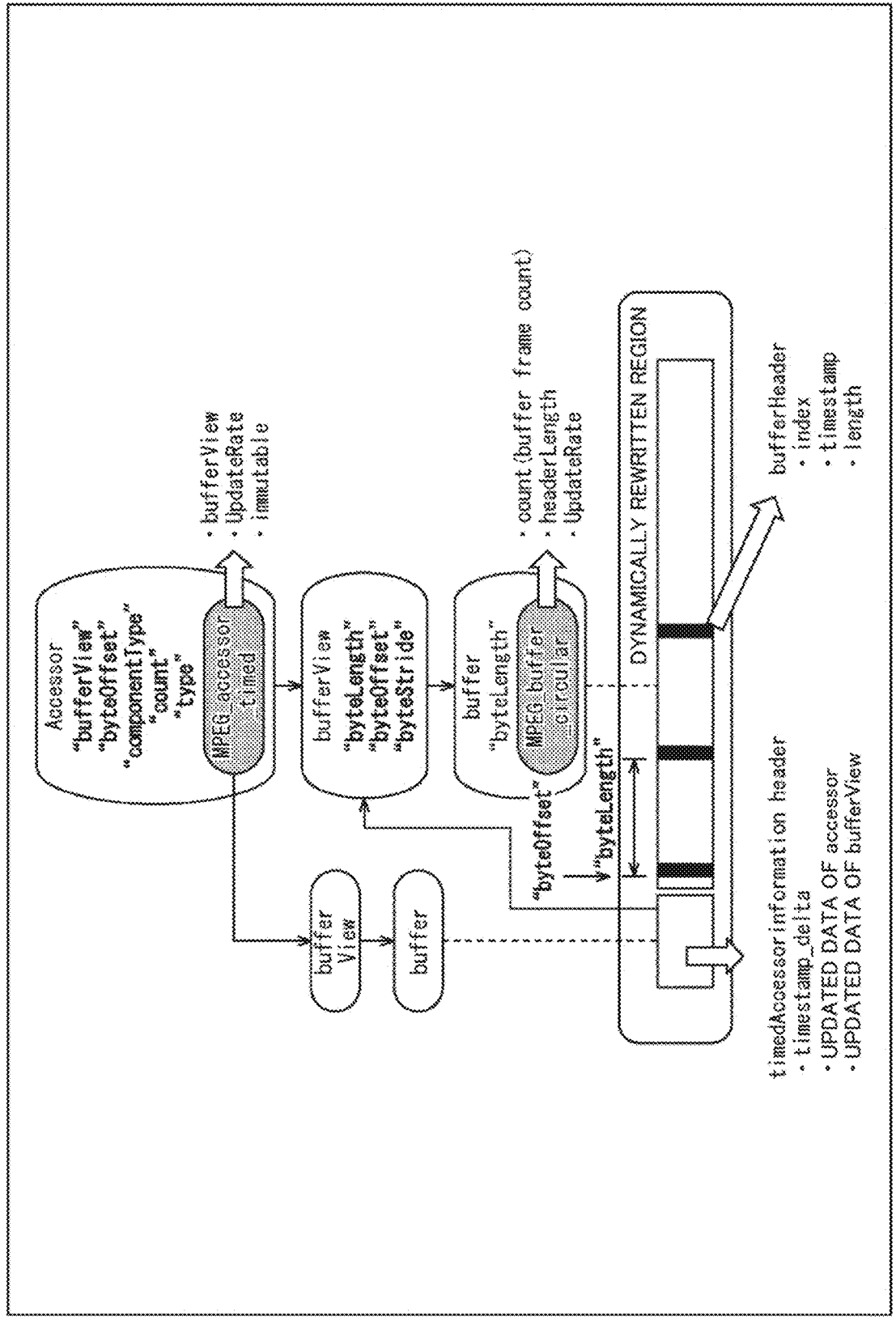
FIG. 18 is a diagram illustrating a configuration example of extension to handle timed metadata.

FIG. 18 is a diagram for explaining extension to handle timed media. FIG. 18 illustrates an example of a relationship among an MPEG accessor timed object, an MPEG buffer circular object, an accessor object, a buffer view object, and a buffer object.

The MPEG buffer circular object of the buffer object stores information necessary to store data that changes with time in a buffer region indicated by the buffer object, such as the buffer frame count (count), the header length (headerLength), and the update rate (updataRate) as described above. Also, the parameters such as the index, the time stamp (timestamp), and the data length (length) are stored in the buffer header (bufferHeader) that is a header of the buffer region.

The MPEG accessor timed object of the accessor object stores information regarding the buffer view object to be referred to, such as the index of the buffer view object (bufferView), the update rate (updataRate), and the immutable information as described above. Also, the MPEG accessor timed object stores information regarding the buffer view object storing the timed accessor information header to be referred to. The timed accessor information header may store time stamp delta (timestamp_delta), updated data of the accessor object, updated data of the buffer view object, and the like.

Client Processing During Utilization of MPEG_Texture_Video

The scene description is spatial arrangement information for arranging one or more 3D objects in a 3D space. The content of the scene description can be updated along the time axis. In other words, the arrangement of the 3D objects can be updated over time. The client processing performed by the client device at that time will be described.

Figure 19:
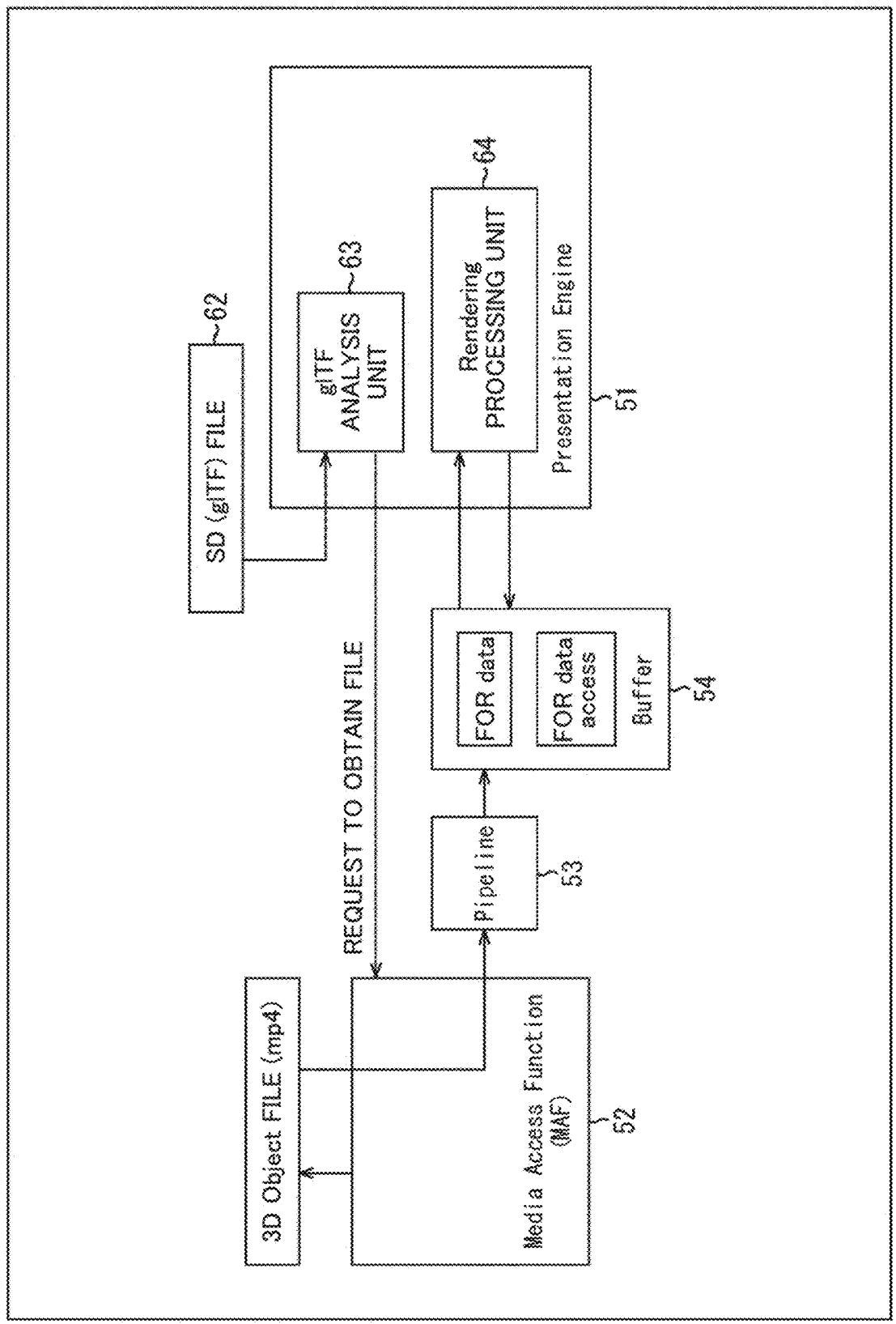
FIG. 19 is a diagram illustrating a principal configuration example of a client.
Figure 20:
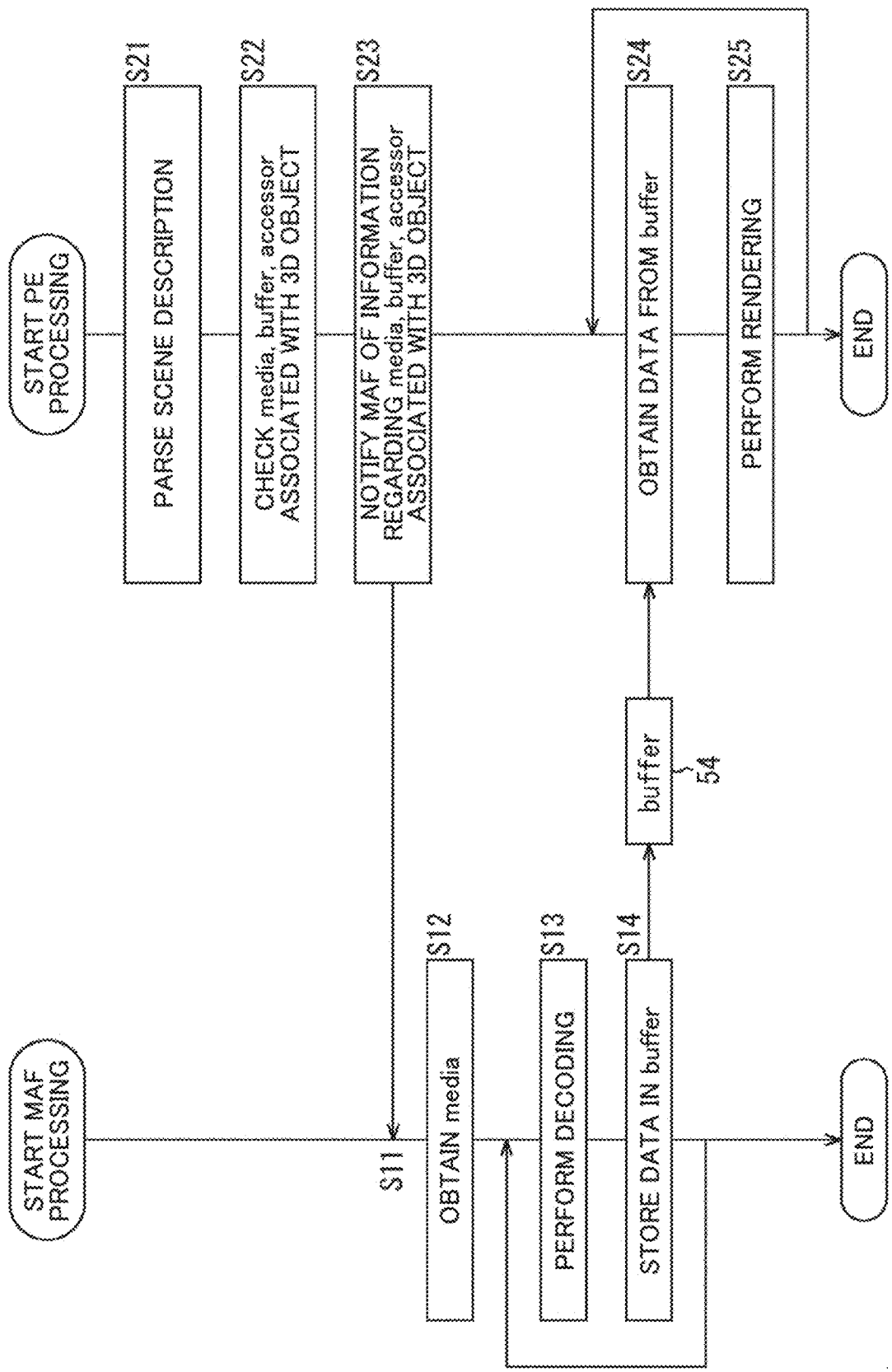
FIG. 20 is a flowchart for explaining an example of a flow of client processing.

FIG. 19 illustrates a principal configuration example regarding the client processing of the client device, and FIG. 20 is a flowchart illustrating an example of a flow of the client processing. As illustrated in FIG. 19, the client device includes a presentation engine (PresentationEngine (hereinafter, also referred to as PE)) 51, a media access function (MediaAccessFunction (hereinafter, also referred to as MAF)) 52, a pipeline 53, and a buffer 54.

Once the client processing starts, the glTF analysis unit 63 of the presentation engine (PE) 51 starts PE processing, obtains an SD (glTF) file 62 that is a scene description file and analyzes (parses) the scene description in Step S21.

In Step S22, the glTF analysis unit 63 checks media associated with the 3D object (texture), a buffer storing the medium after the processing, and an accessor. In Step S23, the glTF analysis unit 63 notifies the media access function 52 of the information as a file obtainment request.

The media access function (MAF) 52 starts MAF processing and obtains the notification thereof in Step S11. In Step S12, the media access function 52 obtains a medium (3D object file (mp4)) on the basis of the notification.

In Step S13, the media access function 52 decodes the obtained medium (3D object file (mp4)). In Step S14, the media access function 52 stores data of the medium obtained through the decoding in the buffer 54 on the basis of a notification from the presentation engine (PE 51).

In Step S24, the rendering processing unit 64 of the presentation engine 51 reads (obtains) the data from the buffer 54 at an appropriate timing. In Step S25, the rendering processing unit 64 performs rendering by using the obtained data and generates a display image.

The media access function 52 executes the processing at each clock time (each frame) by repeating the processing in Steps S13 and S14. Also, the rendering processing unit 64 of the presentation engine 51 executes the processing at each clock time (each frame) by repeating the processing in Steps S24 and S25. Once the processing for all the frames ends, the media access function 52 ends the MAF processing, and the presentation engine 51 ends the PE processing. In other words, the client processing ends.

Overview of V-PCC

Incidentally, Video based Point Cloud Compression (V-PCC) of segmenting a point cloud to form a region, performing plane projection for each region, and performing encoding by video codec has been proposed as an encoding scheme of a point cloud that is a group of points that have position information and attribute information (such as a color and reflectance) in a three-dimensional space at the same time as described in NPL 3, for example.

Figure 21:
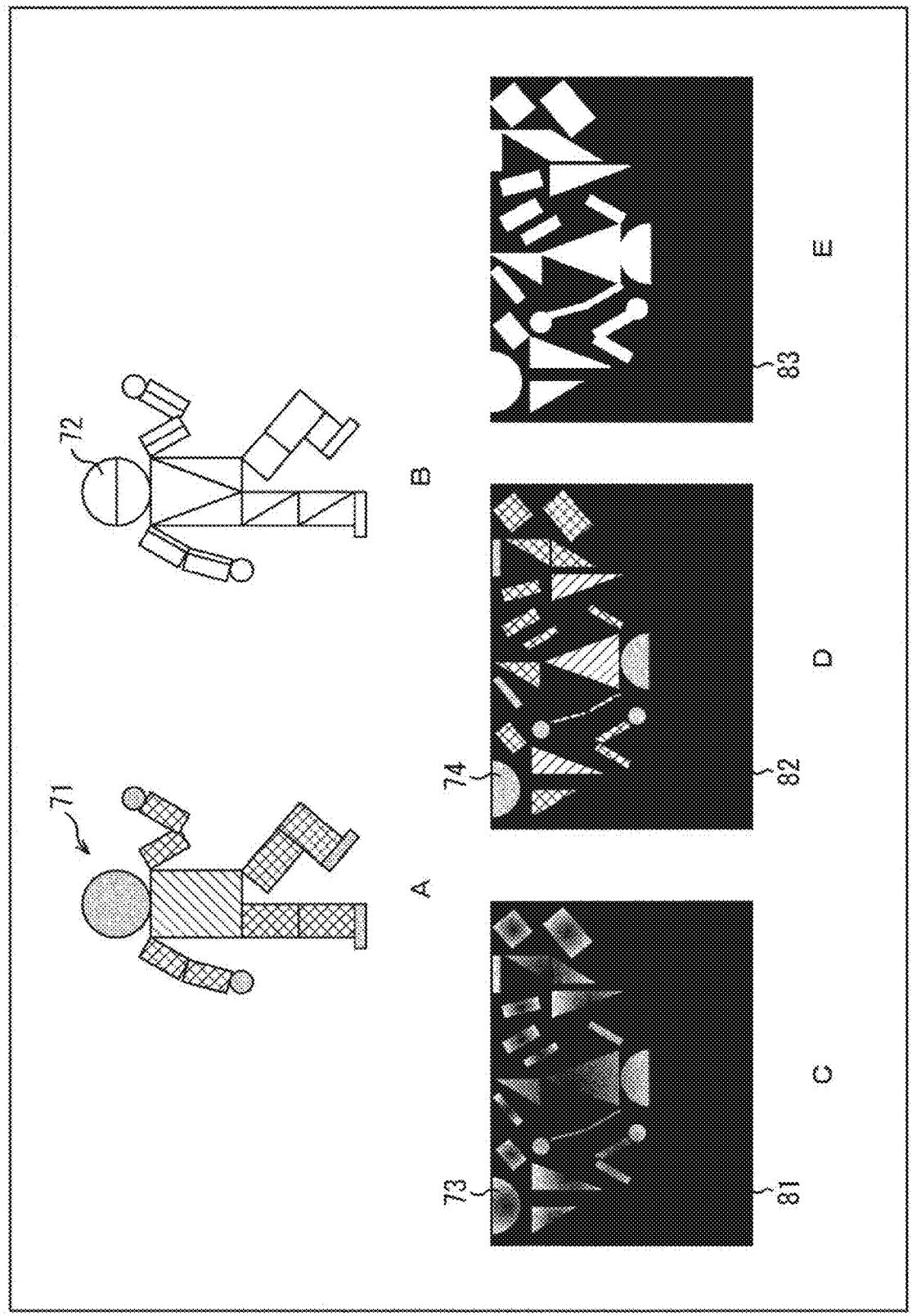
FIG. 21 is a diagram for explaining an outline of V-PCC.

In V-PCC, geometry and attributes of the point cloud are projected to a two-dimensional plane for each small region. In the present disclosure, the small region may be referred o as a partial region. An image in which the geometry and the attributes are projected to the two-dimensional plane will also be referred to as a projection image. Also, the projection image for each small region (partial region) will be referred to as a patch. For example, an object 71 (3D data) in A of FIG. 21 is decomposed into a patch 72 (2D data) as illustrated in B of FIG. 21. In the case of a patch of geometry, each pixel value indicates position information of a point. However, in that case, the position information of the point is expressed as position information (depth value (Depth)) in the vertical direction (depth direction) with respect to the projection plane.

Then, each patch that has been generated in this manner is then arranged within a frame image of a video sequence (also called a video frame). A frame image in which patches of the geometry have been arranged is also called geometry video frame. Further, a frame image in which patches of the attribute have been arranged is also called an attribute video frame. For example, a geometry video frame 81 in which a patch 73 of geometry as illustrated in C of FIG. 21 and an attribute video frame 82 in which the patch 74 of the attribute as illustrated in D of FIG. 21 is arranged are generated from the object 71 in A of FIG. 21. For example, each pixel value of the geometry video frame 81 indicates a depth value described above.

These video frames are encoded by using an encoding method for a two-dimensional image such as advanced video coding (AVC) or high efficiency video coding (HEVC). That is, it is possible to encode the point cloud data, which is 3D data representing a three-dimensional structure, using a codec for a two-dimensional image.

Note that it is also possible to use an occupancy map (also referred to as an occupancy map). The occupancy map is map information indicating presence/absence of a projection image (patch) for every N×N pixels of the geometry video frame and the attribute video frame. For example, a region where a patch is present (N×N pixels) is indicated by a value "1" and a region where no patch is present (N×N pixels) is indicated by a value "0" in the geometry video frame and the attribute video frame in the occupancy map.

The decoder can recognize where a region is a region with a patch including therein by referring to the occupancy map and thereby can curb influences of noise and the like occurring due to encoding and decoding and more accurately restore 3D data. For example, the decoder can ignore the depth value in the region where no patch is present by referring to the occupancy map even if the depth value changes due to coding and decoding. In other words, the decoder can avoid processing of position information of the 3D data by referring to the occupancy map.

For example, the occupancy map 83 as illustrated in E of FIG. 21 may be generated for the geometry video frame 11 and the attribute video frame 12. In the occupancy map 83, the white part indicates the value "1", and the black part indicates the value "0".

Such an occupancy map can be encoded as data (video frame) separate from the geometry video frame and the attribute video frame and can be transferred to the decoding side. In other words, it is also possible to encode the occupancy map by an encoding method for a two-dimensional image such as AVC or HEVC similarly to a geometry video frame and an attribute video frame.

Encoded data (bitstream) generated by encoding a geometry video frame will be also referred to as a geometry video sub-bitstream. Encoded data (bitstream) generated by encoding an attribute video frame will also be referred to as an attribute video sub-bitstream. Encoded data (bitstream) generated by encoding an occupancy map will also be referred to as an occupancy map video sub-bitstream. Note that the geometry video sub-bitstream, the attribute video sub-bitstream, and the occupancy map video sub-bitstream will be referred to as video sub-bitstreams when it is not necessary to describe them by distinguish them from each other.

Furthermore, atlas information (atlas) that is information for reconfiguring the point cloud (3D data) from the patch (2D data) is encoded and transmits to the decoding side. A method for encoding the atlas information (and decoding method) is arbitrary. Encoded data (bitstream) generated by encoding the atlas information will also be referred to as an atlas sub-bitstream.

Note that in the following description, it is assumed that (an object of) the point cloud can change in a direction of time (it is also referred to be dynamic), like a two-dimensional moving image. In other words, geometry data or attribute data has a concept of a time direction and is data sampled at predetermined time intervals, like a two-dimensional moving image. Data at each sampling time is called a frame, like a video frame of a two-dimensional image. In other words, it is assumed that the point cloud data (the geometry data or attribute data) consists of a plurality of frames, like a two-dimensional moving image. In the present disclosure, a frame of this point cloud is also referred to as a point cloud frame. In the case of V-PCC, it is possible to perform encoding with high efficiency using a moving image encoding scheme by converting each point cloud frame into a video frame to obtain a video sequence even in such a point cloud of a video image (a plurality of frames).

Storing Method in ISOBMFF

Also, a method for storing, in ISOBMFF, a V3C bitstream configured of encoded data of a point cloud which is encoded by V-PCC has been examined as described in NPL 4, for example. NPL 4 defines two types of methods for storing the V3C bitstream in ISOBMFF, namely a single-track structure and a multi-track structure.

The single-track structure is a method of storing the V3C bitstream in a single track. In other words, a geometry video sub-bitstream, an attribute video sub-bitstream, an occupancy map video sub-bitstream, and an atlas sub-bitstream are stored in the same track.

Figure 22:
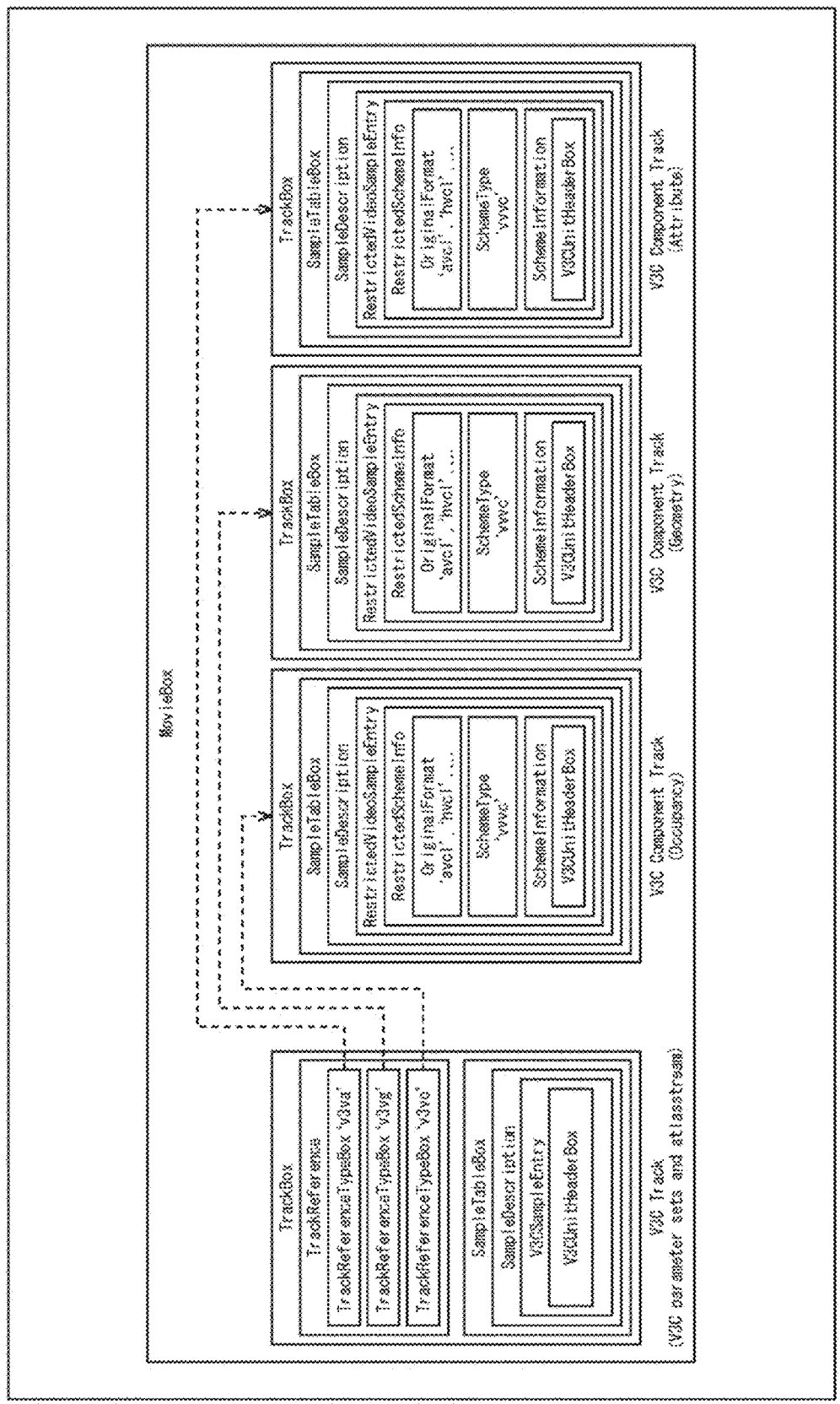
FIG. 22 is a diagram illustrating an example of a structure of ISOBMFF storing a V3C bitstream.

The multi-track structure is a method of storing a geometry video sub-bitstream, an attribute video sub-bitstream, an occupancy video sub-bitstream, and an atlas sub-bitstream are stored in the individual tracks. Since each video sub-bitstream is a conventional 2D video stream, each video sub-bitstream can be stored (managed) by a method similar to that in the case of 2D. A configuration example of a file in a case where the multi-track structure is applied is illustrated in FIG. 22. As illustrated in FIG. 22, a track reference that is information for accessing other tracks (also referred to as component tracks) storing a V3C bitstream is stored in one track (V3C track) in the case of the multi-track structure. In other words, each component track is associated with the V3C track by the track reference.

Figure 23:
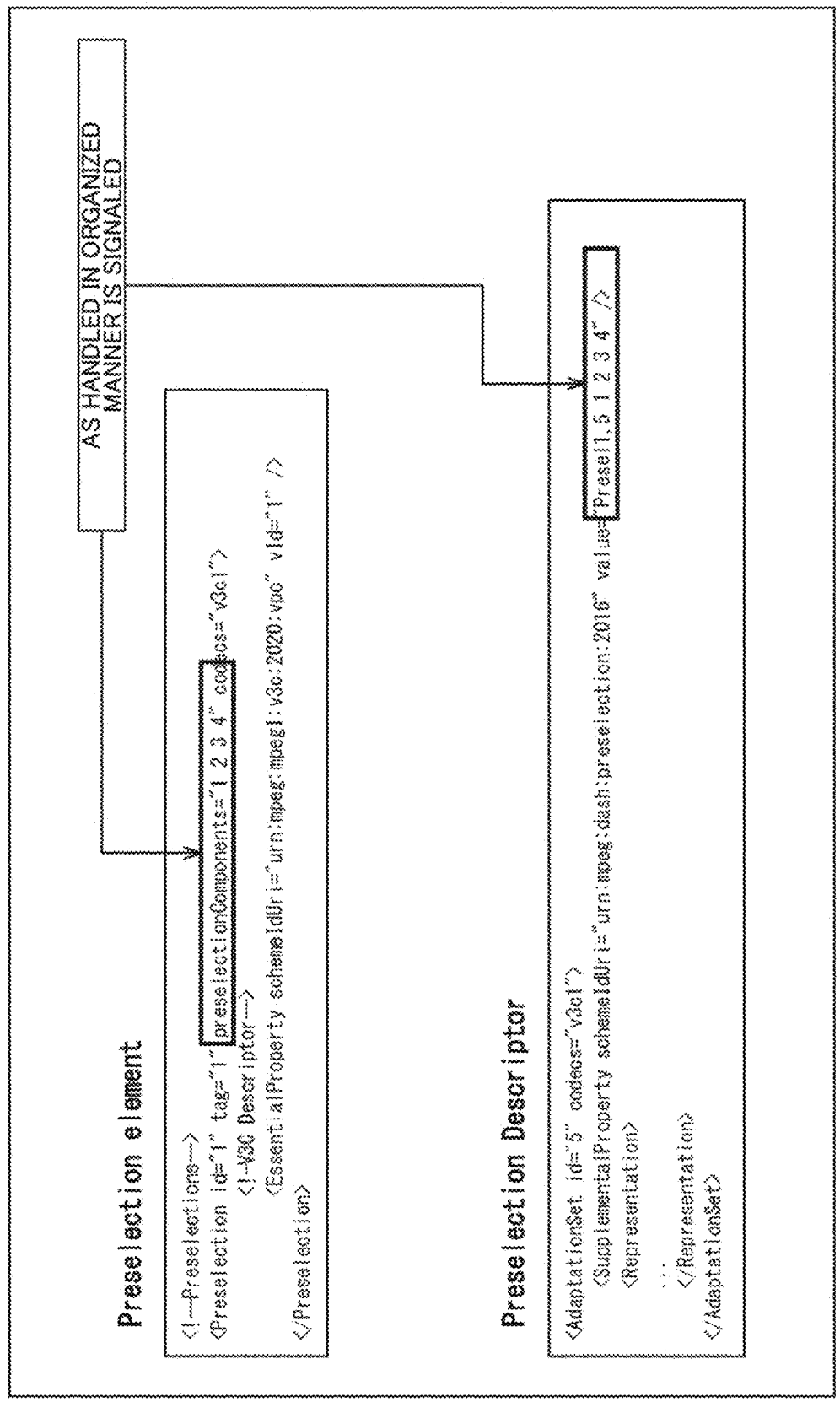
FIG. 23 is a diagram illustrating an example of track designation by MPD.

Note that in a case where the 3D object content is distributed by applying Moving Picture Experts Group Dynamic Adaptive Streaming over Hypertext Transfer Protocol (HTTP) (MPEG-DASH)), a preselection element and a preselection descriptor may be stored as information for organizing AdaptationSet configuring V-PCC in the media presentation description (MPD) that is a control file for controlling the distribution. FIG. 23 illustrates the description example. In other words, each bitstream configuring the V3C bitstream is associated with each other by the information of MPD.

Track Information

An MPEG media object (MPEG_media) of scene description stores information for obtaining data (V3C bitstream) of the 3D object content. For example, information that designates, by uri, a file (for example, an MP4 file) storing the V3C bitstream or a control file (for example, MPD) for controlling distribution of the V3C bitstream is stored. Also, track information (tracks array) that designates, as a reference target, a track storing the V3C bitstream is stored. The track information designates a track as a reference target by using identification information (track ID) (AdaptationSet ID in a case of MPD) of the track in a track property.

FIG. 24 is a diagram illustrating a description example of the MPEG media object (MPEG_media) in a case where the ISOBMFF has a single-track structure. In the case of the example in FIG. 24, only one track (or adaptation set) is designated as a reference target as follows in the track information (tracks array).

```
track":"# track=1"
"codecs":" v3e1"
```

Also, FIG. 25 is a diagram illustrating a description example of an MPEG media object (MPEG_media) in a case where ISOBMFF has a multi-track structure. In the case of the example in FIG. 25, all the tracks (or adaptation sets) storing the V3C bitstream are designated as reference targets as follows in the track information (tracks array).

```
"tracks": [
    {"track": "#track=1"
    "codecs": "v3c1"
    {"track": "#track=2"
    "codecs": "resv.vvvc.hvc1"},
    {"track": "#track=3"
    "codecs": "resv.vvvc.hvc1"},
    {"track": "#track=4"
    "codecs": "resv.vvvc.hvc1"}
]
```

Redundancy of Track Information

However, in a case where ISOBMFF has a multi-track structure, information regarding the other component tracks associated with the V3C track is stored in information of the DASH layer or the ISOBMFF layer, and the decoder can obtain the information therefrom. Therefore, designating all the tracks as reference targets in (the track information of) the scene description as described above is redundant, and there is a concern that the data amount of the scene description may unnecessarily increase.

2. Curbing of Redundancy of Track Information

Thus, some tracks with information regarding the other tracks in the file container with the multi-track structure may be designated as a reference target in the scene description as illustrated at the top section in the table in FIG. 26 (method 1).

For example, the information processing device may include a file generation unit that generates a scene description file describing a scene of 3D object content, the scene description file including track information that designates, as a reference target, some tracks with information for accessing other tracks from among a plurality of tracks of a file container that manages information regarding data of the 3D object content.

For example, the information processing method may generate a scene description file describing a scene of 3D object content, the scene description file including track information that designates, as a reference target, some tracks with information for accessing other tracks from among a plurality of tracks of a file container that manages information regarding data of the 3D object content. For example, the information processing device may include an obtainment unit that obtains data of 3D object content managed in all tracks on the basis of a scene description file that describes a scene of the 3D object content and a reference relationship among the tracks, the scene description file including track information that designates, as a reference target, some tracks with information for accessing other tracks from among a plurality of tracks of a file container that manages information regarding the data of the 3D object content.

For example, the information processing method may include obtaining data of 3D object content managed in all tracks on the basis of a scene description file describing a scene of the 3D object content and a reference relationship among the tracks, the scene description file including track information that designates, as a reference target, some tracks with information for accessing other tracks from among a plurality of tracks of a file container that manages information regarding the data of the 3D object content.

In this manner, it is possible to curb an increase in redundancy of the track information in the scene description. Therefore, it is possible to curb an increase in data amount of the scene description.

In other words, designation of a reference target with respect to some tracks from among the plurality of tracks configuring the file container is omitted in the track information of the scene description file. The reference relationship among the tracks is obtained in a file container such as ISOBMFF or a control file such as MPD, for example, as described above, and the obtainment unit can thus obtain the data of the 3D object content even if the designation of the reference target for some tracks is omitted in the track information. Therefore, it is possible to curb an increase in redundancy of the track information and to curb an increase in data amount of the scene description in this manner.

Note that the track information may be information that designates, as a reference target, a single track with information for accessing all the other tracks. If the track with the information for accessing all the other tracks is referred to, then the obtainment unit can obtain the data of the 3D object content managed in all the tracks from the information. Therefore, it is possible to further curb an increase in redundancy of the track information and to further curb an increase in data amount of the scene description in this manner.

Also, the file container may be International Organization for Standardization Base Media File Format (ISOBMFF) to which a multi-track structure is applied. In this manner, it is possible to curb an increase in redundancy of the track information with respect to ISOBMFF to which the multi-track structure is applied and to curb an increase in data amount of the scene description.

Additionally, the data of the 3D object content may be a Visual Volumetric Video-based Coding (V3C) bitstream in which the point cloud is encoded by a scheme according to Video-based Point Cloud Compression (V-PCC). In this manner, it is possible to curb an increase in redundancy of the track information with respect to the file container that manages the V3C bitstream and to curb an increase in data amount of the scene description.

Additionally, the scene description file may be described by a scheme according to the GL Transmission Format (glTF) 2.0. In this manner, it is possible to curb an increase in redundancy of the track information described by a scheme according to the GL Transmission format (glTF) 2.0 and to curb an increase in data amount of the scene description.

Case where Track with Track Reference is Designated as Reference Target

In a case where the aforementioned method 1 is applied, a track storing a track reference of a file container may be designated as a reference target as illustrated in the second section from the top of the table in FIG. 26 (method 1-1).

For example, the file generation unit may generate a scene description file including track information that designates, as a reference target, a single track with a track reference for accessing all the other tracks from among a plurality of tracks of the file container.

Also, the track information may be information that designates, as a reference target, a single track with a track reference for accessing all the other tracks from among a plurality of tracks of the file container, and the obtainment unit may refer to the single track on the basis of the track information and obtain data of the 3D object content managed in all the tracks on the basis of the track reference.

In this manner, the obtainment unit can more easily obtain the data of the 3D object content than in a case where other tracks are designated as reference targets, by designating the track with the track reference as the reference target.

Case where Adaptation Set of Control File is Designated as Reference Target

In a case where the aforementioned method 1 is applied, an adaptation set that manages a track storing a track reference of a file container in media presentation description (MPD) may be designated as a reference target as illustrated at the bottom section of the table in FIG. 26 (method 1-2). MPD is a control file for controlling distribution of data of 3D object content distributed by a scheme according to Moving Picture Experts Group Dynamic Adaptive Streaming over Hypertext Transfer Protocol (MPEG-DASH).

For example, the file generation unit may generate a scene description file including track information that designates, as a reference target, an adaptation set storing information regarding a single track with information for accessing all the other tracks in a control file for controlling distribution of the data of the 3D object content.

Also, the track information may be information that designates, as a reference target, an adaptation set storing information regarding a single track with information for accessing all the other tracks in the control file for controlling distribution of the data of the 3D object content, and the obtainment unit may obtain the control file, refer to a single track on the basis of the information regarding the adaptation set designated by the track information in the control file, and obtain the data of the 3D object content managed in all the tracks on the basis of a reference relationship among the tracks.

In this manner, it is possible to curb an increase in redundancy of the track information and to curb an increase in data amount of the scene description even in a case where the data of the 3D object content is distributed by using the control file.

Note that the 3D object content may be distributed by a scheme according to Moving Picture Experts Group Dynamic Adaptive Streaming over Hypertext Transfer Protocol (MPEG-DASH). Then, the control file may be Media Presentation Description (MPD). In other words, the present technology can also be applied to distribution of 3D object content to which MPEG-DASH is applied. Therefore, it is possible to curb an increase in redundancy of track information and to curb an increase in data amount of the scene description even in a case where the 3D object content is distributed by applying MPEG-DASH.

Description Example

A description example of scene description (MPEG media object (MPEG media)) in the case where the method 1 as described above is applied is illustrated in FIG. 27. FIG. 27 illustrates, as an example, a description example in a case where the method 1-2 is applied, that is, a description example in a case where an adaptation set of MPD is designated as a reference target. In the eighth row from the bottom of this description example, for example, MPD for controlling distribution of a V3C bitstream is designated by uri as follows as information for obtaining the V3C bitstream.

"uri": "manifest.mpd",

Also, the part surrounded by the dotted-line frame in this description example stores track information as follows that designates an adaptation set storing information of the V3C track as a reference target.

```
"track": [{
    "tracks": "#track=1"
    "codecs": "v3c1"
}]
```

In other words, a single track has been designated as a reference target in the track information regardless of ISOBMFF having a multi-track structure. In this manner, it is possible to curb an increase in redundancy of the track information and to curb an increase in data amount of the scene description.

File Generation Device

Figure 28:
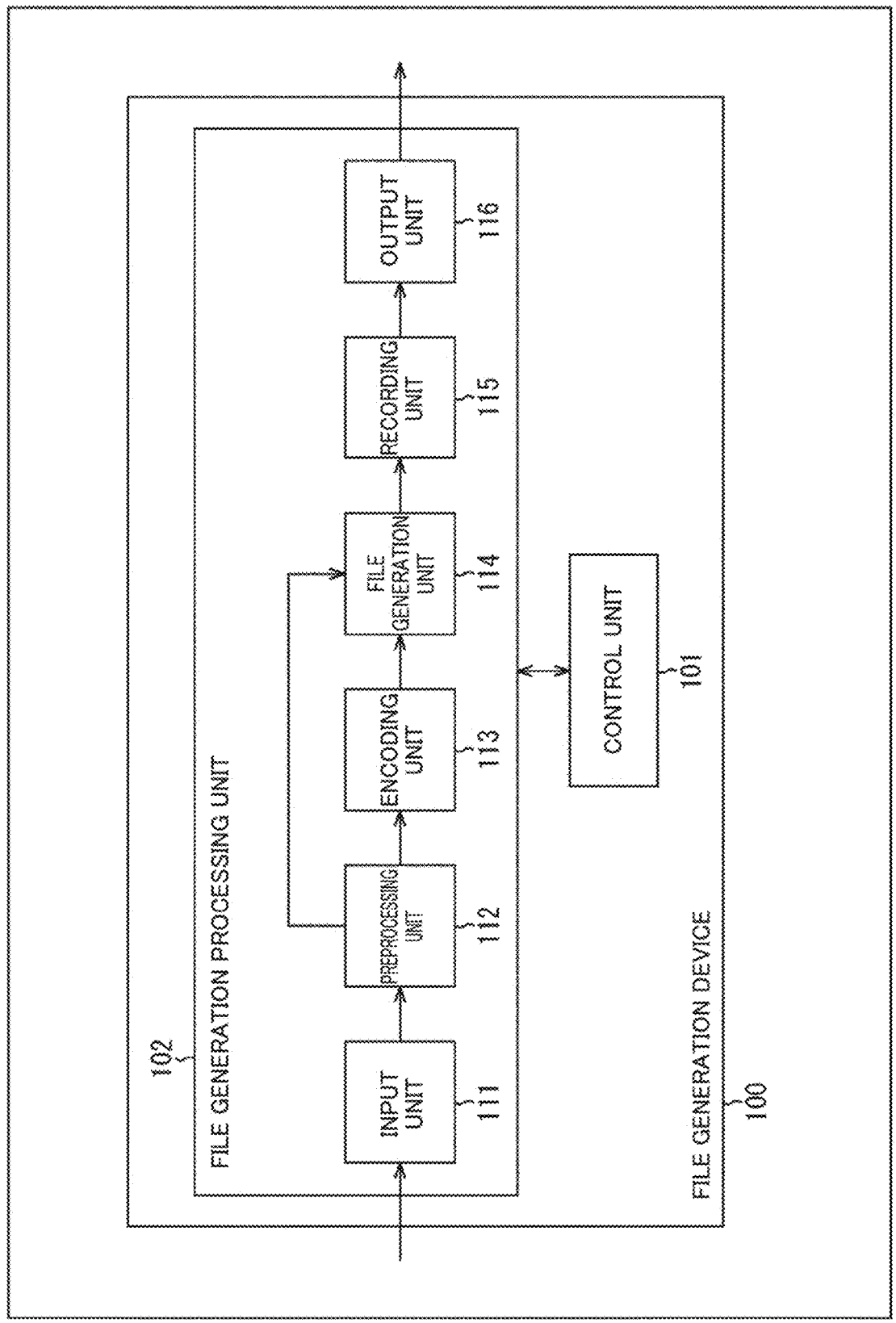
FIG. 28 is a block diagram illustrating a principal configuration example of a file generation device.

The aforementioned method 1 (including the method 1-1 and the method 1-2) can be applied to any device. FIG. 28 is a block diagram illustrating an example of a configuration of a file generation device according to an aspect of the information processing device to which the present technology is applied. A file generation device 100 illustrated in FIG. 28 is a device that generates information for distributing 3D object content. For example, the file generation device 100 generates 3D object content file to be distributed and a scene description file (scene description) of the 3D object content.

Note that FIG. 28 illustrates principal components such as processing units and data flows, and FIG. 28 does not show all components. In other words, processing units not illustrated in FIG. 28 as blocks and processing and data flows not illustrated in FIG. 28 as arrows or the like may be present in the file generation device 100.

As illustrated in FIG. 28, the file generation device 100 includes a control unit 101 and a file generation processing unit 102. The control unit 101 controls the file generation processing unit 102. The file generation processing unit 102 performs processing pertaining to the generation of files, under the control of the control unit 101. For example, the file generation processing unit 102 generates a 3D object content file, which is a content file storing the data of 3D object content to be distributed. Also, the file generation processing unit 102 also generates a scene description file storing scene description corresponding to the 3D object content. The file generation processing unit 102 outputs the generated file to the outside of the file generation device 100. For example, the file generation processing unit 102 uploads the generated file to a distribution server or the like.

The file generation processing unit 102 includes an input unit 111, a preprocessing unit 112, an encoding unit 113, a file generation unit 114, a recording unit 115, and an output unit 116.

The input unit 111 obtains data of the point cloud as data of the 3D object content and supplies it to the preprocessing unit 112. The preprocessing unit 112 obtains information necessary to generate scene description from the data of the point cloud and the like. The preprocessing unit 112 supplies the obtained information to the file generation unit 114. The preprocessing unit 112 supplies the data of the point cloud to the encoding unit 113.

The encoding unit 113 encodes the data of the point cloud supplied from the preprocessing unit 112 and generates encoded data. The encoding unit 113 supplies the generated encoded data of the point cloud as a V3C bitstream to the file generation unit 114.

The file generation unit 114 performs processing regarding generation of a file and the like. For example, the file generation unit 114 obtains the V3C bitstream supplied from the encoding unit 113. Also, the file generation unit 114 obtains the information supplied from the preprocessing unit 112. Additionally, the file generation unit 114 generates ISOBMFF that is a file container storing the V3C bitstream supplied from the encoding unit 113. Also, the file generation unit 114 generates a scene description file by using the information supplied from the preprocessing unit 112. At that time, the file generation unit 114 may generate track information and the like by using information such as a V3C bitstream and ISOBMFF and store them in the scene description file. Moreover, in a case where the V3C bitstream is distributed by a scheme according to MPEG-DASH, the file generation unit 114 generates MPD. The file generation unit 114 supplies the generated file and the like (such as ISOBMFF, a scene description file, and MPD) to the recording unit 115.

The recording unit 115 has any type of recording medium, such as a hard disk or a semiconductor memory, for example, and records the file and the like supplied from the file generation unit 114 in the recording medium. Also, the recording unit 115 also reads the file and the like recorded in the recording medium and supplies it to the output unit 116 in response to a request from the control unit 101 or the output unit 116 or at a predetermined timing.

The output unit 116 obtains the file and the like supplied from the recording unit 115 and outputs the file and the like to the outside of the file generation device 100 (such as a distribution server or a reproducing device, for example). In the file generation device 100 with the configuration as described above, the file generation unit 114 generates a file and the like by applying the present technology.

For example, the file generation unit 114 may apply the aforementioned method 1 and generate a scene description file including track information that designates, as a reference target, some tracks with information for accessing other tracks from among a plurality of tracks of a file container that manages information regarding data of the 3D object content.

In this manner, the file generation device 100 can curb an increase in redundancy of the track information of the scene description and curb an increase in data amount of the scene description.

Note that the track information may be information that designates, as a reference target, a single track with information for accessing all the other tracks.

Also, the file container may be ISOBMFF to which a multi-track structure is applied. The data of the 3D object content may be a V3C bitstream in which the point cloud is encoded by a scheme according to V-PCC. The scene description file may be described by a scheme according to glTF2.0.

Also, the file generation unit 114 may apply the aforementioned method 1-1 and generates a scene description file including track information that designates, as a reference target, a single track with a track reference for accessing all the other tracks from among a plurality of tracks of a file container.

Additionally, the file generation unit 114 may apply the aforementioned method 1-2 and generates a scene description file including track information that designates, as a reference target, an adaptation set storing information regarding a single track with information for accessing all the other tracks in a control file for controlling distribution of data of the 3D object content.

The 3D object content in that case may be distributed by a scheme according to MPEG-DASH. Also, the control file may be MPD.

The file generation device 100 can obtain effects that are similar to those described in <2. Curbing of redundancy of track information> by applying any one or more of these present technologies.

Flow of File Generation Processing

Figure 29:
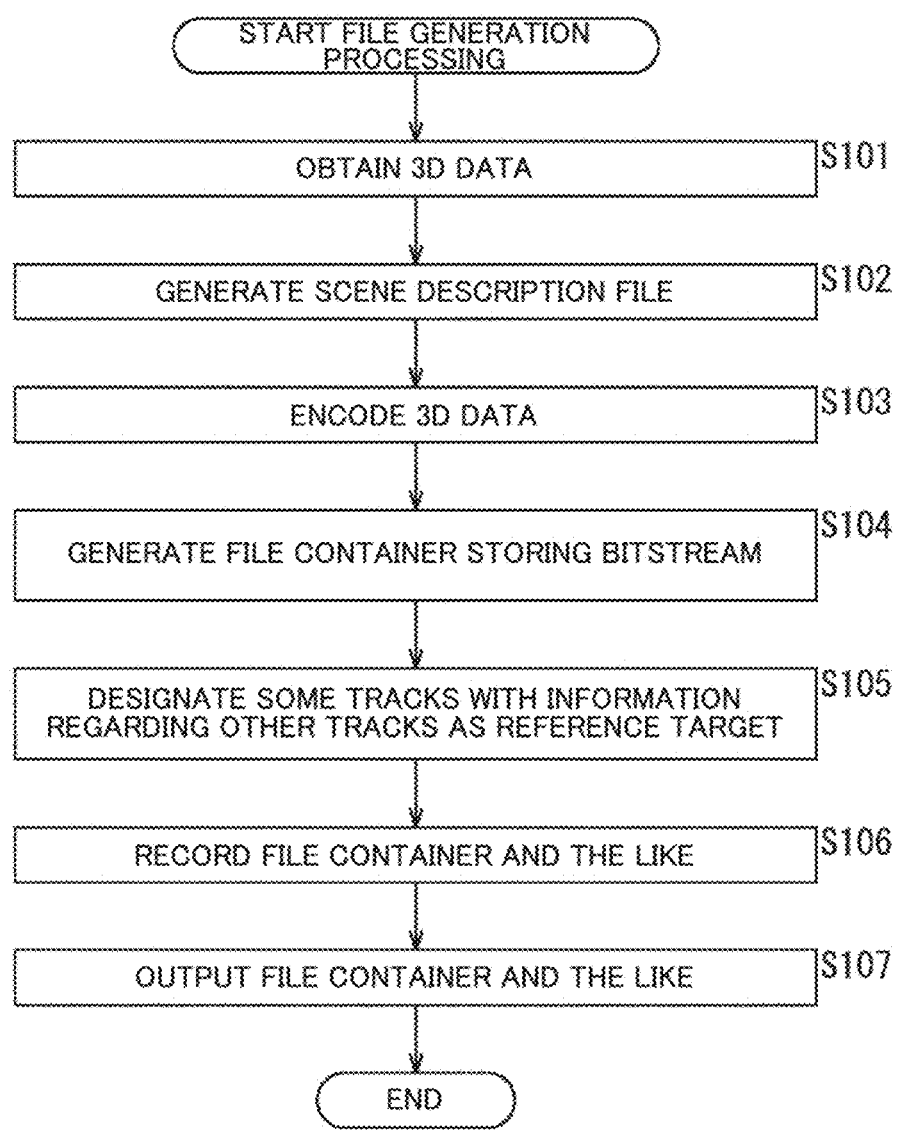
FIG. 29 is a flowchart illustrating an example of the flow of file generation processing.

An example of a flow of file generation processing executed by the file generation device 100 with such a configuration will be described with reference to the flowchart in FIG. 29.

Once the file generation processing starts, the input unit 111 of the file generation device 100 obtains data (3D data) of a 3D object in Step S101. For example, the input unit 111 obtains data of a point cloud as the 3D data.

In Step S102, the preprocessing unit 112 obtains information used to generate scene description, which is spatial arrangement information for placing one or more 3D objects in a 3D space, using the data of the 3D object obtained in Step S101. Then, the file generation unit 114 generates a scene description file by using the information.

In Step S103, the encoding unit 113 encodes the data (3D data) of the point cloud obtained in Step S101 and generates encoded data (V3C bitstream).

In Step S104, the file generation unit 114 generates a file container (ISOBMFF) storing the V3C bitstream generated in Step S103. Also, the file generation unit 114 may generate a control file such as MPD, for example.

In Step S105, the file generation unit 114 generates track information that designates, as a reference target, some tracks with information regarding other tracks from among a plurality of tracks configuring ISOBMFF on the basis of ISOBMFF (and MPD) generated in Step S104 and stores it in the scene description file generated in Step S102.

In Step S106, the recording unit 115 records the generated file container (ISOBMFF), (MPD,) the scene description file, and the like in a recording medium.

In Step S107, the output unit 116 reads the file and the like recorded in Step S106 from the recording medium and outputs the read file to the outside of the file generation device 100 in a predetermined timing. For example, the output unit 116 may transmit (upload) the file read from the recording medium to another device such as a distribution server or a reproducing device via a communication medium such as a network. Also, the output unit 116 may record the file and the like read from the recording medium in an external recording medium such as a removable medium. In such a case, the output file may be supplied to another device (such as a distribution server or a reproducing device) via the external recording medium, for example.

Once the processing in Step S107 ends, the file generation processing ends.

In Step S105 in such file generation processing, the file generation unit 114 can apply various methods according to the present technology as described above in <File generation device> in <2. Curbing of redundancy of track information>, generate track information, and store it in the scene description file. Therefore, the file generation device 100 can curb an increase in redundancy of the track information of the scene description and curb an increase in data amount of the scene description by executing the file generation processing in this manner. Also, the file generation device 100 can obtain effects that are similar to those described in <2. C0urbing of redundancy of track information>.

Client Device

Figure 30:
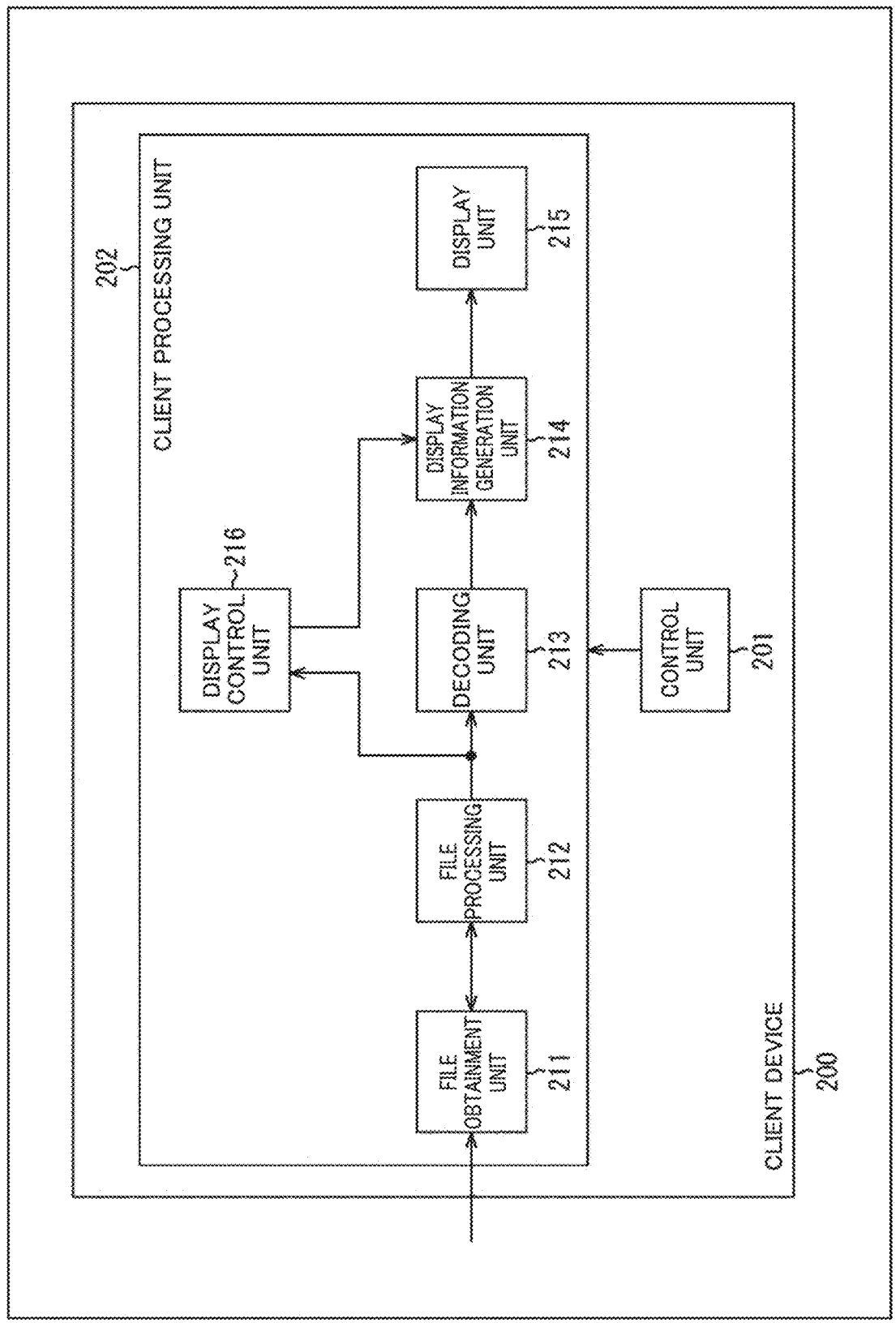
FIG. 30 is a block diagram illustrating a principal configuration example of a client device.

FIG. 30 is a block diagram illustrating an example of a configuration of a client device according to an aspect of an information processing device to which the present technology is applied. A client device 200 illustrated in FIG. 30 is a reproducing device that performs 3D object content reproducing processing on the basis of a scene description file (scene description). For example, the client device 200 plays back data of 3D objects stored in a 3D object file generated by the file generation device 100. At this time, the client device 200 performs processing pertaining to the reproduction based on the scene description.

FIG. 30 shows principal components such as processing units and data flows, and FIG. 30 does not show all components. That is, processing units not illustrated in FIG. 30 as blocks and processing and data flows not illustrated in FIG. 30 as arrows or the like may be present in the client device 200.

As illustrated in FIG. 30, the client device 200 includes a control unit 201 and a reproduction processing unit 202. The control unit 201 performs processing pertaining to control of the reproduction processing unit 202. The reproduction processing unit 202 performs processing pertaining to the reproduction of the data of 3D objects.

The reproduction processing unit 202 includes a file obtainment unit 211, a file processing unit 212, a decoding unit 213, a display information generation unit 214, a display unit 215, and a display control unit 216.

A file obtainment unit 211 obtains a file and the like supplied from the outside of the client device 200, such as from a distribution server or a file generation device 100, for example. For example, the file obtainment unit 211 obtains a scene description file from the outside of the client device 200 and supplies it to a file processing unit 212. Also, the file obtainment unit 211 obtains a file container (ISOBMFF) storing a bitstream of the 3D object content in response to a request from the file processing unit 212 and supplies it to the file processing unit 212. Additionally, the file obtainment unit 211 can also obtain a control file (MPD, for example) for controlling distribution of data of the 3D object content in response to a request from the file processing unit 212 and supply it to the file processing unit 212.

The file processing unit 212 obtains a file and the like supplied from the file obtainment unit 211 and performs processing regarding the obtained file and the like. For example, the file processing unit 212 obtains a scene description file and the like supplied from the file obtainment unit 211. Then, the file processing unit 212 performs processing such as control of the file obtainment unit 211 on the basis of the scene description file. Also, the file processing unit 212 obtains MPD supplied from the file obtainment unit 211. Then, the file processing unit 212 performs processing such as control of the file obtainment unit 211 on the basis of the MPD. Additionally, the file processing unit 212 obtains information of the file container (ISOBMFF) supplied from the file obtainment unit 211. Then, the file processing unit 212 can extract arbitrary information from ISOBMFF. Then, the file processing unit 212 performs processing such as control of the file obtainment unit 211 on the basis of the extracted information. Also, the file processing unit 212 obtains a bitstream (a V3C bitstream, for example) of the 3D object content supplied from the file obtainment unit 211.

The file processing unit 212 supplies the obtained bitstream and the like to the decoding unit 213. The file processing unit 212 also supplies information useful for generating display information, contained in the scene description and the like, to the display control unit 216.

The decoding unit 213 decodes the bitstream supplied from the file processing unit 212. The decoding unit 213 supplies the data (data of the point cloud, for example) of the 3D object content obtained through the decoding to the display information generation unit 214.

The display information generation unit 214 obtains the data of the 3D objects supplied from the decoding unit 213. The display information generation unit 214 also renders the data of the 3D object content under the control of the display control unit 216 and generates a display image and the like. The display information generation unit 214 supplies the generated display image and the like to the display unit 215.

The display unit 215 includes a display device, and displays the display image supplied from the display information generation unit 214 using that display device.

The display control unit 216 obtains information, such as the scene description, supplied from the file processing unit 212. The display control unit 216 controls the display information generation unit 214 based on that information.

In the client device 200 with a configuration as described above, the file processing unit 212 obtains the scene description file, (MPD,) the data of the 3D object content, and the like by applying the present technology.

For example, the file processing unit 212 may apply the aforementioned method 1 and obtain the data of the 3D object content managed in all the tracks on the basis of the scene description file including track information that designates, as a reference target, some tracks with information for accessing other tracks from among the plurality of tracks of the file container that manages information regarding the data of the 3D object content and a reference relationship among the tracks. The file processing unit 212 realizes such processing by controlling the file obtainment unit 211. In other words, the file processing unit 212 can also be referred to as an obtainment unit.

In this manner, the client device 200 can curb an increase in redundancy of the track information of the scene description and curb an increase in data amount of the scene description.

Note that the track information may be information that designates, as a reference target, a single track with information for accessing all the other tracks.

Also, the file container may be ISOBMFF to which a multi-track structure is applied. The data of the 3D object content may be a V3C bitstream in which the point cloud is encoded by a scheme according to V-PCC. The scene description file may be described by a scheme according to glTF2.0.

Also, the file processing unit 212 may apply the aforementioned method 1-1, refers to a single track on the basis of track information that designates, as a reference target, the single track with a track reference for accessing all the other tracks from among a plurality of tracks of the file container, and obtain data of the 3D object content managed in all the tracks on the basis of the track reference. The file processing unit 212 realizes such processing by controlling the file obtainment unit 211.

Also, the file processing unit 212 may apply the aforementioned method 1-2, obtain a control file for controlling distribution of the data of the 3D object content, refer to a single track with information for accessing all the other tracks on the basis of information regarding an adaptation set designated as a reference target by track information from among adaptation sets of the control file, and obtain the data of the 3D object content managed in all the tracks on the basis of a reference relationship among the tracks.

The 3D object content in that case may be distributed by a scheme according to MPEG-DASH. Also, the control file may be MPD.

The client device 200 can obtain effects that are similar to those described in <2. Curbing of redundancy of track information> by applying any one or more of these present technologies.

Flow 1 of Client Processing

Figure 31:
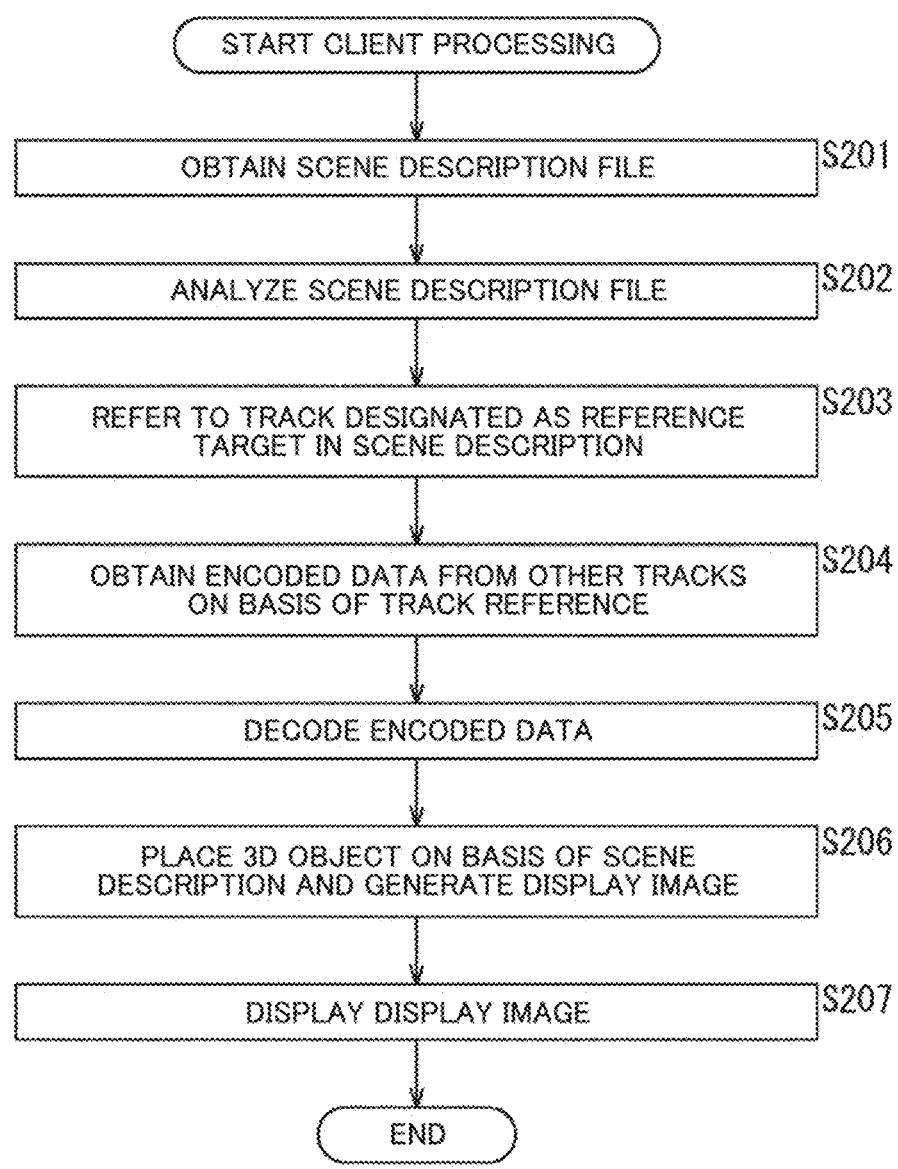
FIG. 31 is a flowchart illustrating an example of the flow of client processing.

An example of a flow of client processing executed by the client device 200 with such a configuration will be described with reference to the flowcharts in FIG. 31. The flowchart in FIG. 31 is an example of a flow of the client processing in a case where the method 1-1 is applied.

Once the client processing starts, the file processing unit 212 of the client device 200 controls the file obtainment unit 211 in Step S201 and obtains a scene description file.

In Step S202, the file processing unit 212 analyzes the scene description file obtained in Step S201.

In Step S203, the file processing unit 212 controls the file obtainment unit 211 on the basis of the analysis result of the scene description file obtained through the processing in Step S202 and refers to a track designated as a reference target by track information of the scene description file.

In Step S204, the file processing unit 212 obtains data of the 3D object content managed by other tracks associated by a track reference stored in the track referred to in Step S203.

In Step S205, the decoding unit 213 decodes the data (the bitstream of the encoded data) of the 3D object content obtained in Step S204.

In Step S206, the display information generation unit 214 places the 3D object in the 3D space on the basis of the scene description file, performs rendering, and generates a display image.

In Step S207, the display unit 215 displays the display image generated in Step S206. Once the processing in Step S207 ends, the client processing ends.

In the processing in Steps S201 to S204 in such client processing, the file processing unit 212 applies various methods of the present technology as described above in <Client device> in <2. Curbing of redundancy of track information>, refers to a single track with a track reference for accessing all the other tracks on the basis of the track information, and obtains the data of the 3D object content managed in all the tracks on the basis of the track reference. Therefore, the client device 200 can curb an increase in redundancy of the track information of the scene description and curb an increase in data amount of the scene description by executing the client processing in this manner. Also, the client device 200 can obtain effects that are similar to those described in <2. Curbing of redundancy of track information>.

Flow 2 of Client Processing

Figure 32:
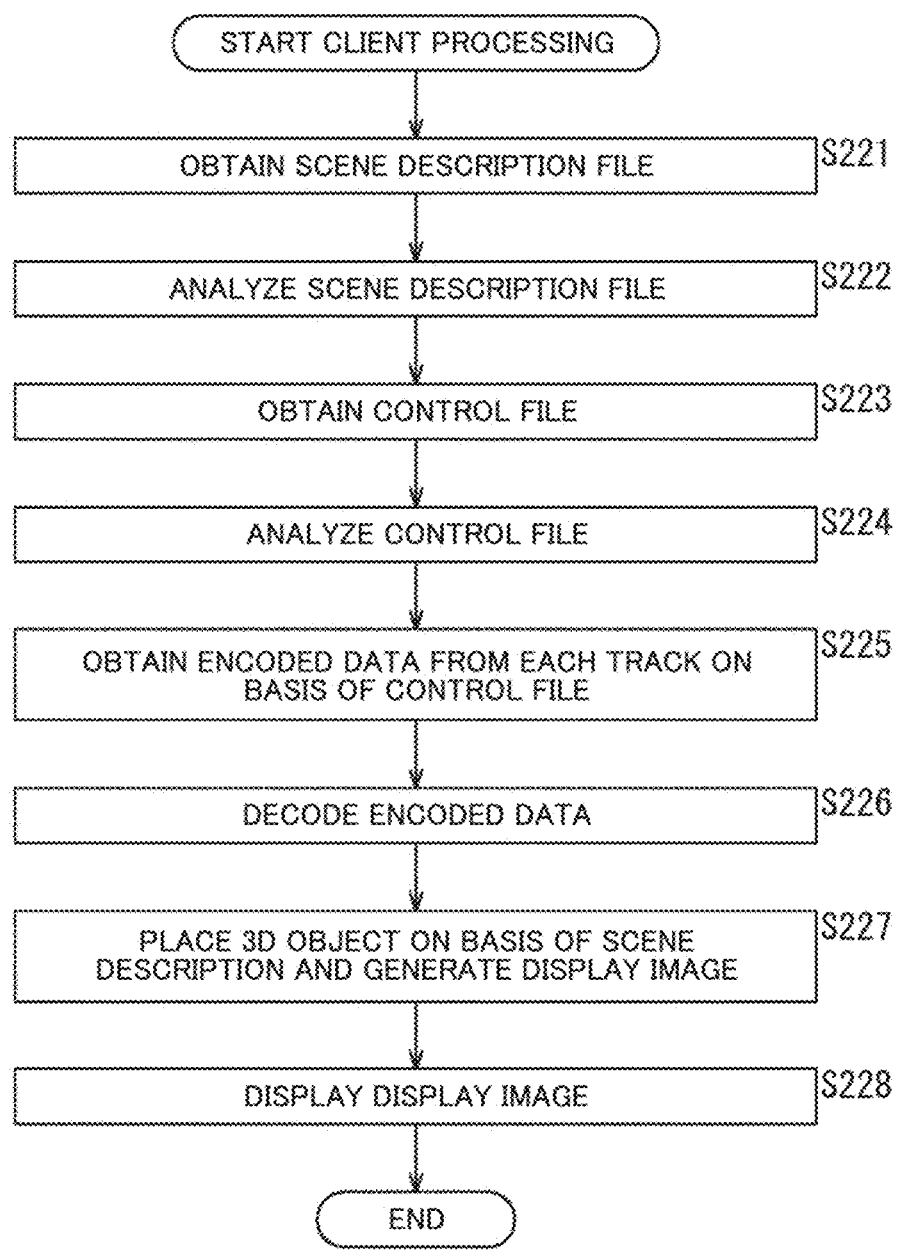
FIG. 32 is a flowchart illustrating an example of the flow of client processing.

Next, an example of a flow of client processing in a case where the method 1-2 is applied will be described with reference to the flowchart in FIG. 32.

Once the client processing starts, the file processing unit 212 of the client device 200 controls the file obtainment unit 211 in Step S221 and obtains a scene description file. In Step S222, the file processing unit 212 analyzes the scene description file.

In Step S223, the file processing unit 212 controls the file obtainment unit 211 on the basis of the analysis result of the scene description file obtained through the processing in Step S222 and obtains a control file for controlling distribution of the data of the 3D object content designated by the scene description file. In Step S224, the file processing unit 212 analyzes the control file.

In Step S225, the file processing unit 212 controls the file obtainment unit 211 on the basis of the analysis result of the control file obtained through the processing in Step S224 and refers to a track stored in an adaptation set designated as a reference target by track information of the scene description file. Then, the file processing unit 212 obtains data of the 3D object content managed in all the tracks on the basis of a reference relationship among the tracks. For example, the file processing unit 212 obtains information stored in other tracks associated by a track reference stored in the track that has been referred to. Then, the file processing unit 212 obtains data of the 3D object content managed in each track.

In Step S226, the decoding unit 213 decodes the data (the bitstream of the encoded data) of the 3D object content obtained in Step S225.

In Step S227, the display information generation unit 214 places the 3D object in a 3D space on the basis of the scene description file, performs rendering, and generates a display image.

In Step S228, the display unit 215 displays the display image generated in Step S227. Once the processing in Step S228 ends, the client processing ends. In the processing in each of Steps S221 to S225 in such client processing, the file processing unit 212 applies various methods of the present technology as described above in <Client device> of <2. Curbing of redundancy of track information>, obtains the control file on the basis of the track information, refers to the tracks stored in the adaptation set designated by the track information in the control file, and obtains the data of the 3D object content managed in all the tracks on the basis of the reference relationship among the tracks. Therefore, the client device 200 can curb an increase in redundancy of the track information of the scene description and can curb an increase in data amount of the scene description by executing the client processing in this manner. Also, the client device 200 can obtain effects that are similar to those described in <2. Curbing of redundancy of track information>.

3. Designation of Attribute

Data Stored in Buffer

Incidentally, a case where a V3C bitstream is managed by applying the provision of MPEG-I Part 14 Scene Description for MPEG Media in a system providing 3D object content of a point cloud according to glTF2.0, for example, will be examined.

Figure 33:
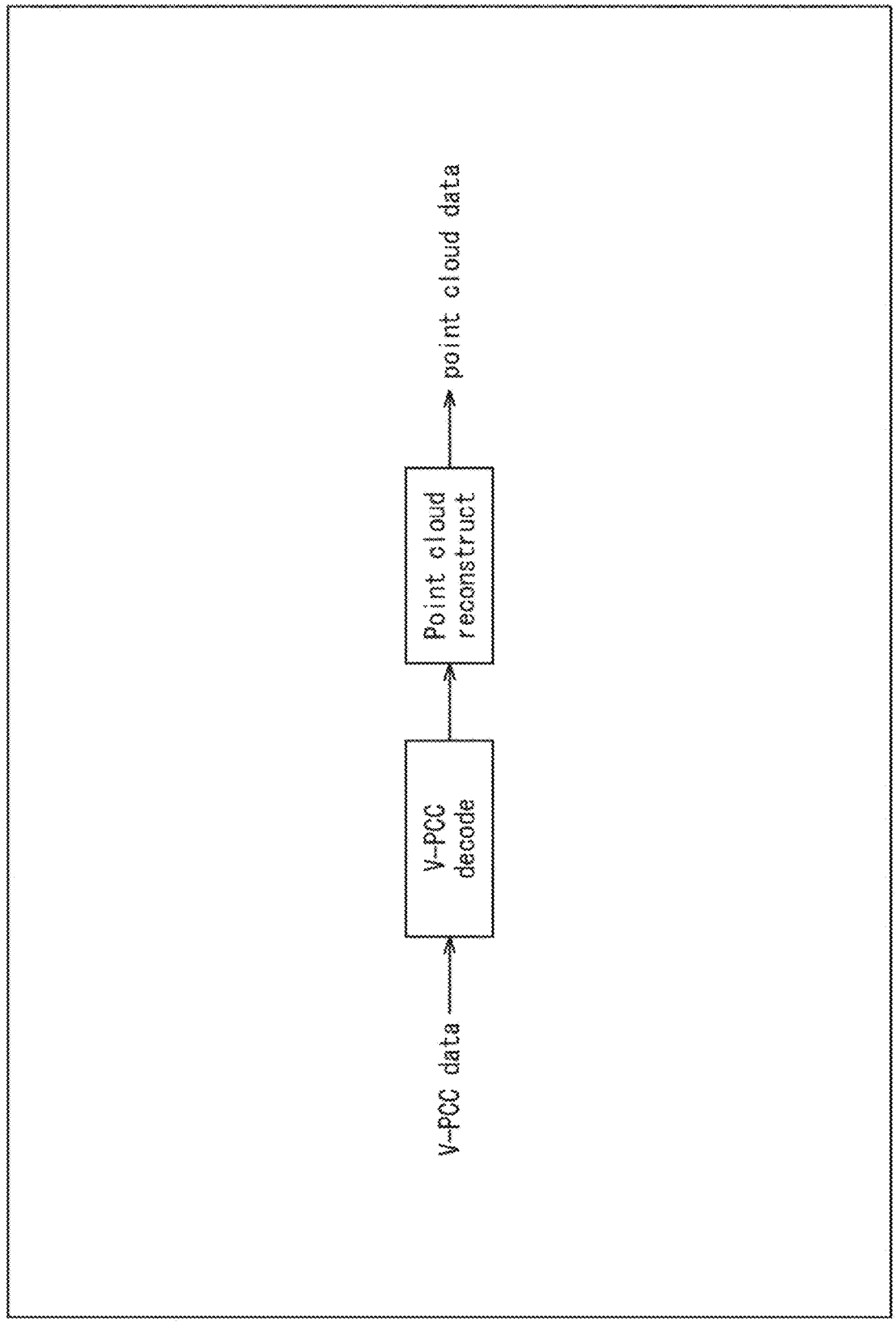
FIG. 33 is a diagram for explaining a configuration of client processing.

The client device decodes (V-PCC decodes) the V3C bitstream (V-PCC data) and reconfigures the point cloud (point cloud reconstruct) as illustrated in FIG. 33.

As described in NPL 2, the client device is adapted such that a presentation engine (PE) and a media access function (MAF) exchange data via a buffer. Therefore, the following two kinds of data are conceivable as data to be stored in the buffer (circular buffer).

Case 1: Data after point cloud reconstruction (that is, point cloud data)
Case 2: Data after V-PCC decoding (that is, decoded component video data)

Case 1

Figure 34:
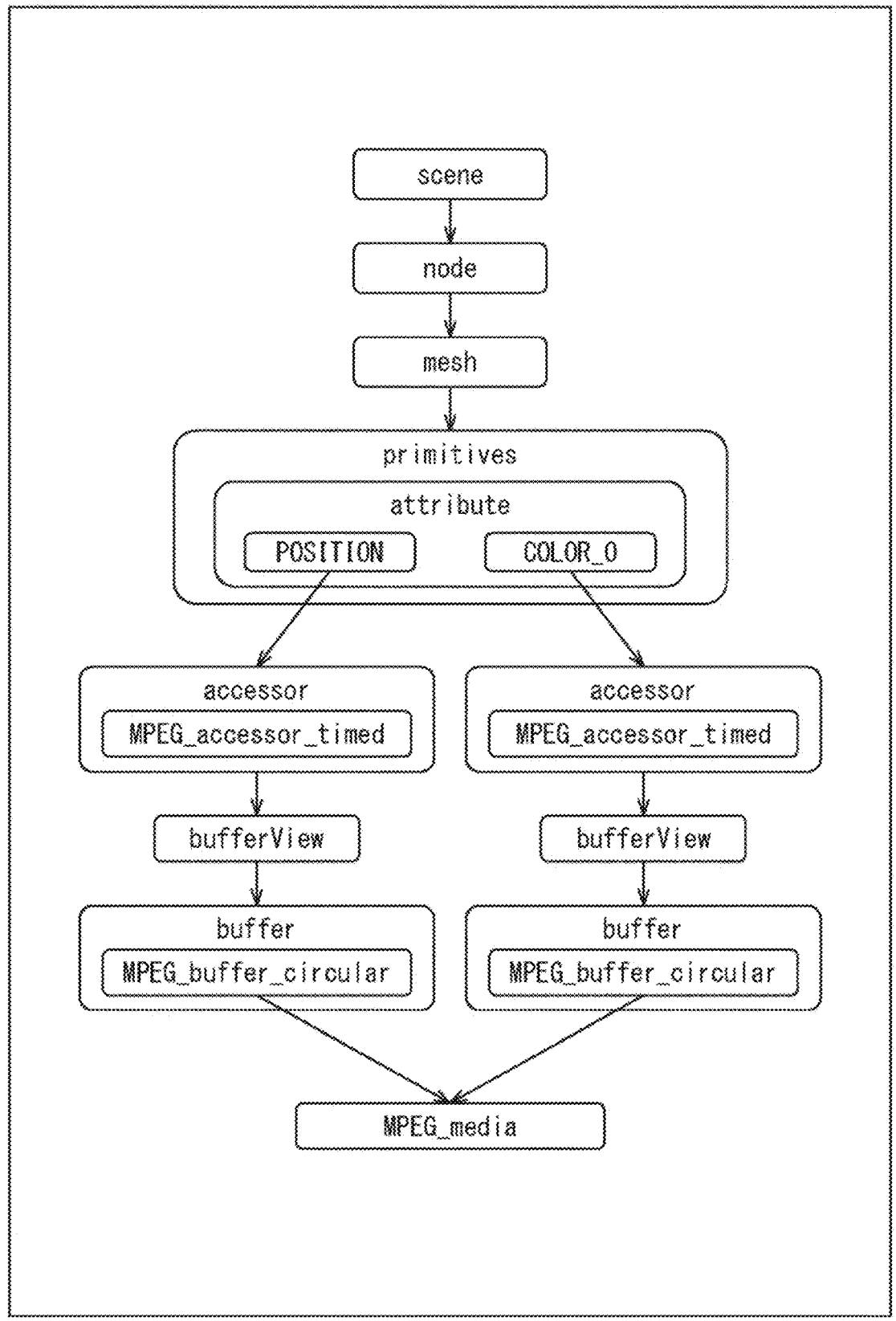
FIG. 34 is a diagram for explaining a configuration example of an object for scene description.

A configuration example of an object in scene description in the case 1 is illustrated in FIG. 34. In the case 1, the reconfigured point cloud data (geometry and attributes) is stored in the buffer, properties of position information (POSITION) and color information (COLOR_0) are thus set in the attribute object (attribute) inside mesh.primitives, and the accessor to the buffer storing each piece of information is designated by each of the properties.

Since the data stored in the buffer is point cloud data (changing in a time direction), an object configuration in a case of using the point cloud data of glTF2.0 is used. Moreover, the extended function (MPEG_accessor_timed, MPEG_buffer_circular, or the like) in NPL 2 to use timed media is applied. V-PCC data (V3C bitstream) is designated in the MPEG media (MPEG_media), and it is decoded and reconfigured by the media access function (MAF) and is then stored in a buffer. The presentation engine (PE) obtains the data in the buffer and renders the 3D object content by the same method as that for processing the point cloud data in glTF2.0.

Figure 35:
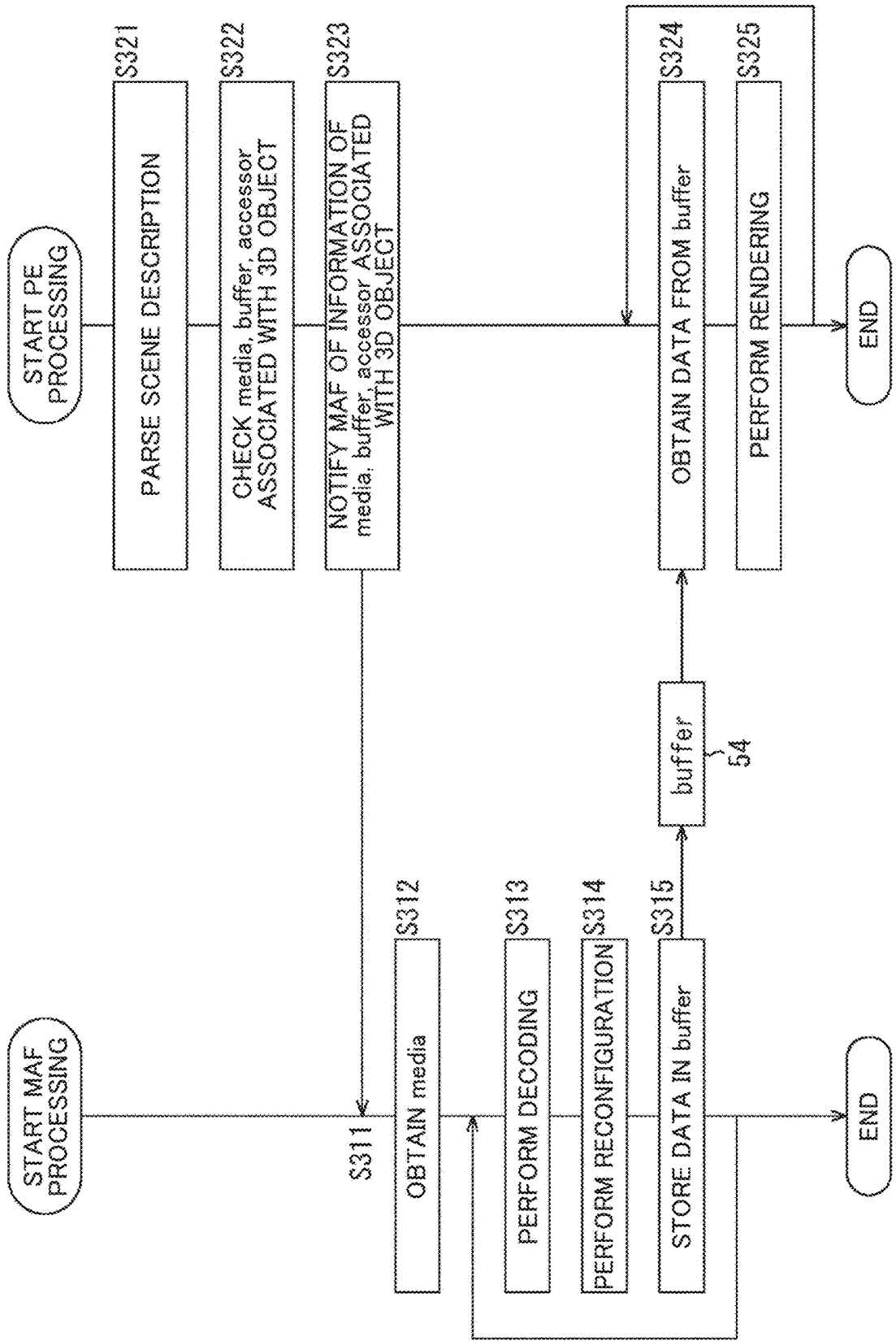
FIG. 35 is a flowchart illustrating an example of the flow of client processing.

The client device has a configuration as described with reference to FIG. 19 and reproduces 3D object content by executing client processing. FIG. 35 is a flowchart illustrating an example of a flow of client processing in the case 1. Once the client processing starts, the glTF analysis unit 63 of the presentation engine (PE) 51 starts PE processing, obtains an SD (glTF) file 62 that is a scene description file, and analyzes (parses) the scene description in Step S321.

In Step S322, the glTF analysis unit 63 checks a medium associated with the 3D object (texture), a buffer storing the medium after the processing, and an accessor. In Step S323, the glTF analysis unit 63 notifies the media access function (MAF) 52 of the information as a file obtainment request.

The media access function (MAF) 52 starts MAF processing and obtains the notification in Step S311. In Step S312, the media access function (MAF) 52 obtains a medium (3D object file (mp4)) on the basis of the notification.

In Step S313, the media access function (MAF) 52 decodes the obtained medium (3D object file (mp4)) by a 2D video decoding scheme. In Step S314, the media access function (MAF) 52 reconfigures the point cloud by using the video data obtained through the decoding. In Step S315, the media access function (MAF) 52 stores the data of the reconfigured point cloud in the buffer 54 on the basis of the notification from the presentation engine (PE) 51.

In Step S324, the rendering processing unit 64 of the presentation engine (PE) 51 reads (obtains) the data of the point cloud from the buffer 54 at an appropriate timing. In Step S325, the rendering processing unit 64 performs rendering by using the obtained data and generates a display image.

The media access function (MAF) 52 executes the processing at each clock time (each frame) by repeating the processing in each of Steps S313 to S315. Also, the presentation engine (PE) 51 executes the processing at each clock time (each frame) by repeating the processing in each of Steps S324 and S325. Once the processing ends for all the frames, the media access function (MAF) 52 ends the MAF processing, and the presentation engine (PE) 51 ends the PE processing. In other words, the client processing ends.

Case 2

Figure 36:
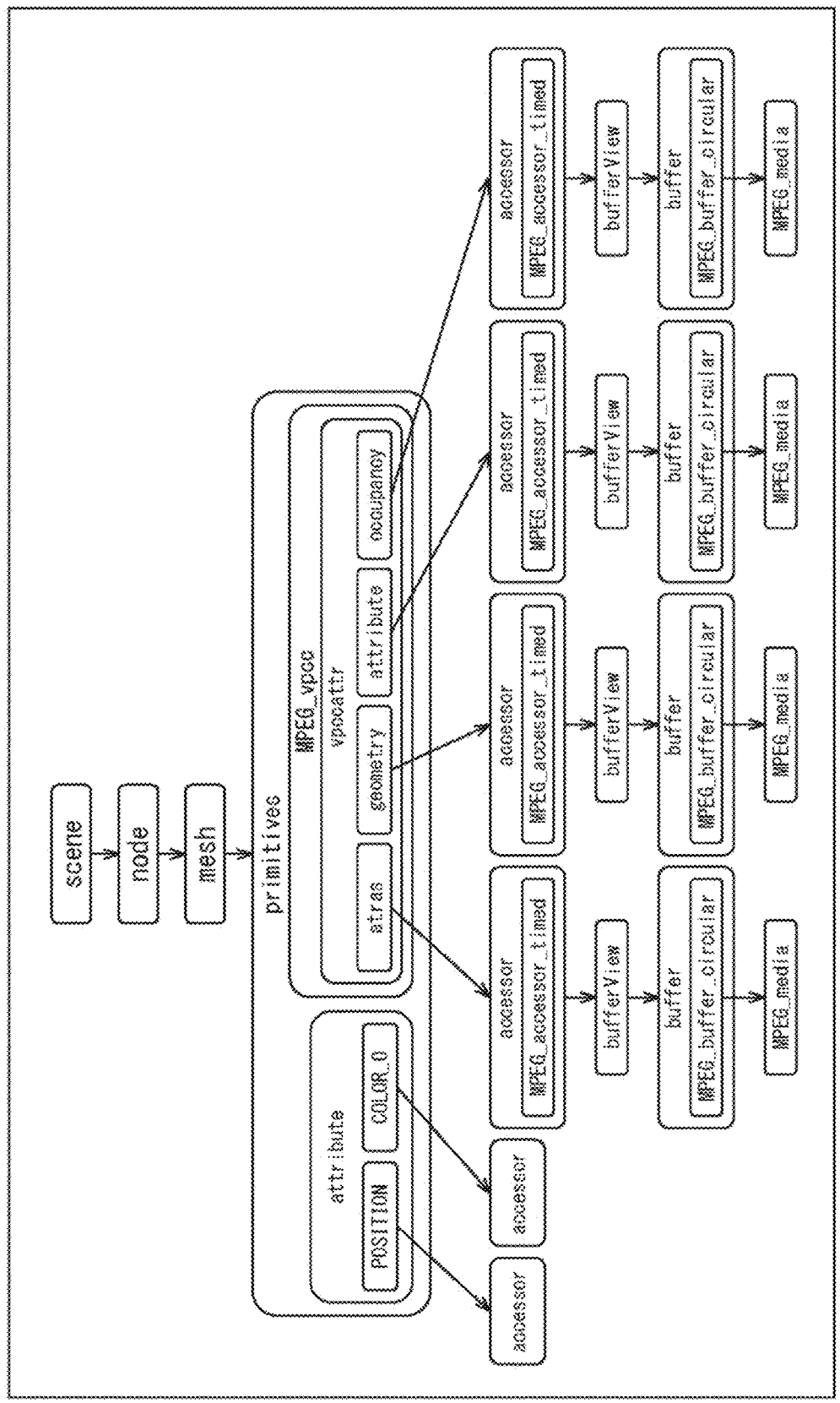
FIG. 36 is a diagram for explaining a configuration example of an object for scene description.

A configuration example of an object in scene description in the case 2 is illustrated in FIG. 36. In the case 2, a buffer stores a decoded video data (decoded component video data) and the like. In other words, a geometry video frame, an attribute video frame, an occupancy map, atlas information, and the like are stored in the buffer. However, there is no method of signaling such data in existing glTF2.0. Therefore, in the scene description, extension (MPEG_vpcc) is defined and identification information of an accessor for accessing each piece of video data (decoded component video data) is stored in mesh.primitives as illustrated in FIG. 36. In other words, an object (vpccattr) is defined in MPEG_vpcc, properties such as atlas, geometry, attribute, and occupancy are set in vpccattr, and an accessor to a buffer storing each bitstream is designated for each of the properties.

V-PCC data is designated in MPEG media (MPEG_media), each piece of them is decoded by the media access function (MAF), and the obtained video data (decoded component video data) and the like are stored in the buffer. The presentation engine (PE) obtains data in the buffer, reconfigures the point cloud by using it, and performs rendering similarly to the case 1.

Figure 37:
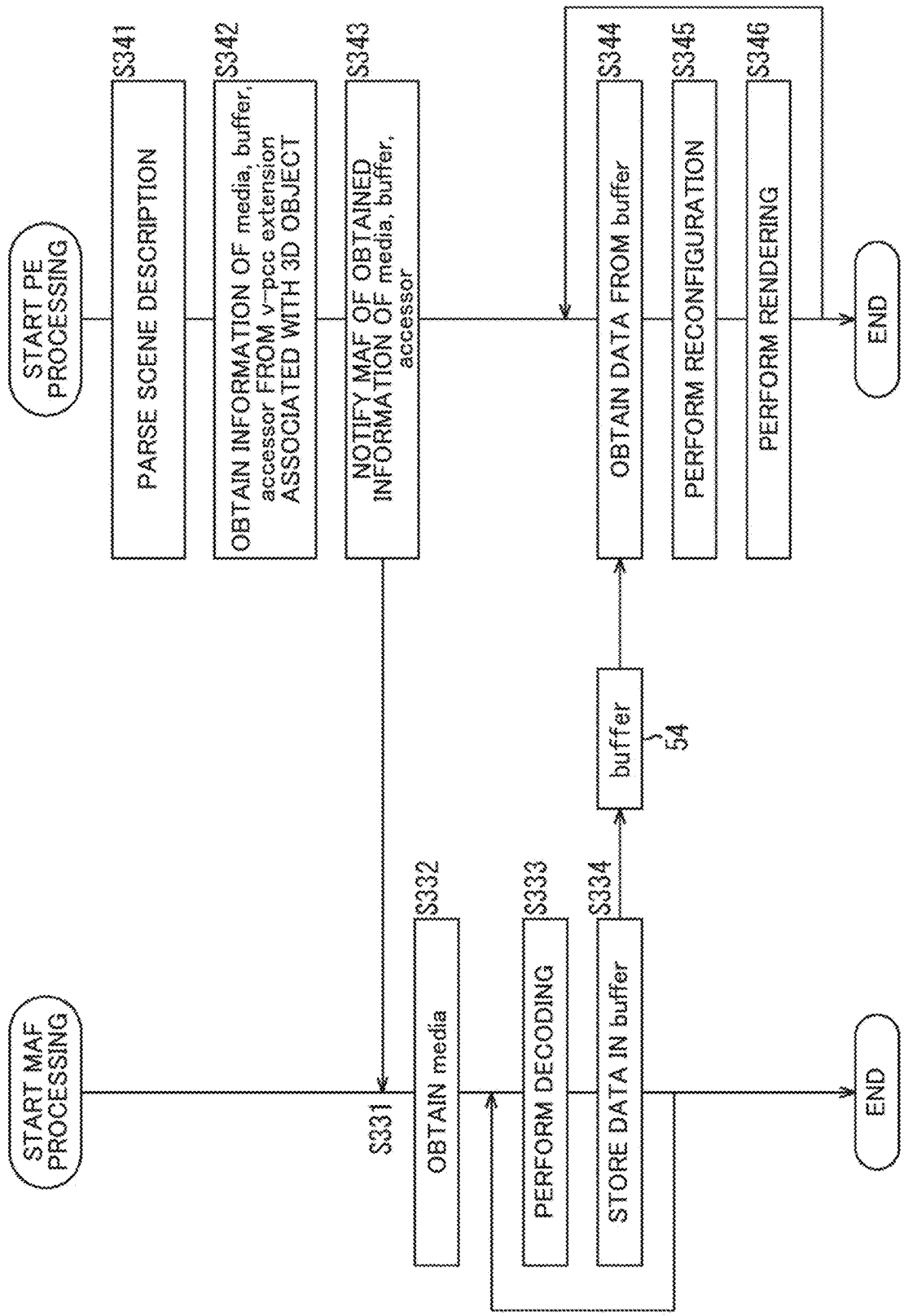
FIG. 37 is a flowchart illustrating an example of the flow of client processing.

The client device also has the configuration as described with reference to FIG. 19 in the case 2 as well, and the 3D object content is reproduced by executing the client processing. FIG. 37 is a flowchart illustrating an example of a flow of the client processing in the case 2. Once the client processing starts, the glTF analysis unit 63 of the presentation engine (PE) 51 starts PE processing, obtains the SD (glTF) file 62 that is a scene description file in Step S341, and analyzes (parses) the scene description.

In Step S342, the glTF analysis unit 63 checks a medium associated with the 3D object (texture), a buffer storing the medium after the processing, and an accessor. In Step S343, the glTF analysis unit 63 notifies the media access function (MAF) 52 of the information as a file obtainment request.

The media access function (MAF) 52 starts MAF processing and obtains the notification in Step S331. In Step S332, the media access function (MAF) 52 obtains a medium (3D object file (mp4)) on the basis of the notification.

In Step S333, the media access function (MAF) 52 decodes the obtained medium (3D object file (mp4)) by a 2D video decoding scheme. In Step S334, the media access function (MAF) 52 stores the video data (decoded component video data) and the like obtained through the decoding in the buffer 54 on the basis of the notification from the presentation engine (PE) 51.

In Step S344, the rendering processing unit 64 of the presentation engine (PE) 51 reads (obtains) the video data and the like from the buffer 54 at an appropriate timing. In Step S345, the rendering processing unit 64 reconfigures the point cloud by using the obtained video data and the like. In Step S346, the rendering processing unit 64 performs rendering by using the data of the reconfigured point cloud and generates a display image.

The media access function (MAF) 52 executes the processing at each clock time (each frame) by repeating the processing in each of Steps S333 and S334. Also, the presentation engine (PE) 51 executes the processing at each clock time (each frame) by repeating the processing in each of Steps S344 to S346. Once the processing ends for all the frames, the media access function (MAF) 52 ends the MAF processing, and the presentation engine (PE) 51 ends the PE processing. In other words, the client processing ends.

Management of Attributes Other than Color Information

Figure 38:
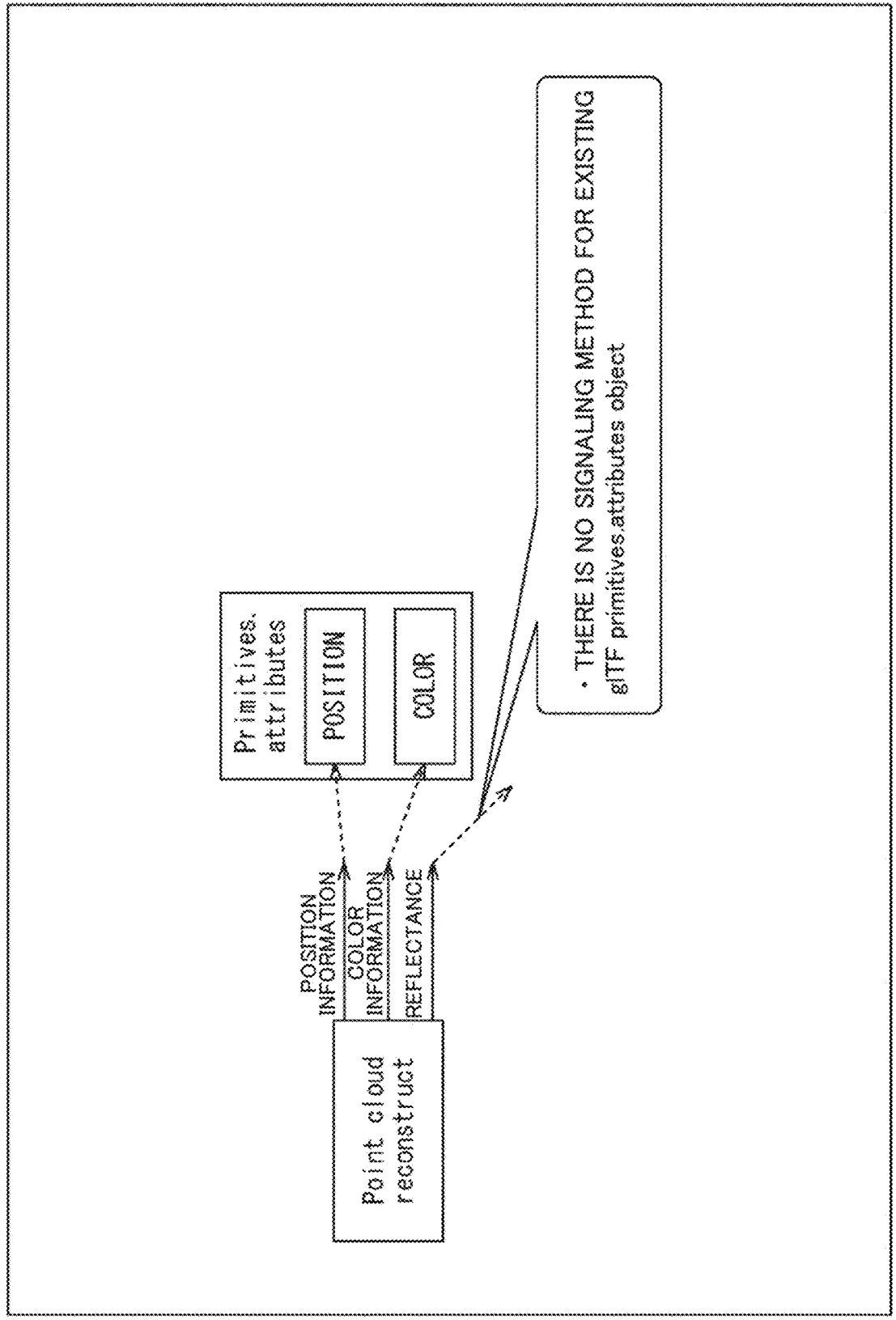
FIG. 38 is a diagram illustrating an example of a state where attributes other than colors are designated.

As illustrated in FIG. 38, attributes of the point cloud may also include information other than color information. However, it is possible to handle only position information (POSITION) and color information (COLOR) as the properties of primitives.attributes in glTF2.0. Therefore, in a case where data obtained by decoding the V3C bitstream includes data of attributes (data of a type that cannot be represented by properties of primitives.attributes in glTF2.0) other than color information, it is difficult to accurately reconfigure the point cloud. This may occur in both the aforementioned case 1 and case 2.

Thus, the attribute information other than the color information of the point cloud may be stored in mesh.primitives of scene description as illustrated in the top section of the table in FIG. 39 (method 2).

For example, the information processing device may include a file generation unit that generates a scene description file describing a scene of 3D object content with an object that stores information regarding attributes other than the color of the 3D object content.

For example, the information processing method may include generating a scene description file describing a scene of 3D object content with an object storing information regarding attributes other than the color of the 3D object content.

For example, the information processing device may include an obtainment unit that obtains data of attributes other than the color of the 3D object content on the basis of information regarding the attributes stored in an object defined by a scene description file describing a scene of the 3D object content.

For example, the information processing method may include obtaining data of attributes other than the color of the 3D object content on the basis of information regarding the attributes stored in an object defined by a scene description file describing a scene of the 3D object content.

In this manner, it is possible to accurately reconfigure the 3D object (point cloud) even in a case where the point cloud data has attributes other than the color information. In other words, it is possible to address the attributes other than the color information. The attributes other than the color information are arbitrary. For example, the attributes may be reflectance, a normal vector, and the like or may be something else.

Note that the 3D object content is a point cloud, the scene description file is described by a scheme according to glTF2.0, an object storing information regarding the attributes other than the color of the 3D object content may be defined in mesh.primitives of the scene description file. The file generation unit may generate such a scene description file. The obtainment unit may obtain data of the attributes on the basis of the information regarding the attributes. In this manner, it is possible to accurately reconfigure the 3D object (point cloud) it is possible to address attributes other than the color information) in the 3D object content according to glTF2.0.

Also, the file generation unit may define extension in mesh.primitives or may define the object in extension. The obtainment unit may obtain the data of the attributes on the basis of the information regarding the attributes stored in the object defined in extension inside mesh.primitives. It is possible to curb reduction of compatibility with existing glTF2.0 by applying extension.

Application Example 1 in Case 1

The aforementioned case 1, that is, the case where the V3C bitstream is decoded, the point cloud is reconfigured, and the obtained point cloud data is stored in the buffer will be described. In a case where the aforementioned method 1 is applied to the case 1, an object storing attribute information other than color information may be defined by using extension as illustrated in the second section from the top in FIG. 39 (method 2-1).

For example, the object may store identification information of data of attributes other than the color and identification information of an accessor associated with a buffer storing the data of the attributes in the data of the 3D object content. The file generation unit may generate a scene description file in which such an object is defined in extension inside mesh.primitives. The obtainment unit may obtain data of the attributes from the buffer on the basis of the information in such an object.

Figure 40:
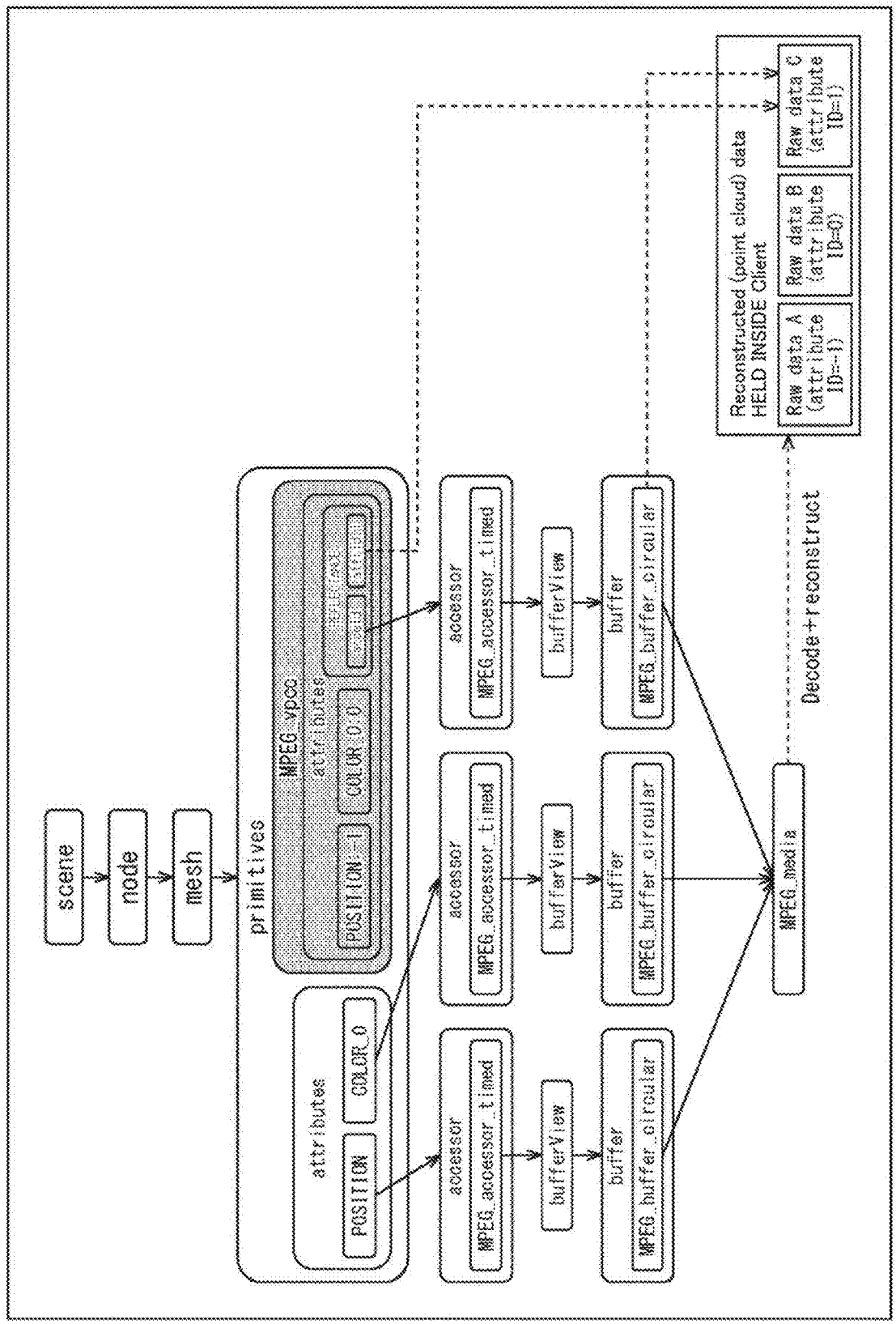
FIG. 40 is a diagram for explaining a configuration example of an object for scene description.

FIG. 40 is a diagram illustrating a configuration example of the object in this case. As illustrated in FIG. 40, new extension (MPEG_vpcc) is provided in mesh.primitives. An attribute object (attribute) is provided in MPEG_vpcc. An object storing information regarding "attributes that cannot be indicated by glTF2.0" is defined in the attribute object. In the case of the example in FIG. 40, reflectance is applied as an attribute, and an object "_REFLECTANCE" for the reflectance is defined. A property indicating stored data and a property indicating a buffer storing the data are set in such an object only for the attribute. Designation of the stored data can be performed by using arbitrary information. For example, identification information (attributeId (attrId)) of the data of the attribute in the data of the 3D object content may be used. Also, designation of the buffer storing the data of the attribute can be performed by using arbitrary information. For example, identification information (accessorId (acceId)) of an accessor associated with the buffer may be used.

FIG. 41 is a diagram illustrating a description example of scene description (mesh) in this case. As illustrated in the dotted-line frame in FIG. 41, a "_REFLECTANCE" object is defined in MPEG_vpcc.attribute, and a value is set in each of properties such as accessorId and attributeId.

The media access function of the client device stores data of the attribute designated by such information in the designated buffer. Also, the presentation engine reads the data of the attribute stored in the designated buffer.

In this manner, it is possible to accurately reconfigure the 3D object (point cloud) with the attributes other than the color information even in the case 1. In other words, it is possible to address the attributes other than the color information.

Note that the properties of "POSITION" and "COLOR" in MPEG_vpcc can be omitted in the example in FIG. 40. They may be provided only when needed.

Note that in the case where the aforementioned method 1 is applied to the case 1, attribute information other than the color information may be added to primitives.attributes instead of using extension as illustrated in the third section from the top of FIG. 39 (method 2-2_. For example, reflectance is employed as an attribute other than the color, and a property "_REFLECTANCE" storing information regarding the reflectance may be defined in primitives.attributes. The "_REFLECTANCE" property has identification information of the accessor.

In other words, the object storing the information regarding the attribute other than the color of the 3D object content may further store information regarding the position of the 3D object content and information regarding the color of the 3D object content. The file generation unit may define such an object in mesh.primitives. Also, the obtainment unit may obtain the data of the attribute on the basis of such an object defined in mesh.primitives.

Application Example in Case 2

The aforementioned case 2, that is, the case where the V3C bitstream is decoded and the obtained video data and the like are stored in the buffer will be described. In a case where the aforementioned method 1 is applied to the case 2, an object storing atlas information, geometry information, attribute information including attributes other than the color of the point cloud, and occupancy information may be defined by using extension as illustrated in the fourth section from the top of FIG. 39 (method 2-3).

For example, the object may store identification information of an accessor associated with a buffer storing the atlas information of the 3D object content, identification information of an accessor associated with a buffer storing the geometry of the 3D object content, identification information of an accessor associated with a buffer storing all the attributes of the 3D object content, and identification information of an accessor associated with a buffer storing occupancy information (for example, an occupancy map) of the 3D object content. The file generation unit may generate a scene description file in which such an object is defined in extension in mesh.primitives. The obtainment unit may obtain the video data and the like from each buffer on the basis of the information in such an object.

Figure 42:
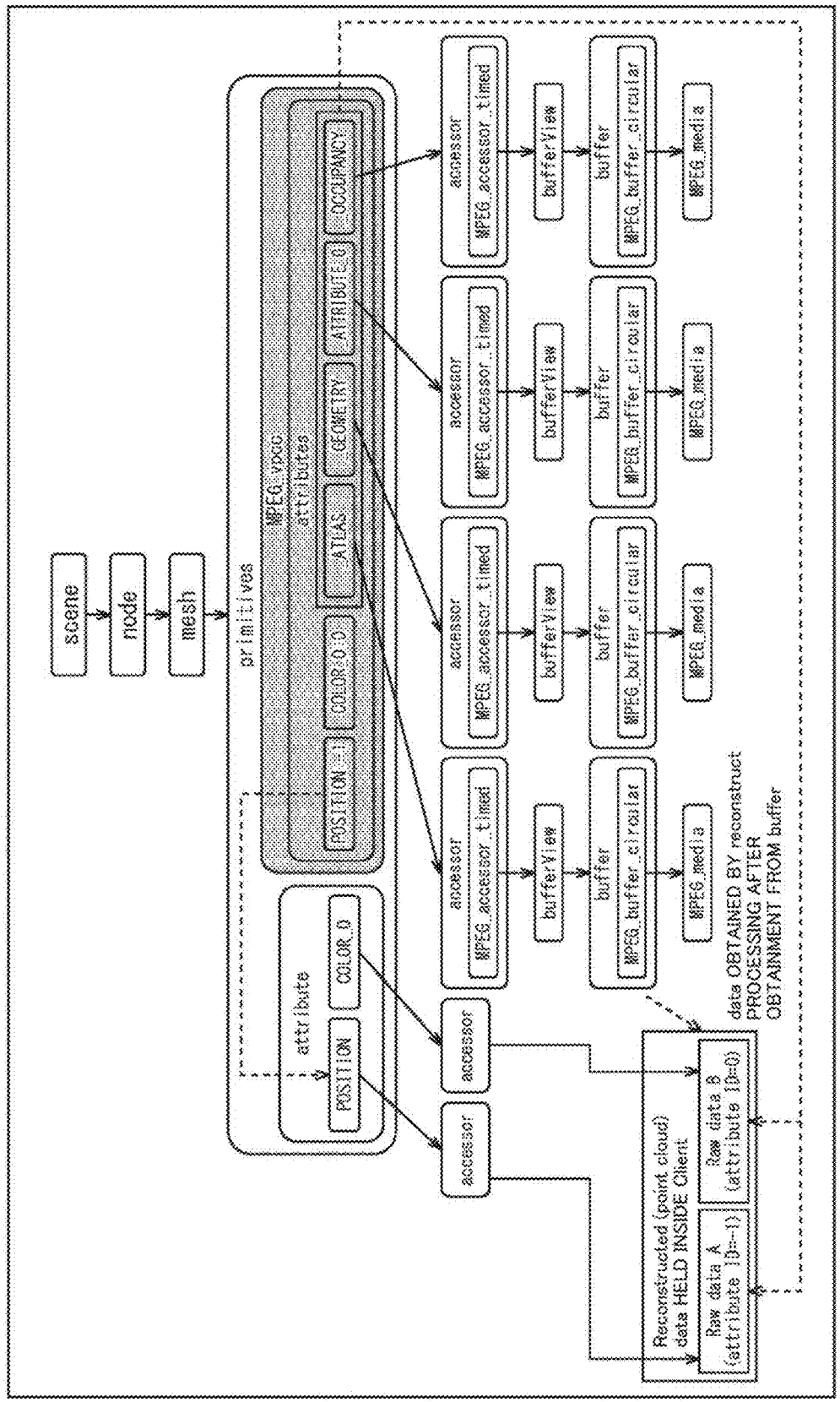
FIG. 42 is a diagram for explaining a configuration example of an object for scene description.

FIG. 42 is a diagram illustrating a configuration example of the object in this case. As illustrated in FIG. 42, new extension (MPEG_vpcc) is provided in mesh.primitives. An attribute object (attribute) is provided in MPEG_vpcc. A property (_ATLAS) designating the accessor associated with the buffer storing the atlas information is designated as a property indicating the buffer storing each piece of data in the attribute object. Similarly, a property (_GEOMETRY) designating the accessor associated with the buffer storing the geometry is set. Similarly, a property (_ATTRIBUTE_0) designating the accessor associated with the buffer storing all the attributes is set. Similarly, a property (_OCCUPANCY) designating the accessor associated with the buffer storing the occupancy information is set. The designation of the accessor may be performed by using the identification information (accessor Id (acceId)) of the accessor.

FIG. 43 is a diagram illustrating a description example of scene description (mesh) in this case. As illustrated in the dotted-line frame in FIG. 41, each value (the identification information of the accessor) is set for each of the properties of "_ATLAS", "_GEOMETRY", "_ATTRIBUTE_0", and "_OCCUPANCY" in MPEG_vpcc.attribute.

Note that each of the properties of "_ATLAS", "_GEOMETRY", "_ATTRIBUTE_0", and "_OCCUPANCY" may be added to primitives.attributes instead of using extension similarly to the method 2-2.

The media access function of the client device stores the video data and the like in the buffer designated by such information. Also, the presentation engine reads the video data and the like stored in the designated buffer.

In this manner, it is possible to accurately reconfigure the 3D object (point cloud) with the attributes other than the color information even in the case 2. In other words, it is possible to address the attributes other than the color information.

Application Example 2 of Case 1

In a case where the aforementioned method 1 is applied to the aforementioned case 1, an object storing general-purpose attribute information may be defined by using extension as illustrated at the bottom section in FIG. 39 (method 2-4).

For example, the object may further store, in addition to the identification information of data of attributes other than the color and identification information of the accessor associated with the buffer storing the data of the attributes in the data of the 3D object content, information indicating the type of the attributes. The file generation unit may generate a scene description file in which such an object is defined in extension inside mesh.primitives. The obtainment unit may obtain the data of the attributes from the buffer on the basis of such information of the object.

Figure 44:
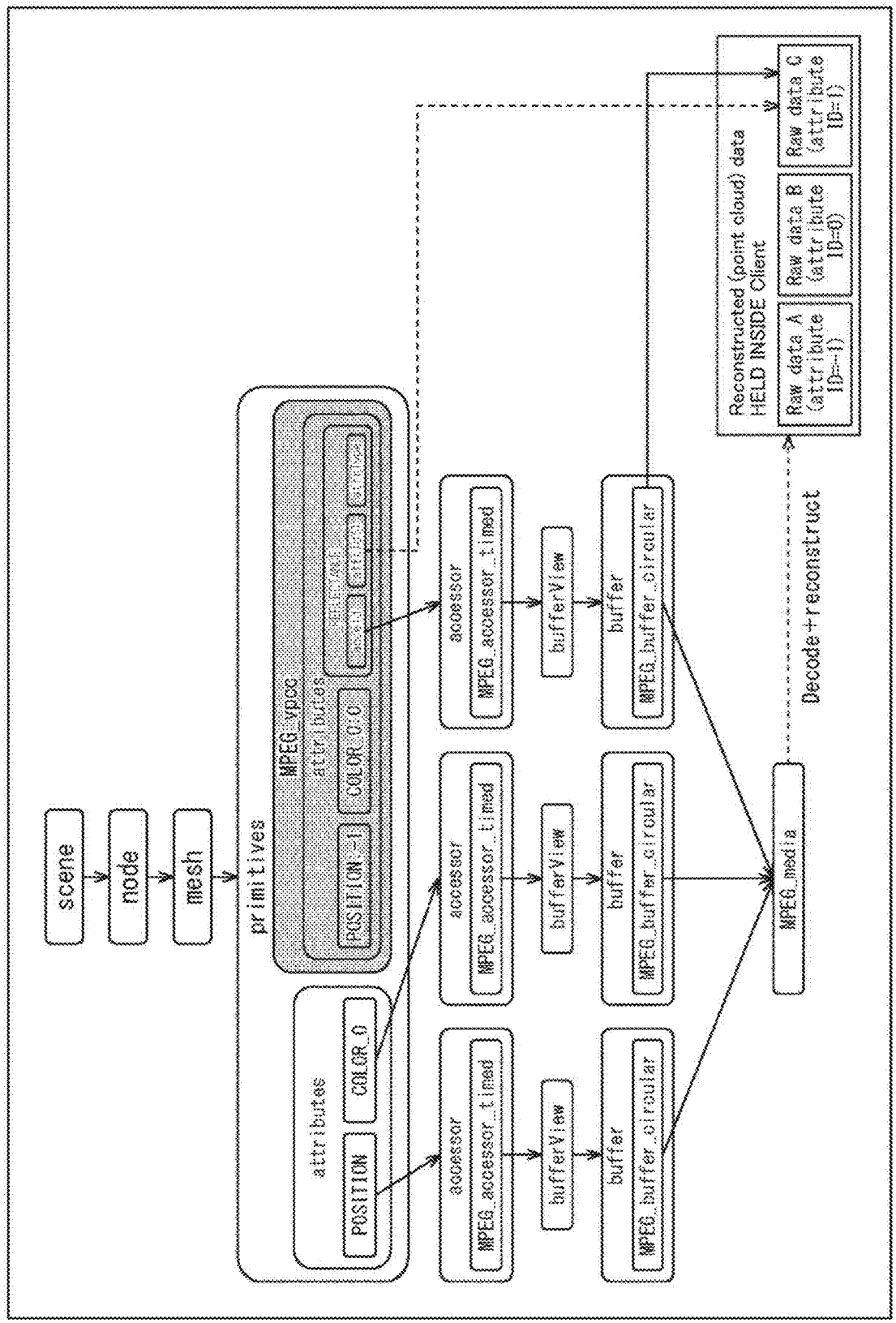
FIG. 44 is a diagram for explaining a configuration example of an object for scene description.

FIG. 44 is a diagram illustrating a configuration example of the object in this case. As illustrated in FIG. 44, new extension (MPEG_vpcc) is provided inside mesh.primitives. An attribute object (attribute) is provided inside MPEG_vpcc. A general-purpose object (vpccattributes) storing information of arbitrary attributes is defined inside the attribute object. In such a general-purpose object (vpccattributes), a property (acceId) indicating stored data, a property (attrId) indicating the buffer storing the data, and a property (attrType) indicating the type of the data are set. The designation of the data to be stored can be performed by using arbitrary information. For example, identification information (attributeId (attrId)) of the data of the attributes in the data of the 3D object content may be used. Also, the designation of the buffer storing the data of the attributes may be performed by using arbitrary information. For example, identification information (accessorId (acceId)) of the accessor associated with the buffer may be used. Also, the designation of the type of the attributes may be performed by using arbitrary information. For example, identification information (attributeType) for identifying the type of the attributes may be used.

FIG. 45 is a diagram illustrating a description example of scene description (mesh) in this case. As illustrated in the dotted-line frame in FIG. 45, a general-purpose object "vpccattributes" is defined in MPEG_vpcc.attribute, and a property "attributeType" for designating the type of the attributes is provided along with properties "accessorId" and "attributeId" in the object. In the case of the example in FIG. 45, identification information "ATTR_REFLECTANCE" indicating the reflectance is set as a value of "attributeType".

A media access function of the client device stores the data of the attributes designated by such information in the designated buffer. Also, a presentation engine reads the data of the attributes stored in the designated buffer.

In this manner, it is possible to designate the attribute information other than the color information by the general-purpose object without any need to provide an object only for the attributes in scene description.

Note that the properties "POSITION" and "COLOR" in MPEG_vpcc may be omitted in the example in FIG. 44. They may be provided only when needed.

File Generation Device

The aforementioned method 2 (including the methods 2-1 to 2-4) can be applied to arbitrary devices. For example, the method can be applied to a file generation device that generates information to distribute 3D object content. In that case, the configuration of the file generation device is similar to that in the case described with reference to FIG. 28.

In the file generation device 100 illustrated in FIG. 28, the file generation unit 114 applies the present technology and generates a file and the like.

For example, the file generation unit 114 may apply the aforementioned method 2 and generates a scene description file having an object that stores information regarding attributes other than the color of the 3D object content.

In this manner, the file generation device 100 enables the client device to accurately reconfigure a 3D object (point cloud) with the attributes other than the color information. In other words, it is possible to address the attributes other than the color information.

Note that the 3D object content may be a point cloud. Then, the file generation unit 114 may generate a scene description file described by a scheme according to glTF2.0 and define the object storing information regarding the attributes other than the color of the 3D object content in mesh.primitives of the scene description file.

Also, the file generation unit 114 may defines extension in mesh.primitives and defines the object storing the information regarding the attributes other than the color of the 3D object content in the extension.

In addition, the aforementioned method 2-1 may be applied, and the object may store identification information of the data of the attributes in the data of the 3D object content and identification information of an accessor associated with a buffer storing the data of the attributes.

Additionally, the aforementioned method 2-4 may be applied, and information indicating the type of attributes may further be stored in addition to the identification information of the data of the attributes and the identification information of the accessor.

Additionally, the aforementioned method 2-3 may be applied, and the object may store identification information of an accessor associated with a buffer storing atlas information of the 3D object content, identification information of an accessor associated with a buffer storing geometry of the 3D object content, identification information of an accessor associated with a buffer storing all attributes of the 3D object content, and identification information of an accessor associated with a buffer storing occupancy information of the 3D object content.

Also, the aforementioned method 2-2 may be applied, and the file generation unit 114 may define, in mesh.primitives, an object storing information regarding the position of the 3D object content, information regarding the color, and information regarding the attributes.

The file generation device 100 can obtain effects that are similar to those described in <3. Designation of attribute> by applying any one or more of these present technologies.

Flow of File Generation Processing

Figure 46:
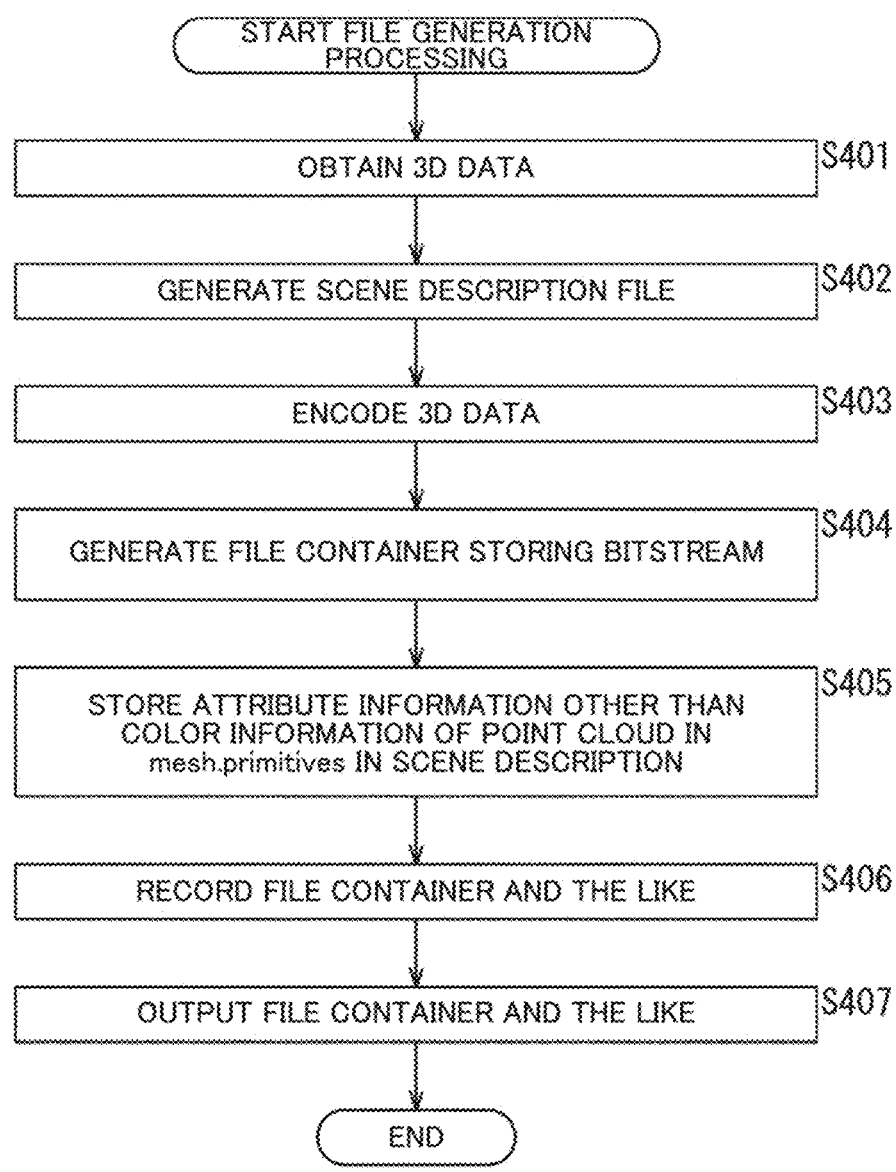
FIG. 46 is a flowchart illustrating an example of the flow of file generation processing.

An example of a flow of file generation processing executed by the file generation device 100 with such a configuration will be described with reference to the flowchart in FIG. 46.

Once the file generation processing starts, the input unit 111 of the file generation device 100 obtains data of a 3D object (3D data) in Step S401. For example, the input unit 111 obtains data of a point cloud as the 3D data.

In Step S402, the preprocessing unit 112 obtains information used to generate scene description, which is spatial arrangement information for placing one or more 3D objects in a 3D space, using the data of the 3D object obtained in Step S401. Then, the file generation unit 114 generates a scene description file by using the information.

In Step S403, the encoding unit 113 encodes the data of the point cloud (3D data) obtained in Step S401 and generates encoded data (V3C bitstream).

In Step S404, the file generation unit 114 generates a file container (ISOBMFF) storing the generated V3C bitstream in Step S403. Also, the file generation unit 114 may generate a control file such as MPD, for example.

In Step S405, the file generation unit 114 stores attribute information other than the color information of the point cloud in mesh.primitives of the scene description on the basis of generated ISOBMFF (or MPD) in Step S404.

In Step S406, the recording unit 115 records the generated file container (ISOBMFF), (MPD,) the scene description file, and the like in a recording medium.

In Step S407, the output unit 116 reads the file and the like recorded in Step S406 from the recording medium and outputs the read file to the outside of the file generation device 100 at a predetermined timing. For example, the output unit 116 may transmit (upload) the file read from the recording medium to another device such as a distribution server or a reproducing device via a communication medium such as a network. Also, the output unit 116 may record the file and the like read from the recording medium in an external recording medium such as a removable medium. In that case, the output file may be supplied to another device (such as a distribution server or a reproducing device) via the external recording medium, for example.

Once the processing of Step S407 ends, the file generation processing ends.

In Step S405 of such file generation processing, the file generation unit 114 can apply various methods of the present technology as described above in <File generation device> in <3. Designation of attribute> and store attribute information other than the color information of the point cloud in mesh.primitives of the scene description. Therefore, the file generation device 100 executes the file generation processing in this manner and thereby enables the client device to accurately reconfigure the 3D object (point cloud) with the attributes other than the color information. In other words, it is possible to address the attributes other than the color information. Also, the file generation device 100 can obtain effects that are similar to those described in <3. Designation of attribute>.

Client Device

Also, the present technology may be applied to a client device that is a reproducing device that performs 3D object content reproducing processing on the basis of a 3-scene description file (scene description). In that case, the configuration of the client device is similar to that in the case described with reference to FIG. 30.

In the client device 200 illustrated in FIG. 30, the file processing unit 212 applies the present technology and obtains data such as a scene description file and (MPD and) 3D object content.

For example, the file processing unit 212 may apply the aforementioned method 2 and obtain data of attributes other than the color of the 3D object content on the basis of information regarding the attributes stored in an object defined by the scene description file that describes a scene of the 3D object content. The file processing unit 212 realizes such processing by controlling the file obtainment unit 211. In other words, the file processing unit 212 may also be referred to as an obtainment unit.

In this manner, the client device 200 can accurately reconfigure the 3D object (point cloud) with the attributes other than the color information. In other words, it is possible to address the attributes other than the color information.

Note that the 3D object content may be a point cloud. Also, the scene description file may be described by a scheme according to glTF2.0.

Additionally, the object may be defined in mesh.primitives of the scene description file.

Moreover, the object may be defined in extension defined in mesh.primitives.

Also, the aforementioned method 2-1 may be applied, and the obtainment unit may obtain the data of the attributes from a buffer on the basis of identification information of the data of the attributes in the data of the 3D object content and identification information of an accessor associated with the buffer storing the data of the attributes, which are stored in the object.

Additionally, the aforementioned method 2-4 may be applied, and the obtainment unit may further obtain the data of the attributes from the buffer on the basis of information indicating the types of the attributes stored in the object.

Also, the aforementioned method 2-3 may be applied, and the obtainment unit may obtain the data of the attributes from buffers on the basis of identification information of an accessor associated with the buffer storing atlas information of the 3D object content, identification information of an accessor associated with a buffer storing geometry of the 3D object content, and identification information of an accessor associated with a buffer associated with a buffer storing all the attributes of the 3D object content, which is stored in the object along with identification information of an accessor associated with a buffer storing occupancy information of the 3D object content.

Moreover, the aforementioned method 2-2 may be applied, and the object may further store information regarding the position of the 3D object content and information regarding a color of the 3D object content.

The client device 200 can obtain effects that are similar to those described in <3. Designation of attribute> by applying any one or more of these present technologies.

Client Processing Flow 1

Figure 47:
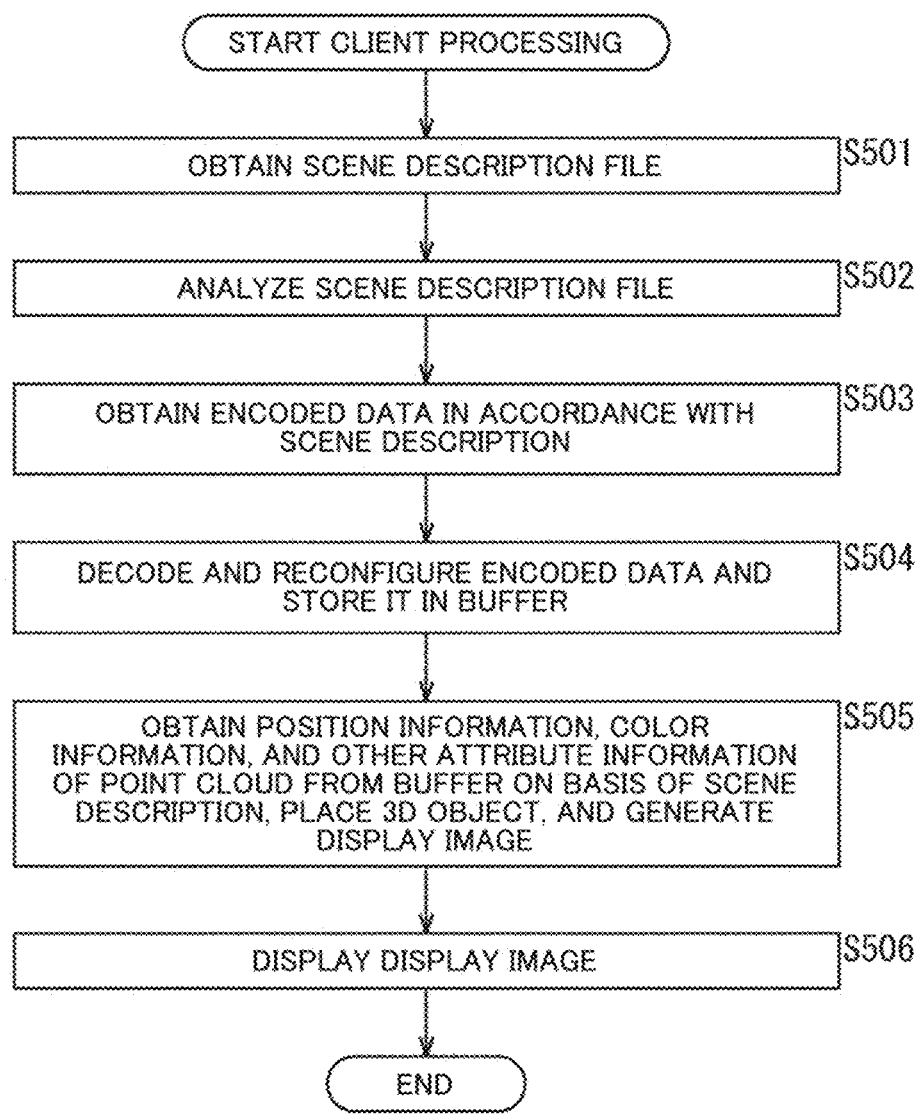
FIG. 47 is a flowchart illustrating an example of the flow of client processing.

An example of a flow of client processing executed by the client device 200 with such a configuration will be described with reference to the flowchart in FIG. 47. The flowchart in FIG. 47 is an example of a flow of client processing in the case 1. Once the client processing starts, the file processing unit 212 of the client device 200 controls the file obtainment unit 211 in Step S501 and obtains a scene description file.

In Step S502, the file processing unit 212 analyzes the scene description file obtained in Step S501.

In Step S503, the file processing unit 212 controls the file obtainment unit 211 on the basis of the scene description file analysis result obtained by the processing in Step S502 and obtains encoded data (V3C bitstream) of 3D object content.

In Step S504, the decoding unit 213 decodes the encoded data (V3C bitstream) obtained in Step S503 and generates video data and the like. In other words, the decoding unit 213 obtains atlas information, a geometry frame, an attribute frame, an occupancy map, and the like. The decoding unit 213 further reconfigures a point cloud by using the obtained data and generates data (geometry, attributes, and the like) of the point cloud. Then, the decoding unit 213 stores the obtained data of the point cloud in a buffer designated by the scene description file.

In Step S505, the display information generation unit 214 obtains the data (the geometry, the attributes, and the like) of the point cloud from the buffer on the basis of the scene description. In other words, the display information generation unit 214 obtains position information of the point cloud, color information, and other attribute information. The display information generation unit 214 places the point cloud (3D object) in a three-dimensional space in accordance with the scene description, performs rendering, and generates a display image.

In Step S506, the display unit 215 displays the display image generated in Step S505. Once the processing in Step S506 ends, the client processing ends.

In each processing of Steps S501 to S504 in such client processing, the file processing unit 212 can apply various methods of the present technology as described above in <Client device> in <3. Designation of attribute> and obtain data of the attribute on the basis of attribute information other than color information of the point cloud stored in mesh.primitives of the scene description. Therefore, the client device 200 can accurately reconfigure the 3D object (point cloud) with attributes other than the color information by executing the client processing in this manner. In other words, it is possible to address the attributes other than the color information. Additionally, the client device 200 can obtain effects that are similar to those described in <3. Designation of attribute>.

Client Processing Flow 2

Figure 48:
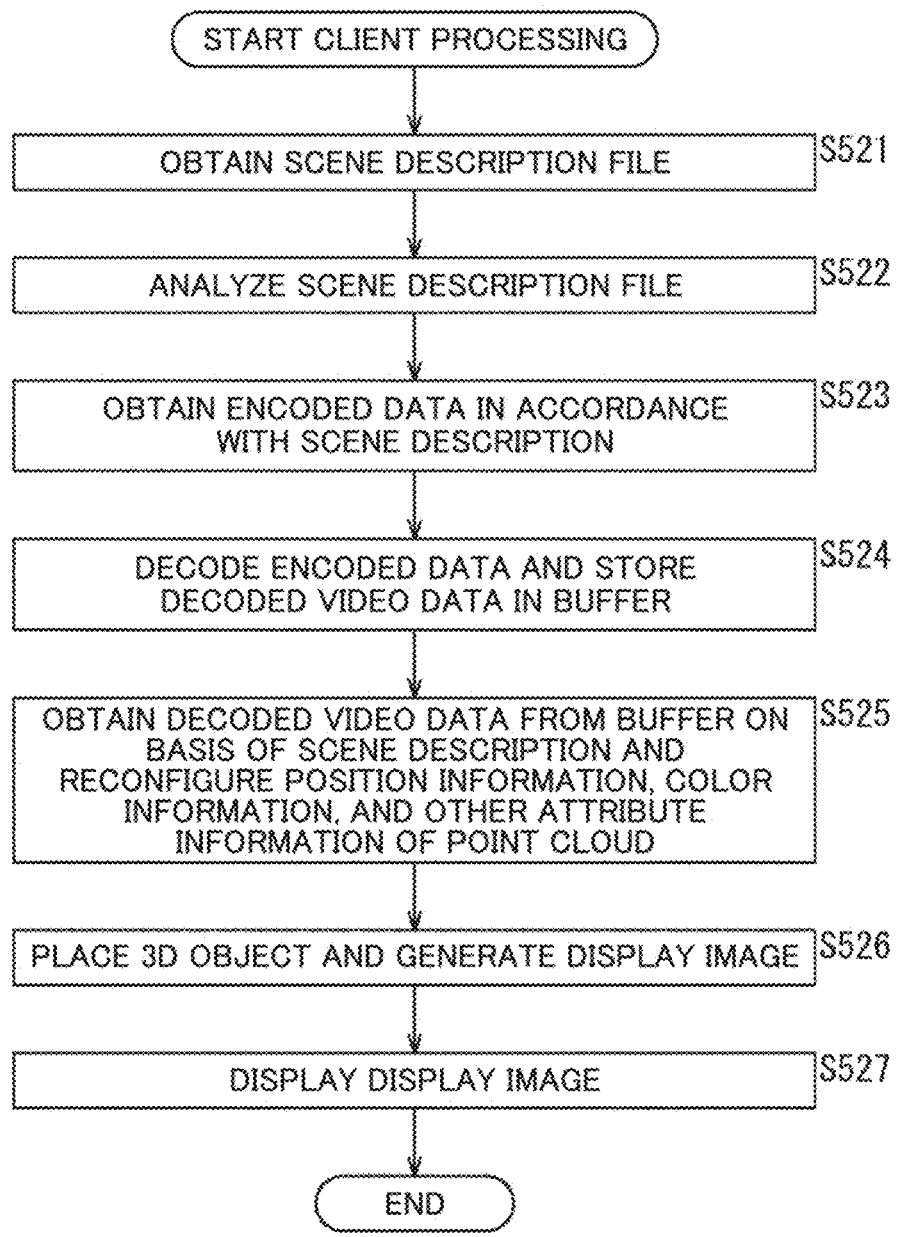
FIG. 48 is a flowchart illustrating an example of the flow of client processing.

Next, an example of a flow of client processing in the case 2 will be described with reference to the flowchart of FIG. 48.

Once the client processing starts, the file processing unit 212 of the client device 200 controls the file obtainment unit 211 in Step S521 and obtains a scene description file.

In Step S522, the file processing unit 212 analyzes the scene description file obtained in Step S521.

In Step S523, the file processing unit 212 controls the file obtainment unit 211 on the basis of the scene description file analysis result obtained in the processing in Step S522 and obtains encoded data (V3C bitstream) of the 3D object content.

In Step S524, the decoding unit 213 decodes the encoded data (V3C bitstream) obtained in Step S523 and generates video data or the like. In other words, the decoding unit 213 obtains atlas information, a geometry frame, an attribute frame, an occupancy map, and the like. The decoding unit 213 stores the obtained data in a buffer designated by a scene description file.

In Step S525, the decoding unit 213 obtains video data and the like (the atlas information, the geometry frame, the attribute frame, the occupancy map, and the like) from the buffer on the basis of the scene description. The decoding unit 213 reconfigures a point cloud by using the video data and the like and generates data (geometry, attributes, and the like) of the point cloud. Then, the decoding unit 213 supplies the obtained data of the point cloud to the display information generation unit 214.

In Step S526, the display information generation unit 214 places the point cloud (3D object) in a three-dimensional space in accordance with the scene description, performs rendering, and thereby generates a display image.

In Step S527, the display unit 215 displays the display image generated in Step S526. Once the processing in Step S527 ends, the client processing ends.

In each processing of Steps S521 to S525 in such client processing, the file processing unit 212 can apply various methods of the present technology as described above in <Client device> in <3. Designation of attribute> and obtain data of the attribute on the basis of attribute information other than color information of the point cloud stored in mesh.primitives of the scene description. Therefore, the client device 200 can accurately reconfigure the 3D object (point cloud) with attributes other than the color information by executing the client processing in this manner. In other words, it is possible to address the attributes other than the color information. Also, the client device 200 can obtain effects that are similar to those described in <3. Designation of attribute>.

4. Supplement

Combination

Any number of the aforementioned methods may be applied in combination with each other as long as the combination does not lead to contradiction. For example, the method 1 and the method 2 may be applied in combination. The methods described above may also be applied in combination with any other methods that have not been described above.

Computer

The above-described series of processing can be executed by hardware or software. When the series of processing is executed by software, a program that constitutes the software is installed in the computer. Here, the computer includes, for example, a computer built in dedicated hardware and a general-purpose personal computer on which various programs are installed to be able to execute various functions.

Figure 49:
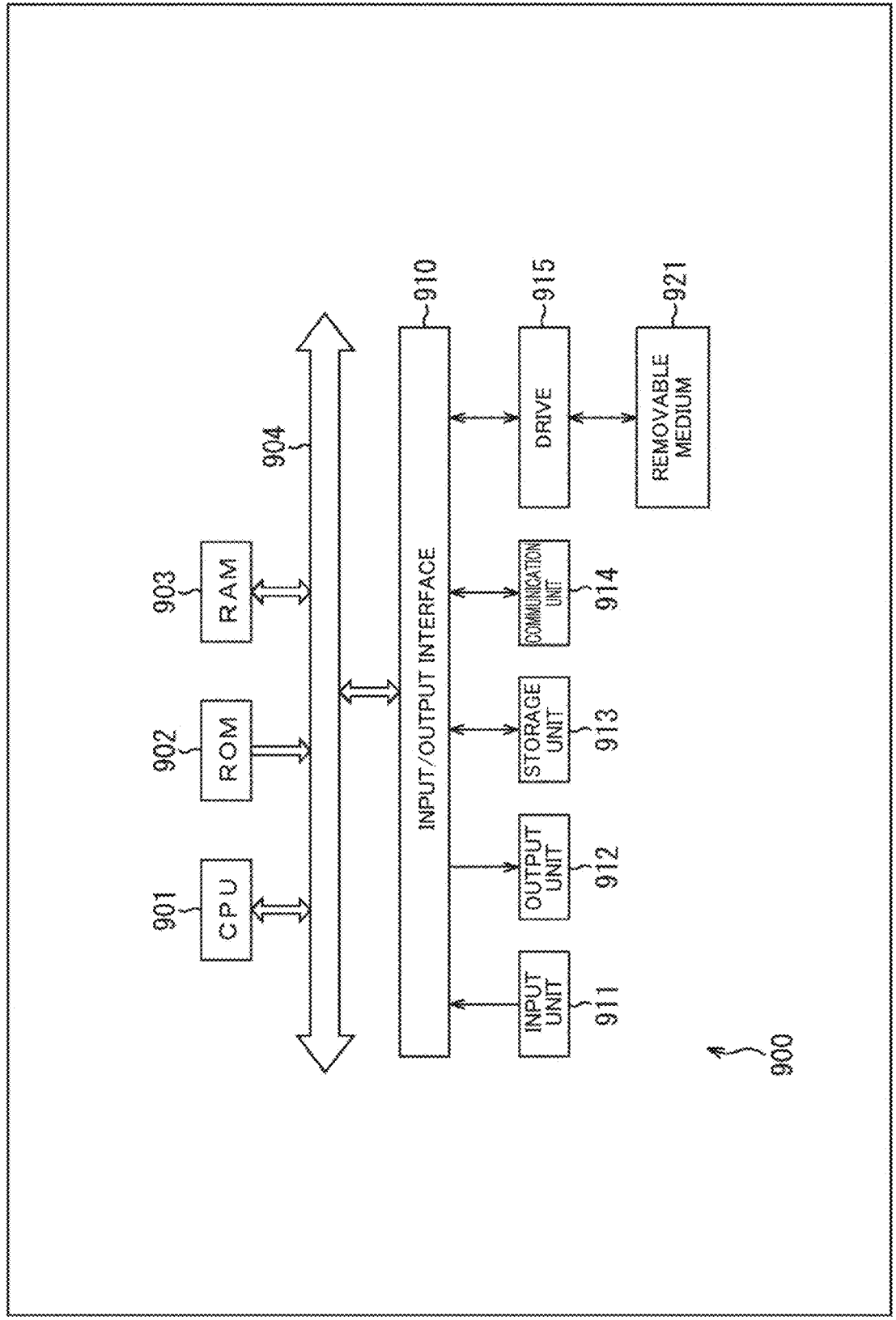
FIG. 49 is a block diagram showing a principal configuration example of a computer.

FIG. 49 is a block diagram showing an example of a hardware configuration of a computer that executes the above-described series of processing according to a program.

In the computer 900 illustrated in FIG. 49, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 is, for example, a keyboard, a mouse, a microphone, a touch panel, or an input terminal. The output unit 912 is, for example, a display, a speaker, or an output terminal. The storage unit 913 includes, for example, a hard disk, a RAM disk, and non-volatile memory. The communication unit 914 includes, for example, a network interface. The drive 915 drives a removable medium 921 such as a magnetic disk, an optical disc, a magneto-optical disk, or a semiconductor memory.

In the computer configured as described above, the CPU 901 loads a program stored in the storage unit 913 into the RAM 903 via the input/output interface 910 and the bus 904 and executes the program, so that the above-described series of processing is performed. Further, data and the like necessary for the CPU 901 to execute various types of processing are appropriately stored in the RAM 903.

The program executed by the computer can be recorded in, for example, the removable medium 921 as a package medium or the like and provided in such a form. In such a case, the program can be installed in the storage unit 913 via the input/output interface 910 by inserting the removable medium 921 into the drive 915.

This program can also be provided via wired or wireless transfer medium such as a local area network, the Internet, and digital satellite broadcasting. In such a case, the program can be received by the communication unit 914 and installed in the storage unit 913.

In addition, this program can be installed in advance in the ROM 902, the storage unit 913, or the like.

Applications of Present Technique

The present technology can be applied to any coding/decoding schemes.

Additionally, the present technology can be applied in any desired configuration. For example, the present technology can be applied in a variety of electronic devices.

Further, for example, the present technology can be implemented as a part of the configuration of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit.

Further, for example, the present technology can also be applied to a network system configured of a plurality of devices. For example, the present technology may be implemented as cloud computing in which a plurality of devices share processing and jointly perform processing via a network. For example, the present technology may be implemented in a cloud service in which a service regarding images (videos) is provided to any terminals such as computers, audio visual (AV) device, portable information processing terminals, and Internet of Things (IoT) devices.

In the present specification, a system means a set of a plurality of constituent elements (devices, modules (parts), or the like) and all the constituent elements may not be in the same casing. Accordingly, a plurality of devices accommodated in separate casings and connected via a network and a single device accommodating a plurality of modules in a single casing are all a system.

Fields and Applications to which Present Technology is Applicable

Systems, devices, processing units, and the like to which the present technology is applied can be used in any field such as transportation, medical care, crime prevention, agriculture, livestock industry, mining, beauty, factories, home appliances, weather, and nature surveillance. Any purpose can be set.

For example, the present technology can be applied to systems and devices for providing ornamental content and the like. In addition, for example, the present technology can be applied to systems and devices available for traffic, such as traffic condition monitoring and autonomous driving control. Further, for example, the present technology can be applied to systems and devices available for security. In addition, for example, the present technology can be applied to systems and devices available for automatic control of machines and the like. Further, for example, the present technology can be applied to systems and devices available for agriculture and livestock industry. In addition, the present technology can also be applied, for example, to systems and devices for monitoring natural conditions such as volcanoes, forests, and oceans and wildlife. Further, for example, the present technology can be applied to systems and devices available for sports.

Others

In the present specification, the "flag" is information for identifying a plurality of states, and includes not only information used when two states including true (1) or false (0) are identified, but also information that can identify three or more states. Therefore, values of this "flag" may be, for example, two values including 1/0, or may be three or more values. That is, any number of bits may be used to constitute this "flag", and the number may be 1 bit or a plurality of bits. Further, since the identification information (including the flag) is assumed to have not only a form in which the identification information is included in a bitstream, but also a form in which difference information between the identification information and certain reference information is included in a bitstream, the "flag" or the "identification information" includes not only that information but also difference information with respect to the reference information in the present specification.

Further, various types of information (metadata, or the like) regarding the encoded data (bitstream) may be transmitted or recorded in any form as long as the information is associated with the encoded data. Here, the term "associate" means, for example, enabling utilization (linking) of one piece of data when processing the other data. In other words, data associated with each other may be collected as one piece of data or may be individual pieces of data. For example, information associated with encoded data (image) may be transmitted on a transmission path separate from that for the encoded data (image). Further, for example, the information associated with the encoded data (image) may be recorded on a recording medium (or a recording area of the same recording medium) separate from that for the encoded data (image). Meanwhile, this "association" may be for part of data, not the entire data. For example, an image and information corresponding to the image may be associated with a plurality of frames, one frame, or any unit such as a part in the frame.

Meanwhile, in the present specification, terms such as "synthesize", "multiplex", "add", "integrate", "include", "store", "put in", "enclose", and "insert" may mean, for example, combining a plurality of objects into one, such as combining encoded data and metadata into one piece of data, and means one method of "associating" described above.

Embodiments of the present technology are not limited to the above-described embodiments and can be changed variously within the scope of the present technology without departing from the gist of the present technology.

For example, a configuration described as one device (or processing unit) may be divided and configured as a plurality of devices (or processing units). On the other hand, the configuration described above as a plurality of devices (or processing units) may be collectively configured as one device (or processing unit). Further, of course, a configuration other than the above may be added to the configuration of each device (or each processing unit). Further, a part of a configuration of a device (or processing unit) may be included in a configuration of another device (or another processing unit) as long as a configuration or operation of the system as a whole is substantially the same.

Further, for example, the above-described program may be executed in any device. In this case, the device only needs to have necessary functions (functional blocks, and the like) and to be able to obtain necessary information.

Further, for example, each step of one flowchart may be executed by one device, or may be shared and executed by a plurality of devices. Further, when a plurality of processing are included in one step, one device may execute the plurality of processing, or the plurality of devices may share and execute the plurality of processing. In other words, it is also possible to execute the plurality of processing included in one step as processing of a plurality of steps. On the other hand, it is also possible to execute processing described as a plurality of steps collectively as one step.

Further, for example, in a program that is executed by a computer, processing of steps describing the program may be executed in time series in an order described in the present specification, or may be executed in parallel or individually at a required timing such as when call is made. That is, the processing of the respective steps may be executed in an order different from the above-described order as long as there is no contradiction. Further, the processing of the steps describing this program may be executed in parallel with processing of another program, or may be executed in combination with the processing of the other program.

Further, for example, a plurality of technologies regarding the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the technologies described in other embodiments. Further, it is also possible to implement some or all of any of the above-described technologies in combination with other technologies not described above.

The present technology can also be configured as follows.

(1) An information processing device including: a file generation unit that generates a scene description file describing a scene of 3D object content, the scene description file including track information that designates, as a reference target, some tracks with information for accessing other tracks from among a plurality of tracks of a file container that manages information regarding data of the 3D object content.

(2) The information processing device according to (1), in which the track information is information that designates, as the reference target, a single track with information for accessing all the other tracks.

(3) The information processing device according to (2), in which the track information is information that designates, as the reference target, the single track with a track reference for accessing all the other tracks from among the plurality of tracks of the file container.

(4) The information processing device according to (2), in which the track information is information that designates, as the reference target, an adaptation set that stores information regarding the single track in a control file for controlling distribution of the data of the 3D object content.

(5) The information processing device according to (4), in which the 3D object content is distributed by a scheme according to Moving Picture Experts Group Dynamic Adaptive Streaming over Hypertext Transfer Protocol (MPEG-DASH), and the control file is Media Presentation Description.

(6) The information processing device according to any of (1) to (5), in which the file container is an International Organization for Standardization Base Media File Format (ISOBMFF) to which the multi-track structure is applied.

(7) The information processing device according to any of (1) to (6), in which the data of the 3D object content is a Visual Volumetric Video-based Coding (V3C) bitstream obtained by a point cloud being encoded by a scheme according to Video-based Point Cloud Compression (V-PCC).

(8) The information processing device according to any of (1) to (7), in which the scene description file is described by a scheme according to the GL Transmission Format (glTF) 2.0.

(9) An information processing method including: generating a scene description file that describes a scene of 3D object content, the scene description file including track information that designates, as a reference target, some tracks with information for accessing other tracks from among a plurality of tracks of a file container that manages information regarding data of the 3D object content.

(11) An information processing device including: an obtainment unit that obtains data of 3D object content managed in all tracks on the basis of a scene description file that describes a scene of the 3D object content and a reference relationship among the tracks, the scene description file including track information that designates, as a reference target, some tracks with information for accessing other tracks from among the plurality of tracks of a file container that manages information regarding the data of the 3D object content.

(12) The information processing device according to (11), in which the track information is information that designates, as the reference target, a single track with information for accessing all the other tracks.

(13) The information processing device according to (12), in which the track information is information that designates, as the reference target, the single track with a track reference for accessing all the other tracks from among the plurality of tracks of the file container, and the obtainment unit refers to the single track on the basis of the track information and obtains the data of the 3D object content managed in all the tracks on the basis of the track reference.

(14) The information processing device according to (12), in which the track information is information that designates, as the reference target, an adaptation set storing information regarding the single track in a control file for controlling distribution of the data of the 3D object content, and the obtainment unit obtains the control file, refers to the single track, on the basis of the information regarding the adaptation set designated by the track information of the control file, and obtains the data of the 3D object content managed in all the tracks on the basis of a reference relationship among the tracks.

(15) The information processing device according to (14), in which the 3D object content is distributed by a scheme according to Moving Picture Experts Group Dynamic Adaptive Streaming over Hypertext Transfer Protocol (MPEG-DASH), and the control file is Media Presentation Description (MPD).

(16) The information processing device according to any of (11) to (15), in which the file container is an International Organization for Standardization Base Media File Format (ISOBMFF) to which a multi-track structure is applied.

(17) The information processing device according to any of (11) to (16), in which the data of the 3D object content is a Visual Volumetric Video-based Coding (V3C) bitstream obtained by a point cloud being encoded by a scheme according to Video-based Point Cloud Compression (V-PCC).

(18) The information processing device according to any of (11) to (17), in which the scene description file is described by a scheme according to the GL Transmission Format (glTF) 2.0.

(19) The information processing method including: obtaining data of 3D object content managed in all tracks on the basis of a scene description file that describes a scene of the 3D object content and a reference relationship among the tracks, the scene description file including track information that designates, as a reference target, some tracks with information for accessing other tracks from among the plurality of tracks of a file container that manages information regarding the data of the 3D object content.

(21) An information processing device including: a file generation unit that generates a scene description file describing a scene of 3D object content including an object that stores information regarding an attribute other than a color of the 3D object content.

(22) The information processing device according to (21), in which the 3D object content is a point cloud, and the file generation unit generates the scene description file described by a scheme according to the GL Transmission Format (glTF) 2.0 and defines the object in mesh.primitives of the scene description file.

(23) The information processing device according to (22), in which the file generation unit defines extension in mesh.primitives and defines the object in the extension.

(24) The information processing device according to (23), in which the object stores identification information of data regarding the attribute in the data of the 3D object content and identification information of an accessor associated with a buffer with the data of the attribute stored therein.

(25) The information processing device according to (24), in which the object further stores information indicating a type of the attribute.

(26) The information processing device according to (23), in which the object stores identification information of an accessor associated with a buffer storing atlas information of the 3D object content, identification information of an accessor associated with a buffer storing geometry of the 3D object content, identification information of an accessor associated with a buffer storing all attributes of the 3D object content, and identification information of an accessor associated with a buffer storing occupancy information of the 3D object content.

(27) The information processing device according to (22), in which the file generation unit defines the object storing information regarding a position of the 3D object content, information regarding a color, and information regarding the attribute.

(28) An information processing method including: generating a scene description file describing a scene of 3D object content including an object that stores information regarding an attribute other than a color of the 3D object content.

(31) An information processing device including: an obtainment unit that obtains data of an attribute on the basis of information regarding an attribute other than a color of 3D object content, the information being stored in an object defined by a scene description file that describes a scene of the 3D object content.

(32) The information processing device according to (31), in which the 3D object content is a point cloud, the scene description file is described by a scheme according to the GL Transmission Format (glTF) 2.0, and the object is defined in mesh.primitives of the scene description file.

(33) The information processing device according to (32), in which the object is defined in extension defined in mesh.primitives.

(34) The information processing device according to (33), in which the obtainment unit obtains the data of the attribute from a buffer on the basis of identification information of the data of the attribute in the data of the 3D object content and identification information regarding an accessor associated with the buffer storing the data of the attribute, which are stored in the object.

(35) The information processing device according to (34), in which the obtainment unit further obtains the data of the attribute from the buffer on the basis of information stored in the object and indicating a type of the attribute.

(36) The information processing device according to (33), in which the obtainment unit obtains the data from the buffer on the basis of identification information of an accessor associated with a buffer storing atlas information of the 3D object content, identification information of an accessor associated with a buffer storing geometry of the 3D object content, and identification information of an accessor associated with a buffer storing all attributes of the 3D object content, which is stored in the object along with the identification information of an accessor associated with a buffer storing occupancy information of the 3D object content.

(37) The information processing device according to (32), in which the object further stores information regarding a position of the 3D object content and information regarding a color of the 3D object content.

(38) An information processing method including: obtaining data of an attribute on the basis of information regarding the attribute other than a color of 3D object content, the information being stored in an object defined by a scene description file that describes a scene of the 3D object content.

REFERENCE SIGNS LIST

100 File generation device
101 Control unit
102 File generation processing unit
111 Input unit
112 Preprocessing unit
113 Encoding unit
114 File generation unit
115 Recording unit
116 Output unit
200 Client device
201 Control unit
202 Client processing unit
211 File obtainment unit
212 File processing unit
213 Decoding unit
214 Display information generation unit
215 Display unit
216 Display control unit

The invention claimed is:

1. An information processing device comprising:
circuitry that generates a scene description file describing a scene of 3D object content, the scene description file including track information that designates, as a reference target, some tracks of a plurality of tracks with information for accessing other tracks from among the plurality of tracks of a file container that manages information regarding data of the 3D object content, wherein designation of the reference target with respect to the other tracks of the plurality of tracks being omitted from the scene description file.

2. The information processing device according to claim 1, wherein the track information is information that designates, as the reference target, a single track with information for accessing all the other tracks of the plurality of tracks.

3. The information processing device according to claim 2, wherein the track information is information that designates, as the reference target, the single track with a track reference for accessing all the other tracks from among the plurality of tracks of the file container.

4. The information processing device according to claim 2, wherein the track information is information that designates, as the reference target, an adaptation set that stores information regarding the single track in a control file for controlling distribution of the data of the 3D object content.

5. The information processing device according to claim 4, wherein the 3D object content is distributed by a scheme according to Moving Picture Experts Group Dynamic Adaptive Streaming over Hypertext Transfer Protocol (MPEG-DASH), and the control file is Media Presentation Description (MPD).

6. The information processing device according to claim 1, wherein the file container is an International Organization for Standardization Base Media File Format (ISOBMFF) to which a multi-track structure is applied.

7. The information processing device according to claim 1, wherein the data of the 3D object content is a Visual Volumetric Video-based Coding (V3C) bitstream obtained by a point cloud being encoded by a scheme according to Video-based Point Cloud Compression (V-PCC).

8. The information processing device according to claim 1, wherein the scene description file is described by a scheme according to a GL Transmission Format (glTF) 2.0 that is a scene description format for placing 3D objects in 3D space.

9. An information processing method comprising:
generating a scene description file that describes a scene of 3D object content, the scene description file including track information that designates, as a reference target, some tracks of a plurality of tracks with information for accessing other tracks from among the plurality of tracks of a file container that manages information regarding data of the 3D object content, wherein designation of the reference target with respect to the other tracks of the plurality of tracks being omitted from the scene description file.

10. An information processing device comprising:
circuitry that obtains data of 3D object content managed in a plurality of tracks based on the a scene description file that describes a scene of the 3D object content and a reference relationship among the plurality of tracks, the scene description file including track information that designates, as a reference target, some tracks of the plurality of tracks with information for accessing other tracks from among the plurality of tracks of a file container that manages information regarding the data of the 3D object content, wherein designation of the reference target with respect to the other tracks of the plurality of tracks being omitted from the scene description file.

11. The information processing device according to claim 10, wherein the track information is information that designates, as the reference target, a single track with information for accessing all the other tracks of the plurality of tracks.

12. The information processing device according to claim 11,
wherein the track information is information that designates, as the reference target, the single track with a track reference for accessing all the other tracks from among the plurality of tracks of the file container, and the circuitry refers to the single track on the basis of the track information, and obtains the data of the 3D object content managed in all the tracks of the plurality of tracks on the basis of the track reference.

13. The information processing device according to claim 11,
wherein the track information is information that designates, as the reference target, an adaptation set storing information regarding the single track in a control file for controlling distribution of the data of the 3D object content, and
the circuitry obtains the control file, refers to the single track, on the basis of the information regarding the adaptation set designated by the track information of the control file, and obtains the data of the 3D object content managed in all the tracks of the plurality of tracks on the basis of a reference relationship among the plurality of tracks.

14. The information processing device according to claim 13,
wherein the 3D object content is distributed by a scheme according to Moving Picture Experts Group Dynamic Adaptive Streaming over Hypertext Transfer Protocol (MPEG-DASH), and
the control file is Media Presentation Description (MPD).

15. The information processing device according to claim 10, wherein the file container is an International Organization for Standardization Base Media File Format (ISOBMFF) to which a multi-track structure is applied.

16. The information processing device according to claim 10, wherein the data of the 3D object content is a Visual Volumetric Video-based Coding (V3C) bitstream obtained by a point cloud being encoded by a scheme according to Video-based Point Cloud Compression (V-PCC).

17. The information processing device according to claim 10, wherein the scene description file is described by a scheme according to the GL Transmission Format (glTF) 2.0 that is a scene description format for placing 3D objects in 3D space.

18. An information processing method comprising:
obtaining data of 3D object content managed in a plurality of tracks based on a scene description file that describes a scene of the 3D object content and a reference relationship among the plurality of tracks, the scene description file including track information that designates, as a reference target, some tracks of the plurality of tracks with information for accessing other tracks from among the plurality of tracks of a file container that manages information regarding the data of the 3D object content, wherein designation of the reference target with respect to the other tracks of the plurality of tracks being omitted from the scene description file.

* * * * *